US012629298B2

(12) United States Patent
Matheny et al.

(10) Patent No.: US 12,629,298 B2
(45) Date of Patent: May 19, 2026

(54) PATIENT TRANSPORT APPARATUS WITH ADJUSTABLE HANDLES

(71) Applicant: Stryker Corporation, Kalamazoo, MI (US)

(72) Inventors: Nathan Matheny, Portage, MI (US); Michael T. Brubaker, Portage, MI (US); Christopher Gentile, Sturgis, MI (US); Ross T. Lucas, Paw Paw, MI (US)

(73) Assignee: Stryker Corporation, Portage, MI (US)

( * ) Notice: Subject to any disclaimer, the term of this patent is extended or adjusted under 35 U.S.C. 154(b) by 381 days.

(21) Appl. No.: 18/387,601

(22) Filed: Nov. 7, 2023

(65) Prior Publication Data

US 2024/0065904 A1 Feb. 29, 2024

Related U.S. Application Data

(63) Continuation of application No. 17/847,425, filed on Jun. 23, 2022, now Pat. No. 11,839,572, which is a (Continued)

(51) Int. Cl.
*A61G 1/02* (2006.01)
*A61G 1/048* (2006.01)
(Continued)

(52) U.S. Cl.
CPC ............... *A61G 1/048* (2013.01); *A61G 1/02* (2013.01); *A61G 5/10* (2013.01); *A61G 7/05* (2013.01)

(58) Field of Classification Search
CPC . A61G 1/048; A61G 1/02; A61G 7/05; A61G 5/10
See application file for complete search history.

(56) References Cited

U.S. PATENT DOCUMENTS 3,088,770 A 5/1963 Ferneau
5,069,465 A 12/1991 Stryker et al.
(Continued)

FOREIGN PATENT DOCUMENTS

DE 3320866 A1 12/1984
EP 1265660 B1 11/2005
(Continued)

OTHER PUBLICATIONS

English language abstract and machine-assisted English translation for DE 33 20 866 extracted from espacenet.com database on Nov. 1, 2018, 10 pages.
(Continued)

*Primary Examiner* — Erez Gurari
(74) *Attorney, Agent, or Firm* — Howard & Howard Attorneys PLLC

(57) ABSTRACT

A patient transport apparatus comprises a support structure. The support structure comprises a base, a frame, and a patient support surface to support a patient. One or more handle assemblies are coupled to the frame to maneuver the patient transport apparatus. The handle assemblies comprise one or more handles to be manipulated by a user. The handles are capable of being adjusted to facilitate maneuvering of the patient transport apparatus, such as pushing/pulling the patient transport apparatus along a floor surface, lifting the patient transport apparatus over obstacles, loading the patient transport apparatus into an emergency vehicle, and/or unloading the patient transport apparatus from the emergency vehicle.

20 Claims, 69 Drawing Sheets

Related U.S. Application Data continuation of application No. 16/950,221, filed on Nov. 17, 2020, now Pat. No. 11,399,993, which is a continuation of application No. 16/458,974, filed on Jul. 1, 2019, now Pat. No. 10,869,791, which is a continuation of application No. 15/939,794, filed on Mar. 29, 2018, now Pat. No. 10,369,063.

(60) Provisional application No. 62/610,594, filed on Dec. 27, 2017, provisional application No. 62/478,651, filed on Mar. 30, 2017.

(51) Int. Cl.
*A61G 5/10* (2006.01)
*A61G 7/05* (2006.01)

(56) References Cited

U.S. PATENT DOCUMENTS

| | | | | |
|---|---|---|---|---|
| 5,388,294 | A | 2/1995 | Reeder | |
| 5,630,521 | A | 5/1997 | Waddell et al. | |
| 5,806,111 | A | 9/1998 | Heimbrock et al. | |
| 5,987,673 | A | 11/1999 | Smith | |
| 6,193,033 | B1 | 2/2001 | Sadow et al. | |
| 6,224,156 | B1 | 5/2001 | Fleigle | |
| 6,296,265 | B1 | 10/2001 | Lovins | |
| 6,533,086 | B1 | 3/2003 | Waddell et al. | |
| 6,968,584 | B1 | 11/2005 | Lafleche | |
| 7,530,412 | B2 | 5/2009 | Heimbrock et al. | |
| 7,805,786 | B2 | 10/2010 | Lambarth | |
| 7,962,981 | B2 | 6/2011 | Lemire et al. | |
| 8,286,767 | B2 | 10/2012 | Malinowski | |
| 9,486,373 | B2 | 11/2016 | Lambarth et al. | |
| 9,510,981 | B2 | 12/2016 | Lambarth et al. | |
| 9,758,184 | B1 | 9/2017 | Vaverek | |
| 10,369,063 | B2 | 8/2019 | Matheny et al. | |
| 10,869,791 | B2 | 12/2020 | Matheny et al. | |
| 11,399,993 | B2 | 8/2022 | Matheny et al. | |
| 11,890,235 | B2 * | 2/2024 | Brubaker | A61G 1/02 |
| 2004/0034935 | A1 | 2/2004 | Ferneau et al. | |
| 2004/0232660 | A1 | 11/2004 | Chen | |
| 2008/0203687 | A1 | 8/2008 | Meyers et al. | |
| 2009/0039666 | A1 | 2/2009 | Lambarth | |
| 2009/0188731 | A1 | 7/2009 | Zerhusen et al. | |
| 2010/0257673 | A1 | 10/2010 | Linares | |
| 2011/0046588 | A1 | 2/2011 | Jensen et al. | |
| 2011/0083272 | A1 | 4/2011 | Childs et al. | |
| 2011/0087416 | A1 | 4/2011 | Patmore | |
| 2012/0007340 | A1 | 1/2012 | Bar Noy et al. | |
| 2012/0104721 | A1 | 5/2012 | Genest et al. | |
| 2012/0133112 | A1 | 5/2012 | Myrant | |
| 2013/0076005 | A1 | 3/2013 | McDade | |
| 2013/0168987 | A1 | 7/2013 | Valentino et al. | |
| 2014/0037365 | A1 | 2/2014 | Moran | |
| 2014/0197654 | A1 | 7/2014 | Valentino et al. | |
| 2015/0164722 | A1 | 6/2015 | Roussy et al. | |
| 2016/0177977 | A1 | 6/2016 | Patmore et al. | |
| 2016/0213538 | A1 | 7/2016 | Salus | |
| 2017/0071806 | A1 | 3/2017 | Graves et al. | |
| 2017/0079434 | A1 | 3/2017 | Paul et al. | |
| 2017/0334474 | A1 | 11/2017 | Bowman et al. | |
| 2018/0280212 | A1 * | 10/2018 | Matheny | A61G 1/048 |
| 2019/0183702 | A1 * | 6/2019 | Derenne | A61G 7/08 |
| 2019/0321244 | A1 | 10/2019 | Matheny et al. | |
| 2020/0000655 | A1 | 1/2020 | Brubaker et al. | |
| 2020/0113752 | A1 | 4/2020 | Rowland et al. | |
| 2020/0155381 | A1 * | 5/2020 | Van Loon | B60B 33/0092 |
| 2020/0155382 | A1 * | 5/2020 | Van Loon | A61G 1/0287 |
| 2020/0155384 | A1 * | 5/2020 | Derenne | A61G 1/0268 |
| 2021/0030606 | A1 * | 2/2021 | Xu | A61G 1/04 |
| 2021/0069037 | A1 | 3/2021 | Matheny et al. | |
| 2021/0196532 | A1 * | 7/2021 | Desjardins | A61G 1/013 |
| 2021/0196538 | A1 * | 7/2021 | Pfeiffer | A61G 5/0883 |
| 2022/0313509 | A1 | 10/2022 | Matheny et al. | |
| 2023/0017730 | A1 * | 1/2023 | Derenne | A61G 7/05 |
| 2023/0201053 | A1 * | 6/2023 | Pfeiffer | B60B 33/025 280/650 |
| 2024/0180761 | A1 * | 6/2024 | Bazzi | A61G 7/065 |
| 2024/0315896 | A1 * | 9/2024 | Trimble | A61G 5/128 |
| 2024/0342023 | A1 * | 10/2024 | Tumavich, Jr. | A61G 5/066 |
| 2025/0152437 | A1 * | 5/2025 | Tessmer | A61G 5/061 |

FOREIGN PATENT DOCUMENTS

| | | | |
|---|---|---|---|
| WO | 2015106232 | A1 | 7/2015 |
| WO | 2017194038 | A1 | 11/2017 |

OTHER PUBLICATIONS

Erno, "PowerFlexx+ Powered Cot Webpage", http://www.fernoems.com/en/products/ambulance-cots/cots/powerflexx-powere- d-cot.aspx?ec_trk=followlist&ec_trk_data=cots, 2018, 2 pages.
Ferno, "Model 35X Series PROFlexx Users' Manual", Pub. No. 234-3346-02, Aug. 2013 GLO, 35 pages.
Ferno, "POWERFlexx Hydraulic Cot Users' Manual", Pub. No. 234-3310-01, May 2005 GLO, 44 pages.
Ferno, "PowerFlexx+ Powered Cot Webpage", http://www.fernoems.com/en/products/ambulance-cots/cots/powerflexx-powered-cot.aspx?ec_trk=followlist&ec_trk_data=cots, 2018, 2 pages.
Stryker, "MX-PRO Bariatric Transport Cot Model 6083 Operations/Maintenance Manual", Jun. 2010, 109 pages.
Stryker, "MX-PRO Bariatric Transport Specification Sheet", 2013, 1 page.
Stryker, "MX-PRO Bariatric Transport Webpage", www.stryker.com/en/ems/products/mx-pro-bariatric-transport.html, 2017, 2 pages.
Stryker, "MX-PRO R3 Ambulance Cot Model 6082 Rugged Operations/Maintenance Manual", Feb. 2008, 115 pages.
Stryker, "MX-PRO R3 Webpage", www.stryker.com/en/ems/products/mx-pro-r3.html, 2017, 2 pages.
Stryker, "Performance-Pro XT Webpage", www.stryker.com/en/ems/products/power-pro-it.html, 2017, 2 pages.
Stryker, "Power-PRO XT, Ref. 6506 Operations Manual", Jun. 2015, 238 pages.
Stryker, "Power-Pro IT Model 6510 Operations/Maintenance Manual", Nov. 2008, 128 pages.
Stryker, "Power-Pro IT Webpage", www.stryker.com/en/ems/products/performance-pro-xt.html, 2017, 2 pages.

* cited by examiner

PATIENT TRANSPORT APPARATUS WITH ADJUSTABLE HANDLES

CROSS-REFERENCE TO RELATED APPLICATIONS

This application is a Continuation of U.S. patent application Ser. No. 17/847,425 filed on Jun. 23, 2022, which is a Continuation of U.S. patent application Ser. No. 16/950,221 filed on Nov. 17, 2020 and Issued as U.S. Pat. No. 11,399,993 on Aug. 2, 2022, which is a Continuation of U.S. patent application Ser. No. 16/458,974 filed on Jul. 1, 2019 and issued as U.S. Pat. No. 10,869,791 on Dec. 22, 2020, which is a Continuation of U.S. patent application Ser. No. 15/939,794 filed on Mar. 29, 2018 and issued as U.S. Pat. No. 10,369,063 on Aug. 6, 2019, which claims the benefit of and priority to U.S. Provisional Patent Application No. 62/478,651 filed on Mar. 30, 2017, and U.S. Provisional Patent Application No. 62/610,594 filed on Dec. 27, 2017. The disclosures and contents of each of these applications are hereby incorporated herein by reference in their entirety.

BACKGROUND

Patient transport apparatuses facilitate care of patients in a health care setting. Patient transport apparatuses comprise, for example, hospital beds, stretchers, cots, wheelchairs, and chairs. A conventional patient transport apparatus comprises a support structure having a base, a frame, and a patient support surface upon which the patient is supported. The patient transport apparatus may also comprise a lift device arranged to lift and lower the patient support surface relative to a floor surface. Handles on the frame facilitate maneuvering of the patient transport apparatus.

Occasionally, when the patient support surface has been lowered via the lift device to its lowest height, the handles are difficult to reach and/or are difficult to apply leverage to in order to maneuver the patient transport apparatus. Furthermore, users of varying heights may be maneuvering the same patient transport apparatus, which can result in some users grasping and/or otherwise manipulating the handles in awkward ways to maneuver the patient transport apparatus.

A patient transport apparatus with one or more handles designed to overcome one or more of the aforementioned challenges is desired.

DETAILED DESCRIPTION

Figure 1:
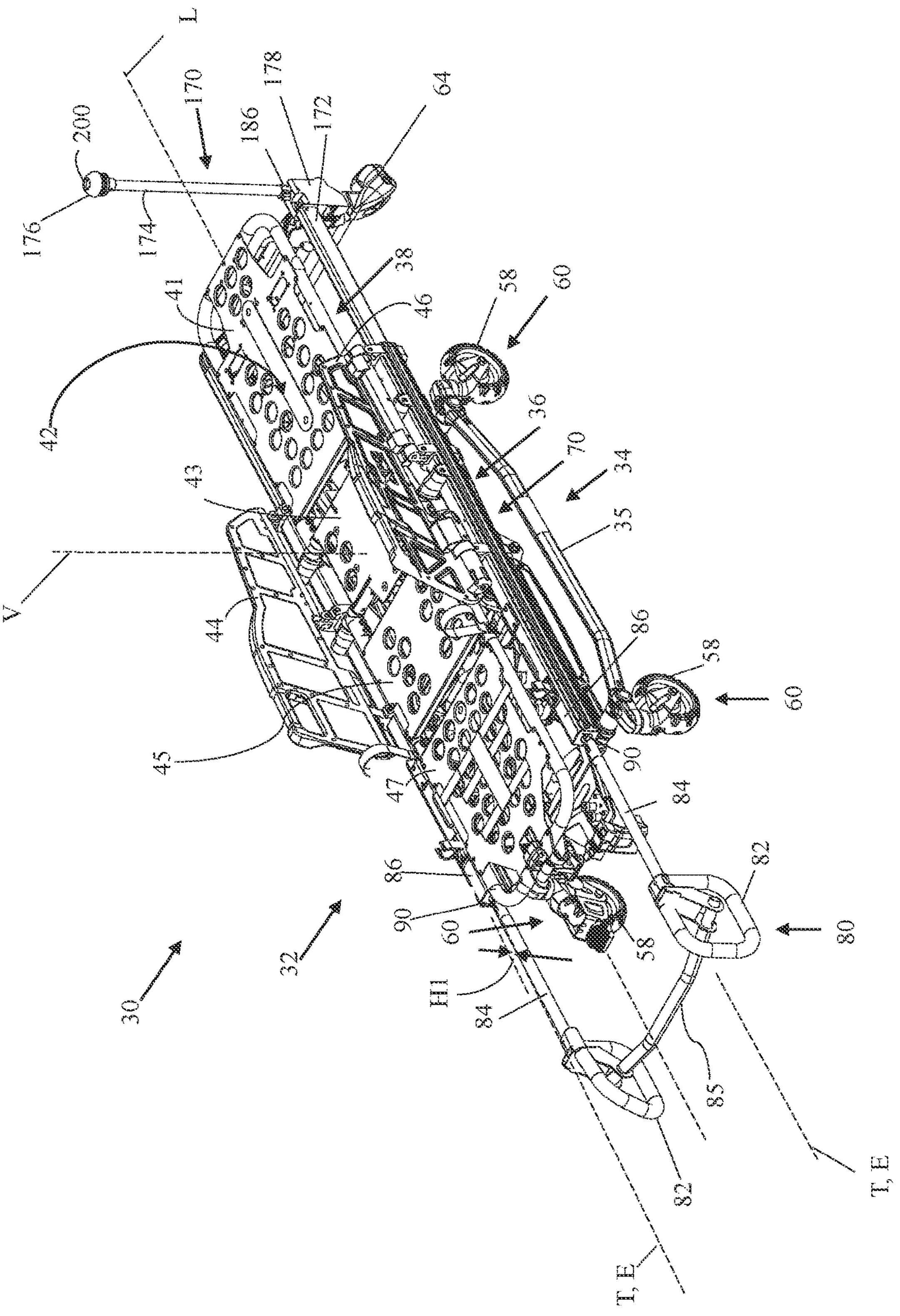
FIG. 1 is a perspective view of a patient transport apparatus at its lowest height with a first handle assembly in an extended position and in a first orientation and a second handle assembly in an upright orientation.

Referring to FIG. 1, a patient transport apparatus 30 is shown for supporting a patient in a health care setting. The patient transport apparatus 30 may comprise a hospital bed, stretcher, cot, wheelchair, chair, or similar apparatus utilized in the care of a patient. In the embodiment shown in FIG. 1, the patient transport apparatus 30 comprises a cot that is utilized to transport patients, such as from an emergency site to an emergency vehicle (e.g., an ambulance).

The patient transport apparatus 30 shown in FIG. 1 comprises a support structure 32 that provides support for the patient. The support structure 32 comprises a base 34 and a support frame 36. The base 34 comprises a base frame 35. The support frame 36 is spaced above the base frame 35. The support structure 32 also comprises a patient support deck 38 disposed on the support frame 36. The patient support deck 38 comprises several sections, some of which are capable of articulating relative to the support frame 36, such as a back section 41, a seat section 43, a leg section 45, and a foot section 47. The patient support deck 38 provides a patient support surface 42 upon which the patient is supported.

The base 34, support frame 36, patient support deck 38, and patient support surface 42 each have a head end and a foot end corresponding to designated placement of the patient's head and feet on the patient transport apparatus 30. The support frame 36 comprises a longitudinal axis L along its length from the head end to the foot end. The support frame 36 also comprises a vertical axis V arranged crosswise (e.g., perpendicularly) to the longitudinal axis L along which the support frame 36 is lifted and lowered relative to the base 34. The construction of the support structure 32 may take on any known or conventional design, and is not limited to that specifically set forth above. In addition, a mattress (not shown) may be provided in certain embodiments, such that the patient rests directly on a patient support surface of the mattress while also being supported by the patient support surface 42.

Side rails 44, 46 are coupled to the support frame 36 and thereby supported by the base 34. A right side rail 44 is positioned at a right side of the support frame 36. A left side rail 46 is positioned at a left side of the support frame 36. If the patient transport apparatus 30 is a hospital bed there may be more side rails. The side rails 44, 46 may be fixed to the support frame 36 or may be movable between a raised position in which they block ingress and egress into and out of the patient transport apparatus 30, one or more intermediate positions, and a lowered position in which they are not an obstacle to such ingress and egress. In still other configurations, the patient transport apparatus 30 may not include any side rails.

Wheels 58 are coupled to the base 34 to facilitate transport over floor surfaces. The wheels 58 are arranged in each of four quadrants of the base 34 adjacent to corners of the base frame 35. In the embodiment shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated.

In addition, in some embodiments, the wheels 58 are not caster wheels and may be non-steerable, steerable, non-powered, powered, or combinations thereof. Additional wheels are also contemplated. For example, the patient transport apparatus 30 may comprise four non-powered, non-steerable wheels, along with one or more powered wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient transport apparatus 30. A fifth wheel may also be arranged substantially in a center of the base 34.

A pair of loading wheels 64 may be coupled to the support frame 36 to assist with loading of the patient transport apparatus 30 into the emergency vehicle and unloading of the patient transport apparatus 30 out of the emergency vehicle. In the embodiment shown, the loading wheels 64 are arranged nearer the head end than the foot end, but the loading wheels 64 may be placed in other locations to facilitate loading and/or unloading of the patient transport apparatus 30 into and out of the emergency vehicle, or for other purposes.

A lift device 70 is configured to raise and lower the patient support surface 42 between minimum and maximum heights relative to the floor surface and intermediate heights therebetween. The lift device 70 may be configured to operate in the same manner or a similar manner as the lift mechanisms shown in U.S. Pat. No. 9,486,373 or U.S. Pat. No. 9,510,981, both hereby incorporated by reference in their entirety.

A handle assembly 80 is coupled to the support frame 36. The handle assembly 80 may be located near the foot end, head end, or locations therebetween. The handle assembly 80 is provided to facilitate maneuvering of the patient transport apparatus 30. Such maneuvering includes, for example, pushing and pulling of the patient transport apparatus 30 on its wheels 58 along the floor surface and/or lifting and lowering of the patient transport apparatus 30, such as over bumps or curbs, or when loading the patient transport apparatus 30 into the emergency vehicle or unloading the patient transport apparatus 30 from the emergency vehicle. In other embodiments, the handle assembly 80 may be attached to the base 34, the patient support deck 38, or any other suitable location on the patient transport apparatus 30.

Figure 3:
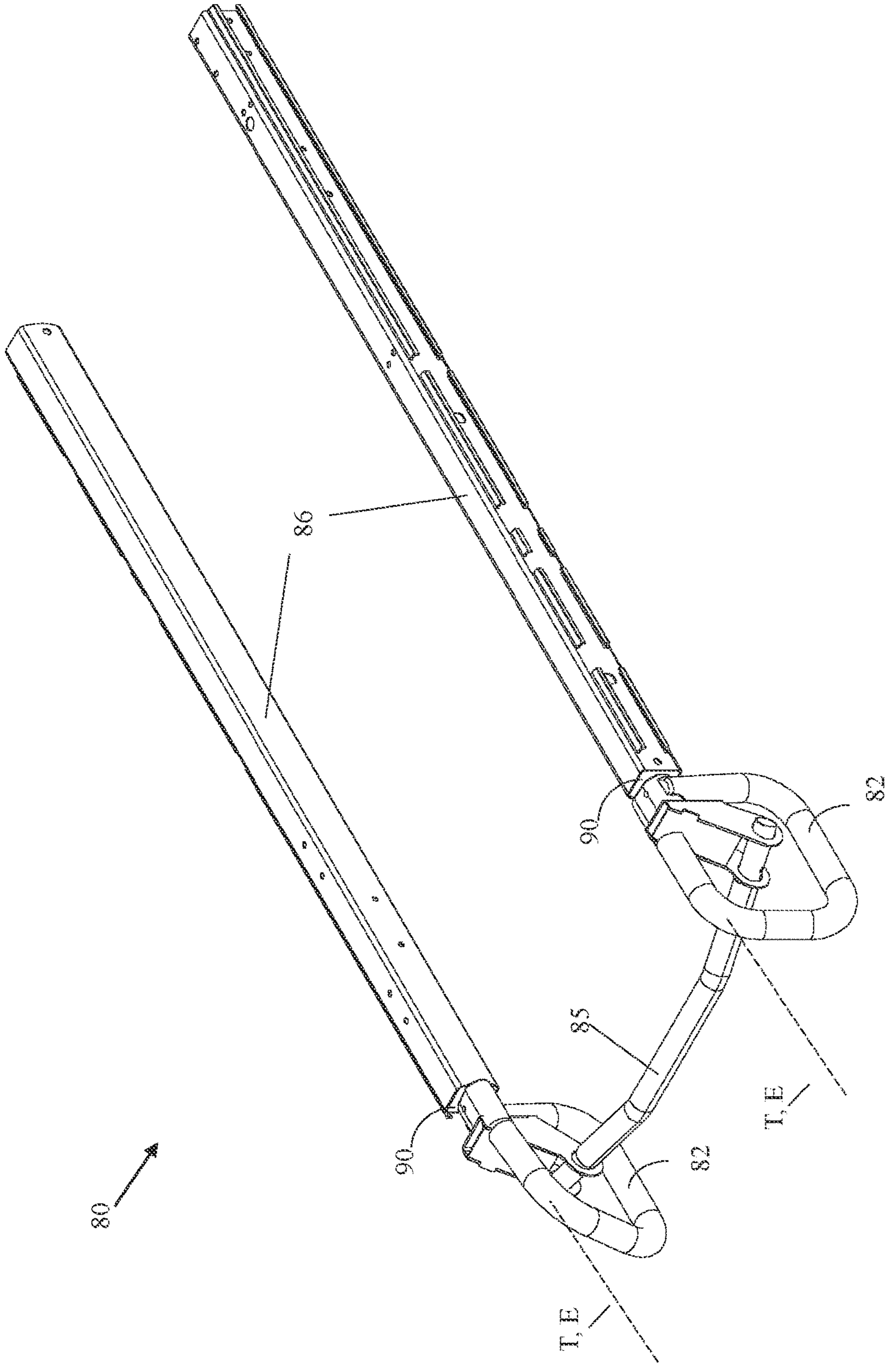
FIG. 3 is a perspective view of the first handle assembly of FIG. 1 in a stowed position within rails of the patient transport apparatus.

The handle assembly 80 comprises one or more adjustable handles 82 configured to be grasped and manipulated by a user to facilitate maneuvering of the patient transport apparatus 30. In the embodiment shown in FIG. 1, the handles 82 are fixed to one or more handle extensions 84. A crossbar 85 is fixed to the handles 82 to space the handles 82 laterally, and can also be used as a handle. It should be appreciated that the handles 82 may be integral with the handle extensions 84, may be part of the handle extensions 84 that are intended to be grasped by users, or may be separate and distinct components that are coupled to the handle extensions 84. The handle assembly 80 is configured to translate relative to the support frame 36 from a stowed position (see FIG. 3) to an extended position as shown in FIG. 1. More specifically, the handle extensions 84 slide in translation within rails 86 of the support frame 36 between the stowed position and the extended position. The rails 86 comprise translation axes T along which the handle extensions 84 slide from the stowed position to the extended position. The handles 82 can be grasped and used at the stowed position, the extended position, or any positions therebetween. As discussed further below, the handles 82 may be lockable at the stowed position, extended position, and one or more positions therebetween, or may be free to slide.

The handles 82 are located adjacent to the support frame 36 in the stowed position and the handles 82 are longitudinally spaced from the support frame 36 by the handle extensions 84 in the extended position. The handles 82 have various uses in each of the stowed position and the extended position. In the stowed position, the handles 82 are conveniently located close to the support frame 36 so that the patient transport apparatus 30 can be easily moved in an elevator or other tight spaces. The handles 82 can be utilized in the stowed position to lift the patient transport apparatus 30. In the extended position, users are able to gain additional leverage when lifting the patient transport apparatus 30 over bumps, curbs, and/or into or out of the emergency vehicle. Users are also able to maintain additional clearance from patients during transport, such as near the patient's feet. Other uses of the handles 82 in the stowed and extended positions, and positions therebetween, are also contemplated.

Figure 2:
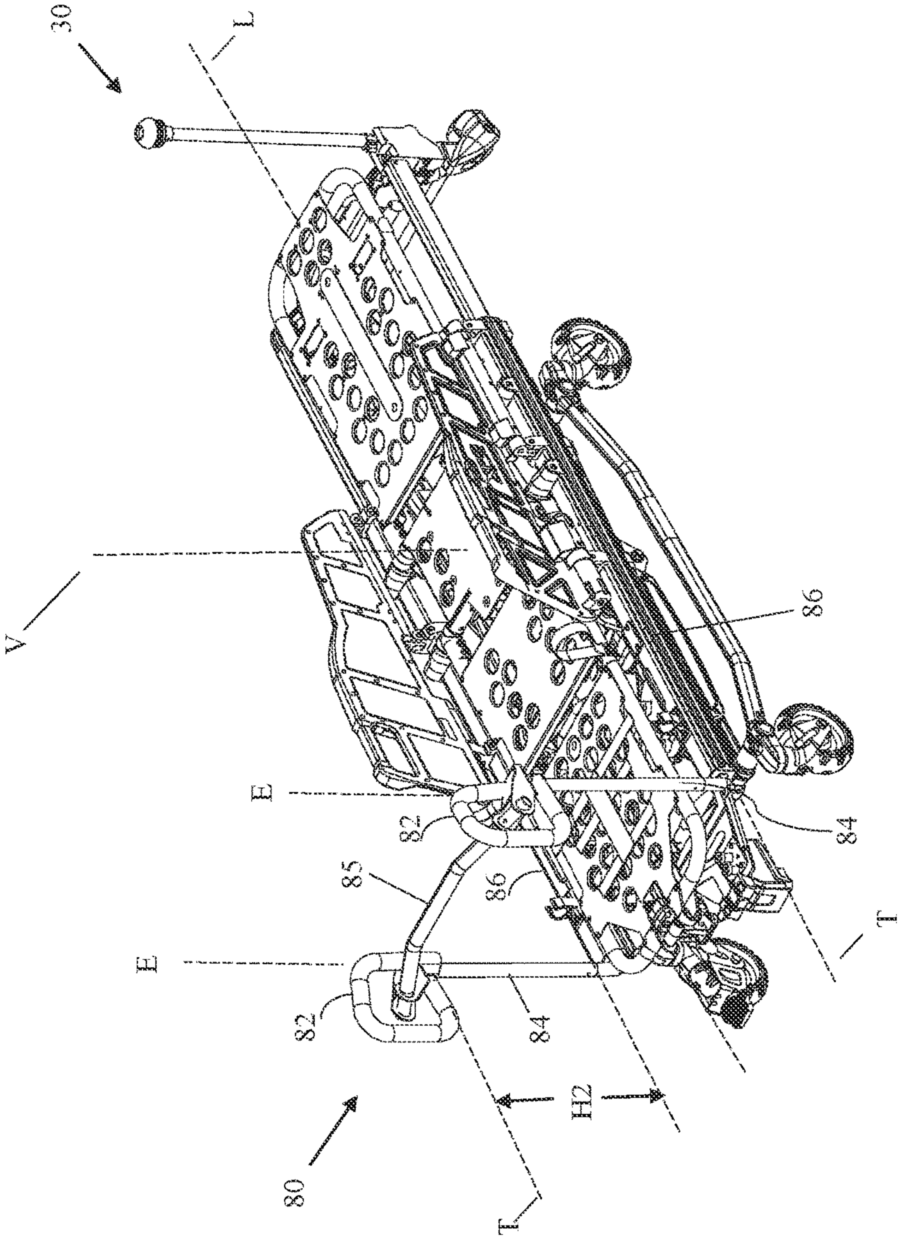
FIG. 2 is a perspective view of the patient transport apparatus of FIG. 1 with the first handle assembly in a second orientation.

The handle extensions 84 are further configured to articulate relative to the support frame 36 from a first orientation as shown in FIG. 1 to a second orientation shown in FIG. 2. In one version, the first orientation comprises an orientation in which the handle extensions 84 are parallel to the associated rails 86 in which they slide. The second orientation comprises an upright orientation relative to the support frame 36, such as one in which the handle extensions 84 are parallel to the vertical axis V and/or perpendicular to the support frame 36. The handle extensions 84 comprise extension axes E parallel with the translation axes T of the rails 86 in the first orientation and transverse to the translation axes T in the second orientation. In the embodiment shown in FIG. 2, the extension axes E are perpendicular to the translation axes T in the upright orientation shown. It should be appreciated that other upright orientations are possible, such as other orientations in which the extension axes E are closer to perpendicular than parallel.

The handles 82 are located at a first height H1 relative to the support frame 36 in the first orientation (FIG. 1) and the handles 82 are located at a second height H2 relative to the support frame 36, greater than the first height, in the second orientation (FIG. 2). The heights H1, H2 can be measured from an uppermost surface of the support frame 36, from the translation axes T, from the patient support surface 42 (when all sections 41, 43, 45, 47 are horizontal), from the floor surface, or from any other suitable location to a closest surface of the handles 82, a center of mass of each of the handles 82, a geometric center of each of the handles 82, or to any other suitable location related to the handles 82. The heights H1, H2 may be measured vertically, parallel to the vertical axis V, or could be measured in other ways, such as normal to the support frame 36, e.g., when the support frame 36 is not horizontally positioned.

As shown in FIG. 1, the first height H1, which is illustrated as being nearly zero (and can be zero in some cases), is measured vertically from the uppermost surface of the support frame 36 when horizontal to an uppermost surface of the handles 82. In FIG. 2, the second height H2 is measured vertically from the same uppermost surface of the support frame 36 to the lowermost surface of the handles 82. Regardless of the way in which the heights are measured, the handles 82 provide users with various advantages at each of the heights. The handles 82 can also be positioned at desired heights to accommodate users of various heights.

In the first orientation, and at the first height H1, the handles 82 could be used to gain leverage and/or provide ergonomic lifting points when lifting the entire patient transport apparatus 30, for instance. In the second orientation, and at the second height H2, the handles 82 are conveniently elevated above the patient support surface 42 of the foot section 47 so that users are able to push/pull the patient transport apparatus 42 along the floor surface without bending over or slouching nearer the patient to reach the handles 82. The second height H2 may provide higher lifting points to ease lifting over bumps, curbs, or other obstacles. For example, the second height H2 may be at least 10, 12, 15, 18, 20, 25 inches, or more. In other embodiments, the second height H2 is greater than 0 inches, but less than 30 inches. In yet other embodiments, the second height H2 is from 10 to 30 inches. Other advantages and uses of the handles 82 in each of the first orientation, first height H1, second orientation, and second height H2 are also contemplated.

Figure 4:
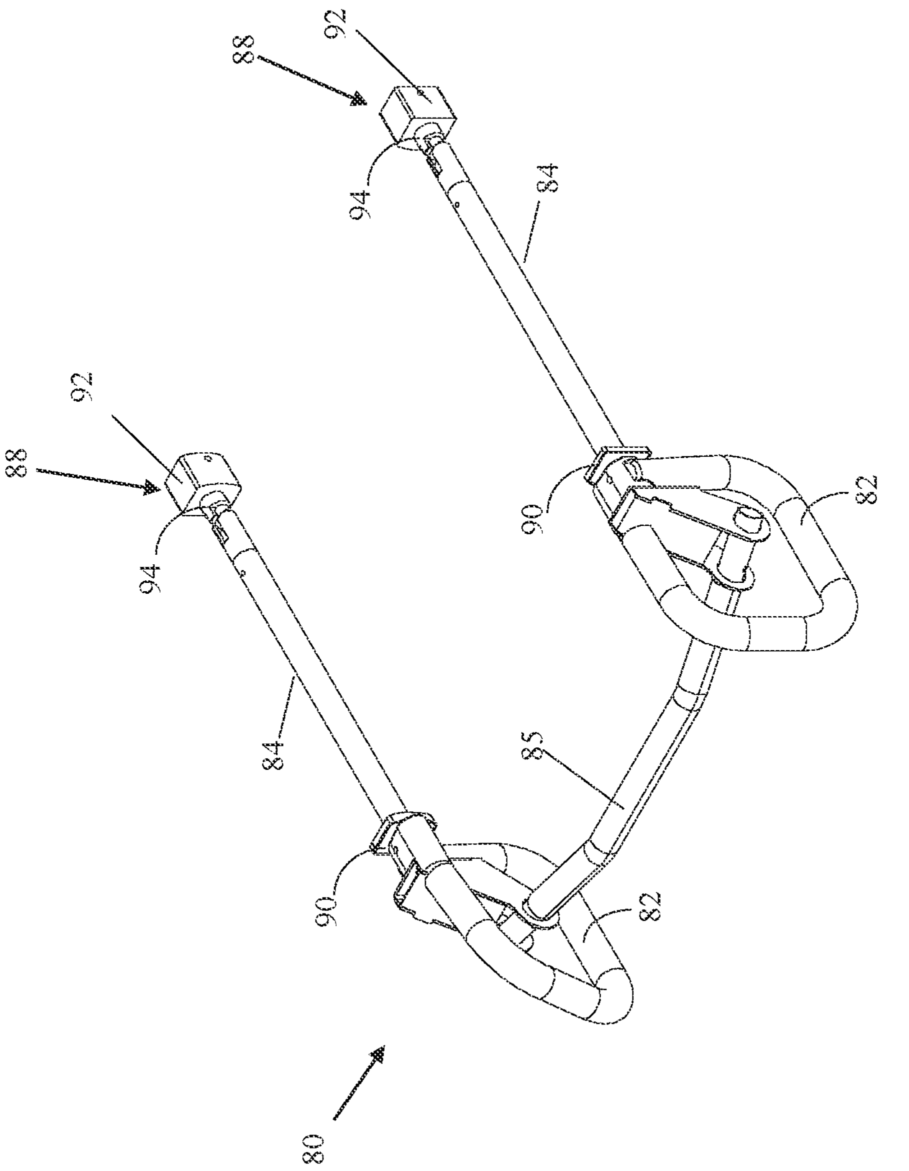
FIG. 4 is a perspective view of the first handle assembly of FIG. 1 illustrated separate from the remainder of the patient transport apparatus (same as FIG. 3, but with rails removed).
Figure 5:
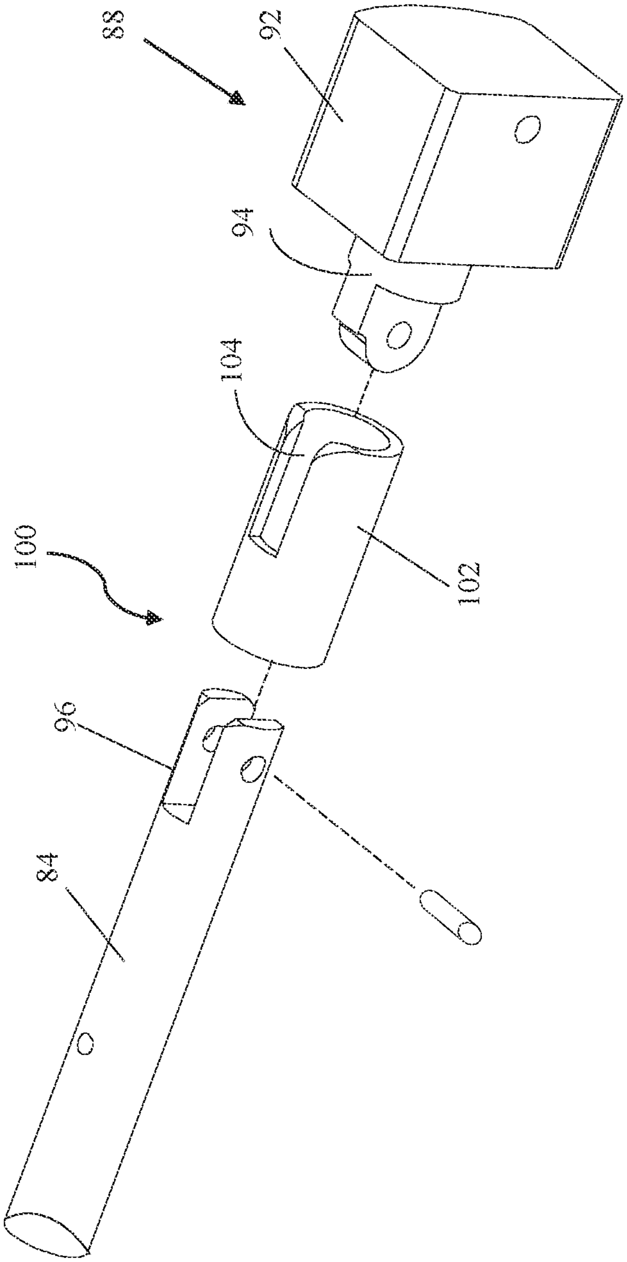
FIG. 5 is an exploded view of a handle extension, slide member, and locking element for the first handle assembly of FIG. 1.

Referring to FIGS. 4 and 5, the handle assembly 80 comprises one or more slide members 88 pivotally connected to the handle extensions 84 to form a joint, such as a pivot joint. The slide members 88 are configured to slide along the translation axes T within the rails 86 from the stowed position to the extended position. The joint is arranged to be disposed inside the rail 86 in the stowed position and thereby constrained by the rail 86 to prevent articulating about the joint. The joint extends outside of the rail 86 in the extended position so that the joint is no longer constrained by the rail 86, thereby enabling articulation about the joint.

A receiver 90 is fixed to a foot end of the rails 86 and comprises a stop for a main body 92 of the slide members 88. Each receiver 90 has an aperture large enough to allow the handle extension 84, which may be elongated and cylindrical in some embodiments, to slide therethrough until the main body 92 of the slide member 88 abuts the receiver 90. The receivers 90 are shown fixed to the rails 86 in FIG. 3 (and for illustration purposes only, the receivers 90 are shown separate from the rails 86 in FIG. 4, although they are fixed to the rails 86 in use). As shown by hidden lines in FIG. 6A, a connector 94 of the slide member 88 also extends past the receiver 90 in the extended position. The handle extension 84 has a corresponding connector 96 (in the form of a clevis in the embodiment shown), that pivotally connects to the slide member 88 at the connector 94 via a pivot pin or other connection device to form the joint.

A locking device 100 is configured to lock the handle assembly 80 relative to the support frame 36 in various handle configurations. The locking device 100 may be capable of locking the handle assembly 80 in the stowed position, the extended position, and/or one or more translation positions therebetween. The locking device 100 may additionally, or alternatively, be capable of locking the handle extensions 84 and/or the handles 82 in the first orientation, the second orientation, and/or one or more orientations therebetween. Further, the locking device 100 may additionally, or alternatively, be capable of locking the handle extensions 84 and/or the handles 82 in one or more rotational positions, in other various handle configurations described herein, and/or in other configurations.

Figure 6A:
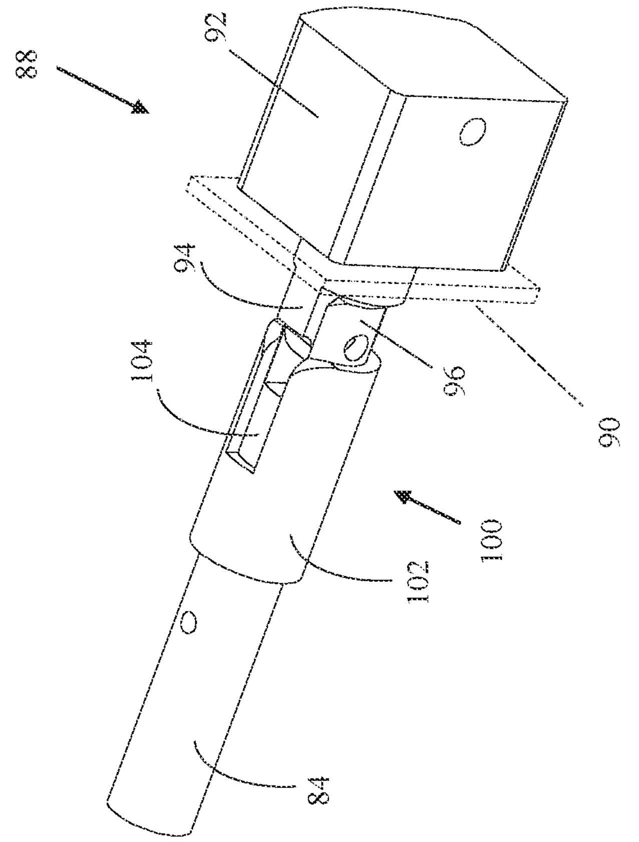
FIG. 6A is an assembled view of the handle extension, slide member, and locking element of FIG. 5 with the locking element in an unlocked position.
Figure 6B:
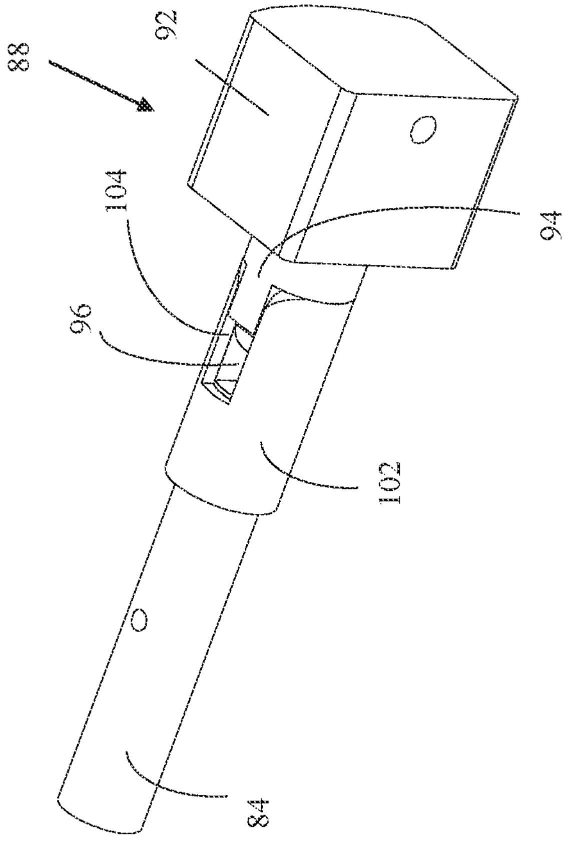
FIG. 6B is an assembled view of the handle extension, slide member, and locking element of FIG. 5 with the handle extension in the first orientation and the locking element in the locked position.
Figure 6C:
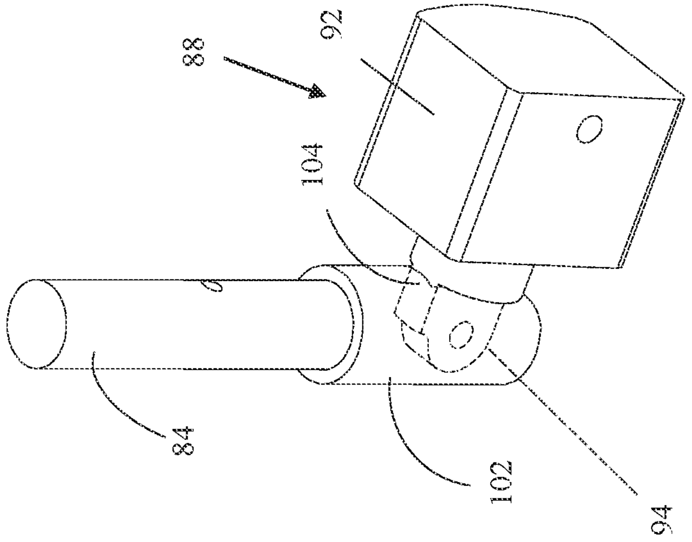
FIG. 6C is an assembled view of the handle extension, slide member, and locking element of FIG. 5 with the handle extension in the second orientation and the locking element in the locked position.

Referring to FIGS. 6A-6C, the locking device 100 in this embodiment comprises a locking element configured to lock the handle extension 84 in the first and/or second orientations, such as in the orientations shown in FIGS. 6B and 6C. In the embodiment of FIGS. 6A-6C, the locking element comprises a lock sleeve 102 having a U-shaped notch 104 formed on one side of the lock sleeve 102 (see also FIG. 5). The lock sleeve 102 is configured to slide along the handle extension 84 from an unlocked position (FIG. 6A) to the locked position. In the locked position, the lock sleeve 102 constrains articulation of the connectors 94, 96 about the joint. See, for example, the locked position shown in FIG. 6C. To reach this locked position, the handle extension 84 is first articulated to the second orientation while the lock sleeve 102 is in the unlocked position (e.g., FIG. 6A). The lock sleeve 102 is then slid along the handle extension 84 and moved to the position shown in FIG. 6C. During this movement, a tongue of the connector 94 (see hidden lines) fits fully and neatly into the notch 104. At the same time, a semi-cylindrical wall of the lock sleeve 102 (extending on either side of the notch 104) abuts a shoulder of the connector 94 to constrain relative pivoting movement of the connectors 94, 96. The handle extension 84 is thereby constrained from pivoting at the joint. Thus, when the user slides the lock sleeve 102 from the unlocked position to the locked position, the lock sleeve 102 acts to constrain articulation (e.g., pivoting) of the handle extension 84 and handle 82.

Figure 7:
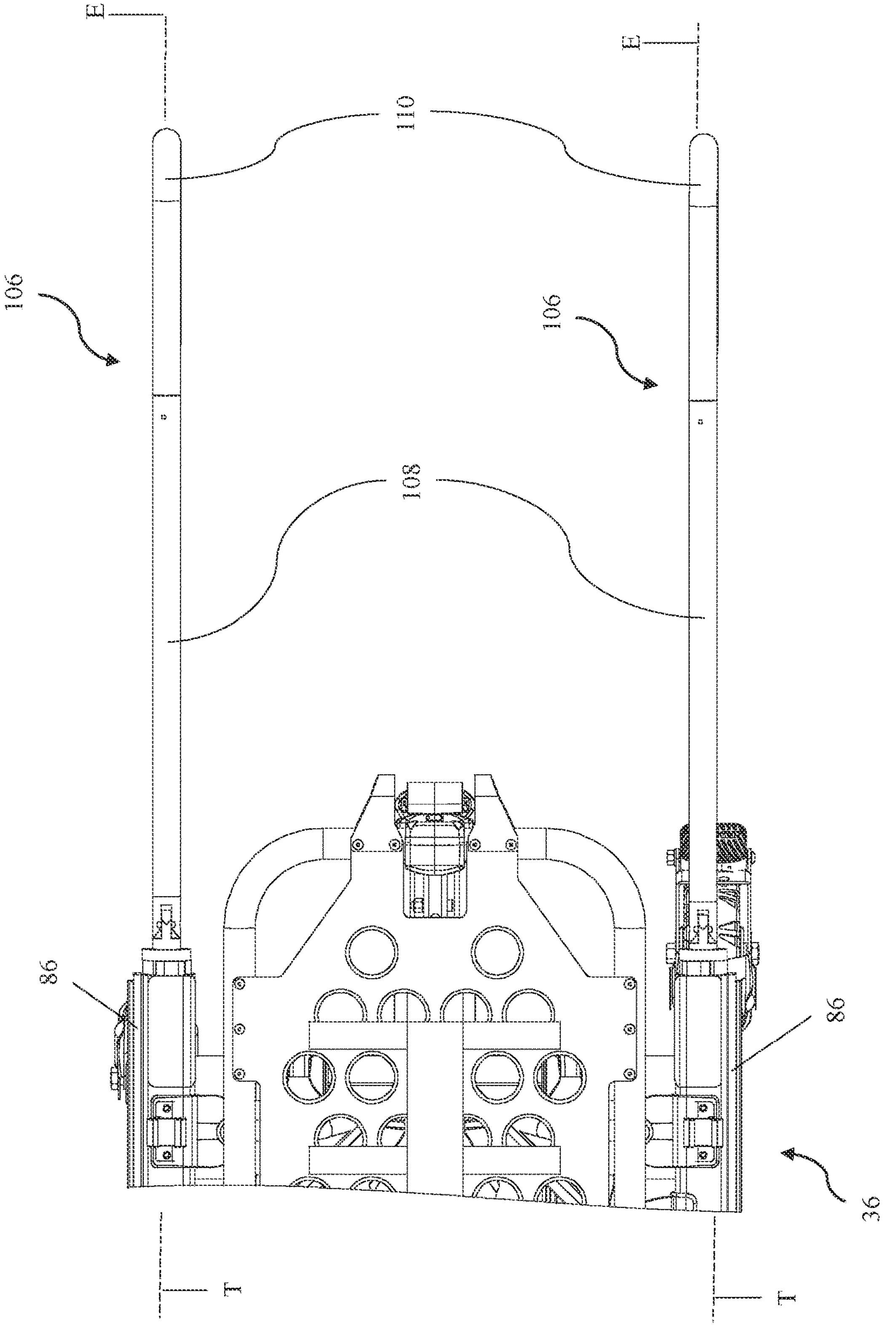
FIG. 7 is a top view of other handle assemblies of the patient transport apparatus.

Alternative handle assemblies 106 are shown in FIG. 7. Each of the handle assemblies 106 comprises a handle extension 108 and handle 110. In this embodiment, there are two separate handle assemblies 106 shown coupled to the support frame 36. However, in other embodiments, only one handle assembly 106 may be present, or additional handle assemblies 106 may be present. By providing two or more separate handle assemblies 106 that are each capable of assuming various configurations independently, the resulting combined handle configurations are numerous and provide additional advantages to users of the patient transport apparatus 30. In the embodiment shown, the handles 110 are capable of moving in one, two, and/or three degrees of freedom, including, for instance, translation, rotation (roll), and/or pitch/yaw. In other embodiments, the handle assemblies 106 may be attached to the base 34, the patient support deck 38, or any other suitable location on the patient transport apparatus 30.

Figure 8:
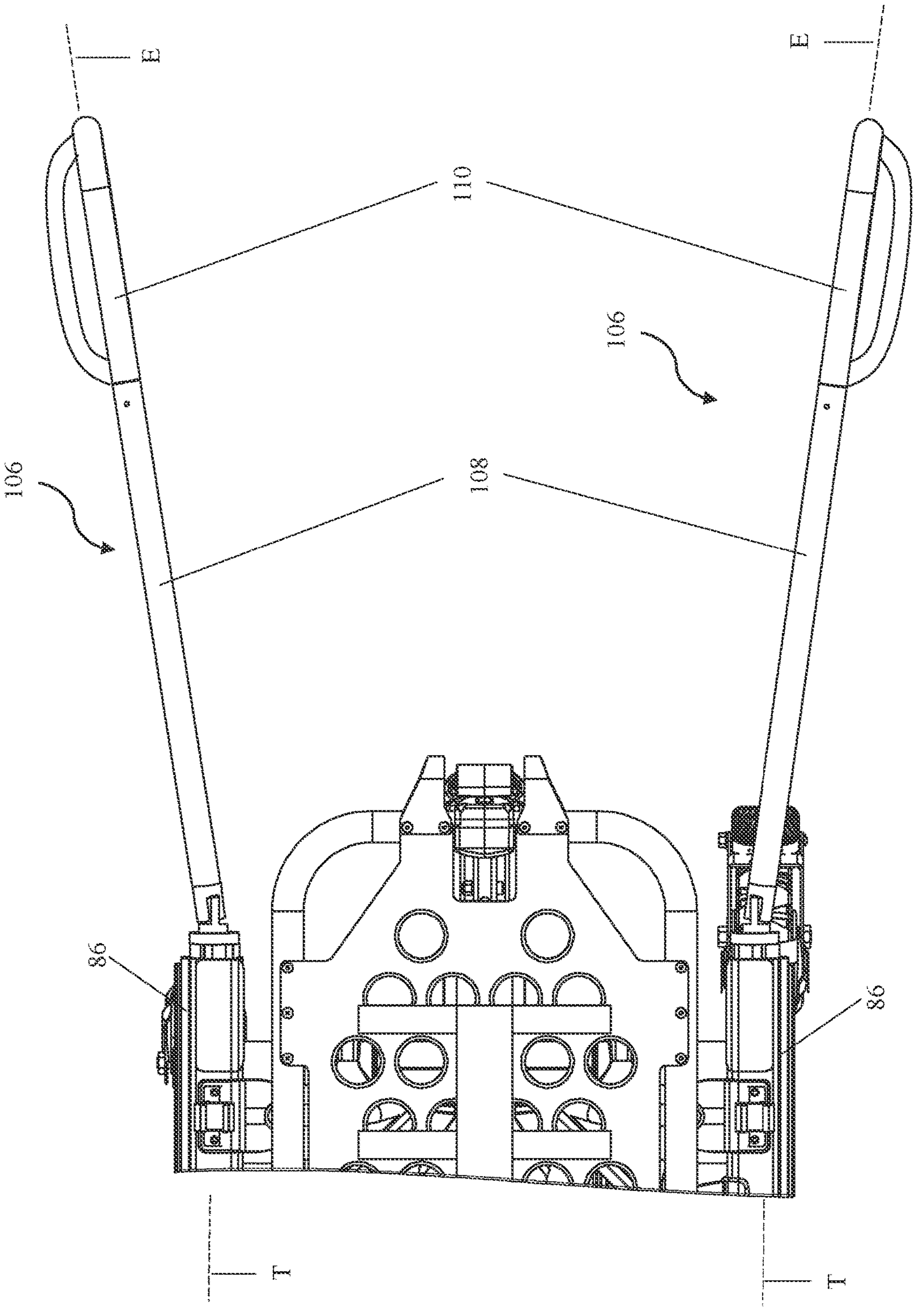
FIG. 8 is a top view of the handle assemblies of FIG. 7 shown in another configuration.

In FIG. 7, the handle assemblies 106 are positioned such that the handle extensions 108 are in extended positions and parallel to the rails 86, with the handles 110 longitudinally spaced from the support frame 36. In FIG. 8, the handle assemblies 106 are both in their extended positions, but also slightly rotated about the translational axes T so that the handle extensions 108 are non-parallel to the rails 86 and the handles 110 are spaced wider apart than in the configuration of FIG. 7. This wider configuration (also referred to as a "wheelbarrow" configuration) may provide additional leverage, make it easier for different users to achieve more comfortable configurations for grasping, or may provide other advantages.

Figure 9:
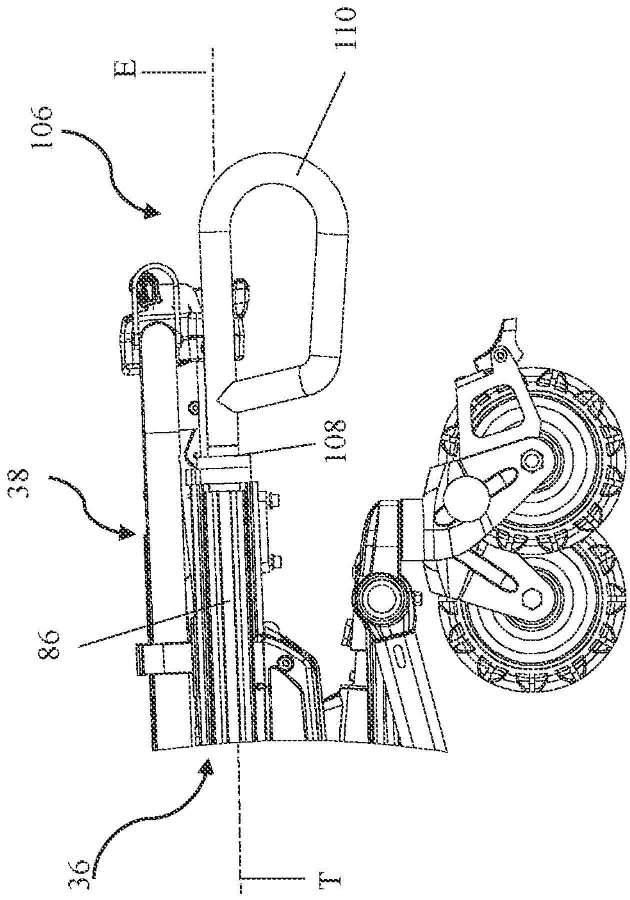
FIG. 9 is an elevational view of one of the handle assemblies of FIG. 7 shown in a stowed position.
Figure 10:
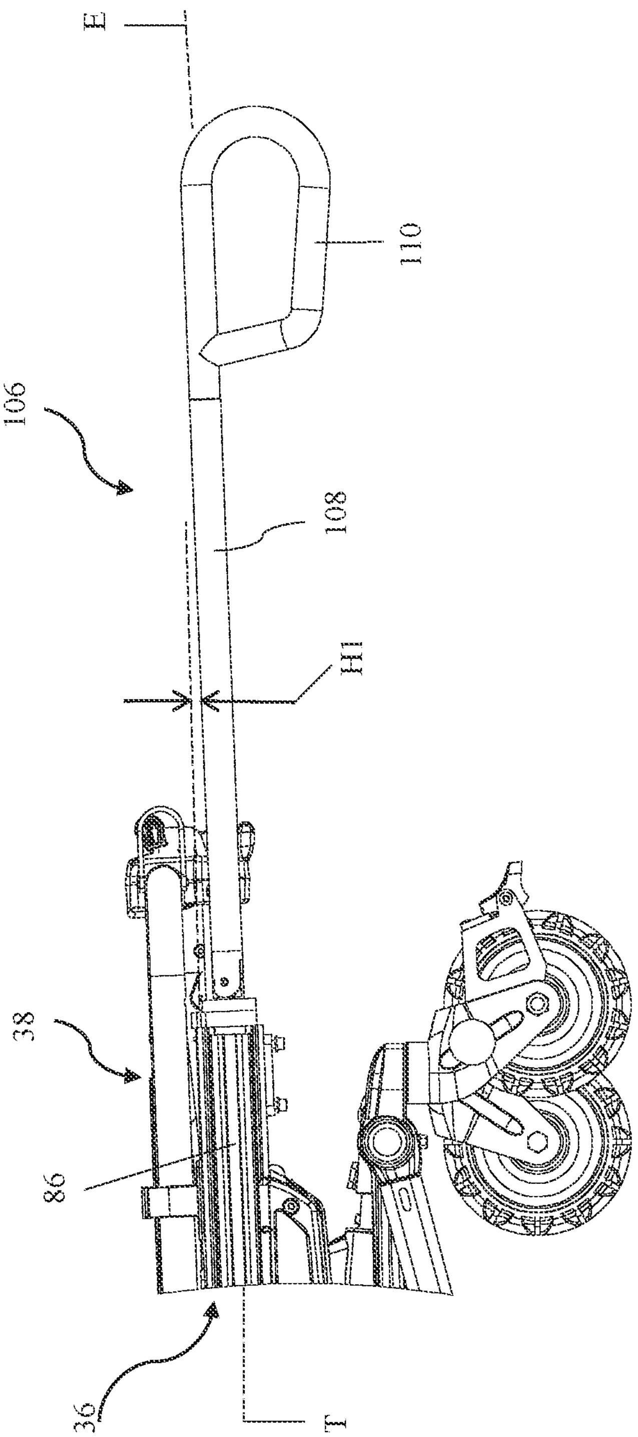
FIG. 10 is an elevational view of the handle assembly of FIG. 9 shown in an extended position in a first orientation.
Figure 11:
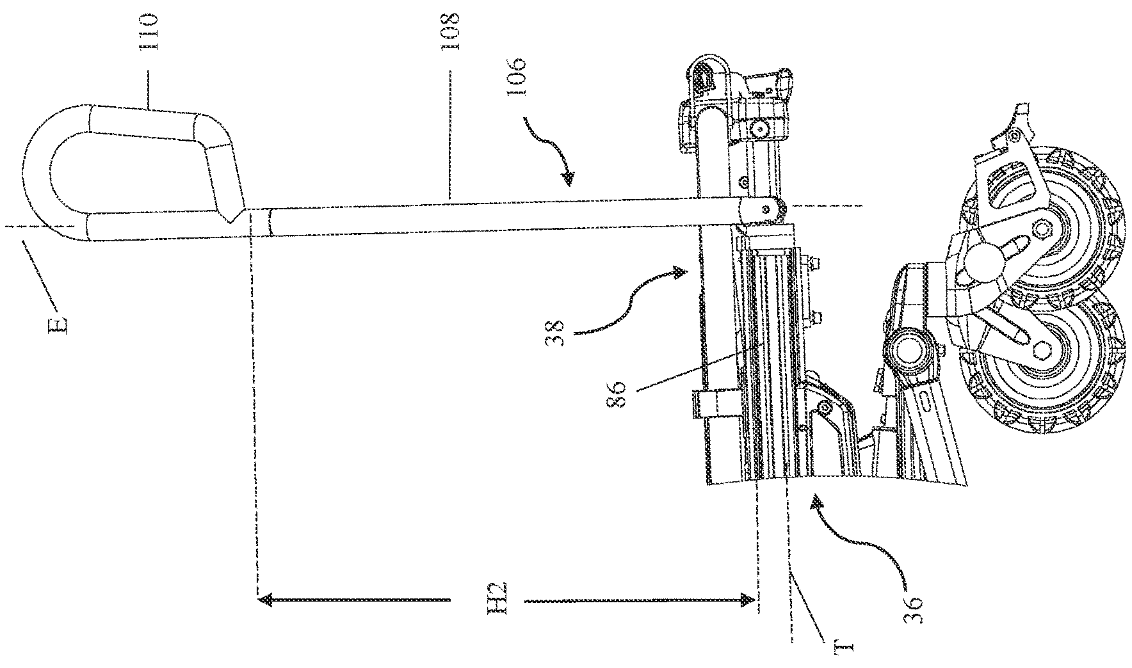
FIG. 11 is an elevational view of the handle assembly of FIG. 10 shown in a second orientation.

In FIG. 9, both the handle assemblies 106 (only one visible) are in their stowed positions with the handles 110 adjacent to the support frame 36. In FIG. 10, both the handle assemblies 106 are in their extended positions with the handles 110 longitudinally spaced from the support frame 36 and located at a first height H1 relative to the support frame 36. In FIG. 11, both the handle assemblies 106 are in the second orientation (e.g., an upright orientation) with the handles 110 spaced at a second height H2 relative to the support frame 36.

Figure 12:
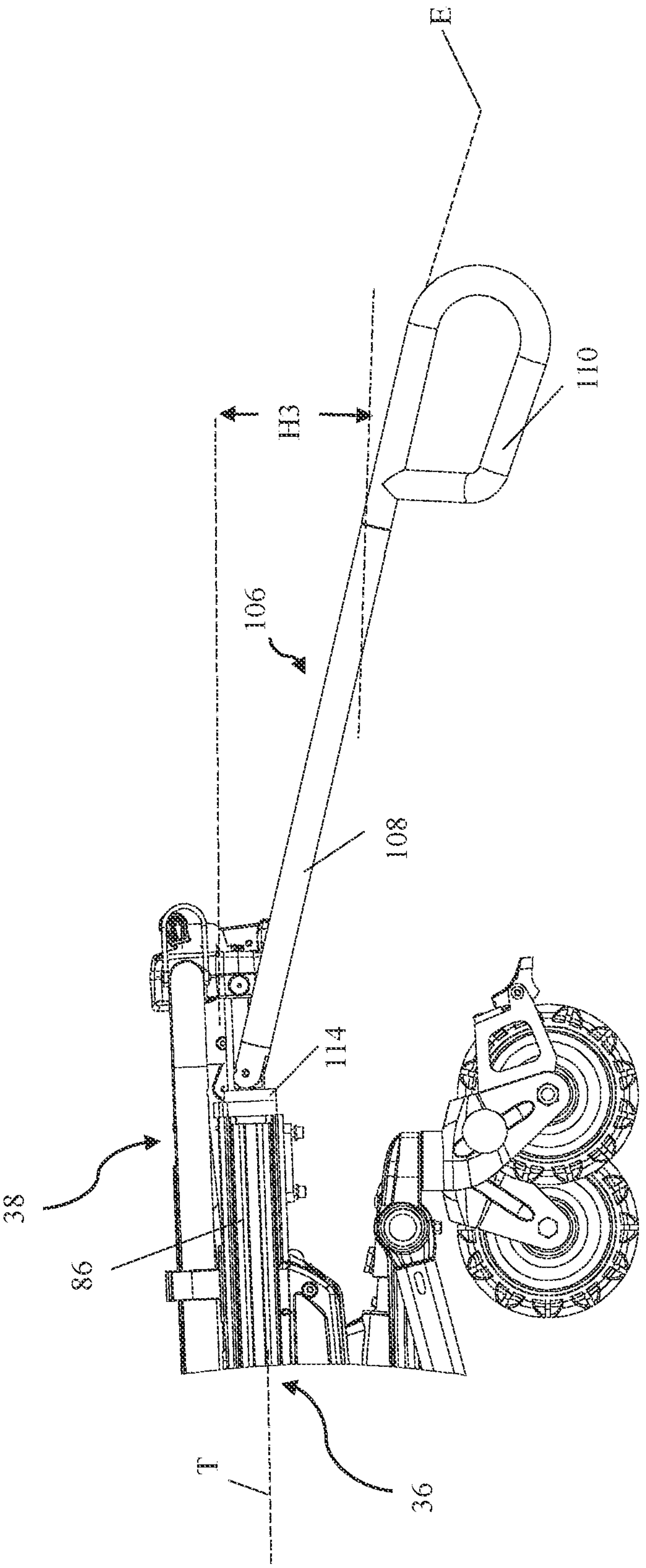
FIG. 12 is an elevational view of the handle assembly of FIG. 10 shown in a third orientation.

In FIG. 12, the handle assemblies 106 are placed at a third orientation, such as one in which the handle extensions 108 are articulated downward toward the floor surface. In this orientation, the handles 110 are located at a third height H3 relative to the support frame 36, different than the first and second heights H1, H2. In this third orientation, the handles 110 may provide additional leverage in lifting the patient transport apparatus 30 when loading and unloading the patient transport apparatus 30 into and out of the emergency vehicle. Notably, the third height H3 is measured downwardly to the handles 110, e.g., below the upper surface of the support frame 36. The third height H3 may be at least 2, 4, 7, 10, 12, 15 inches, or more. Also, it should be appreciated that since the handle assemblies 106 are capable of being independently configured, one of the handle assemblies 106 may be located at the first or second heights H1, H2, while the other handle assembly 106 is located at the third height H3, or the handle assemblies 106 may be located at any combination of heights.

In the embodiment shown in FIGS. 7-12, the handle assemblies 106 are identical. In other embodiments, the handle assemblies 106 may have different components, different shapes, etc. For simplicity, only one of the handle assemblies 106 will be described in detail with respect to FIGS. 13-25.

Figure 14:
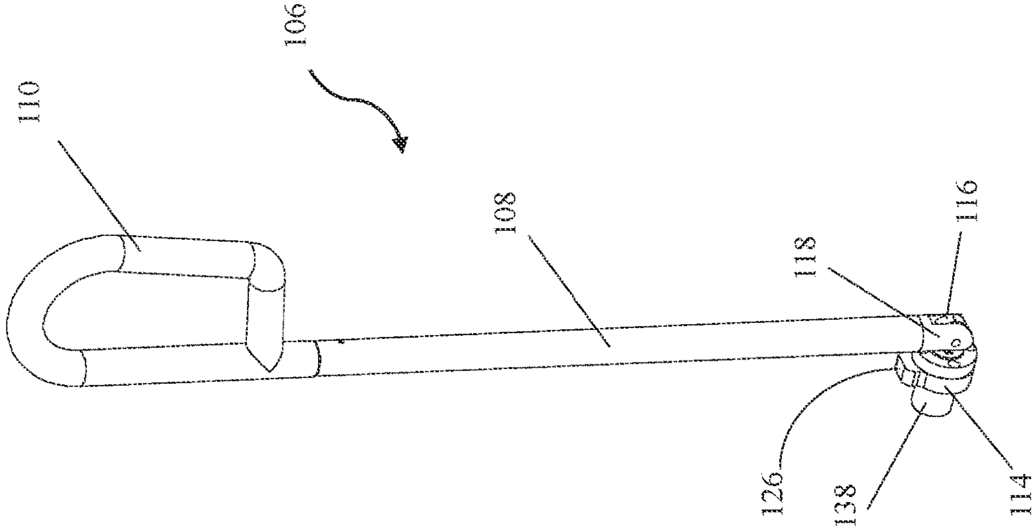
FIG. 14 is another perspective view of the handle assemblies of FIG. 7.
Figure 13:
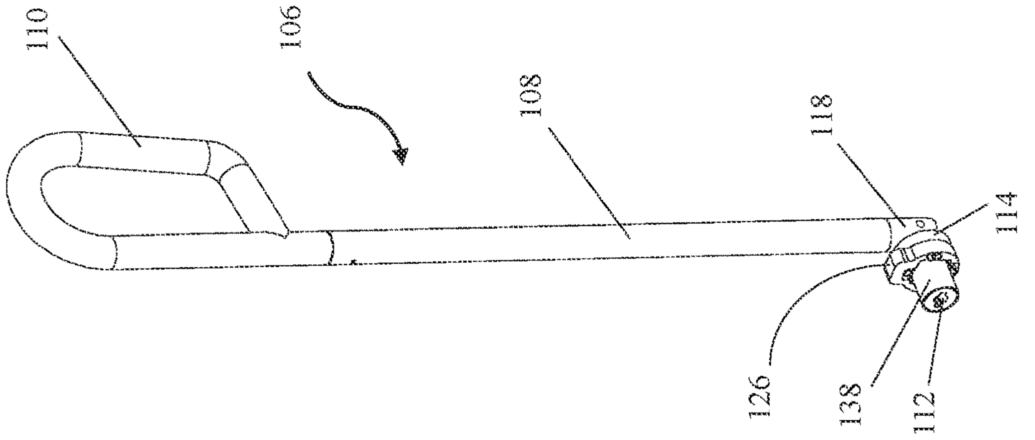
FIG. 13 is a perspective view of the handle assemblies of FIG. 7.
Figure 15:
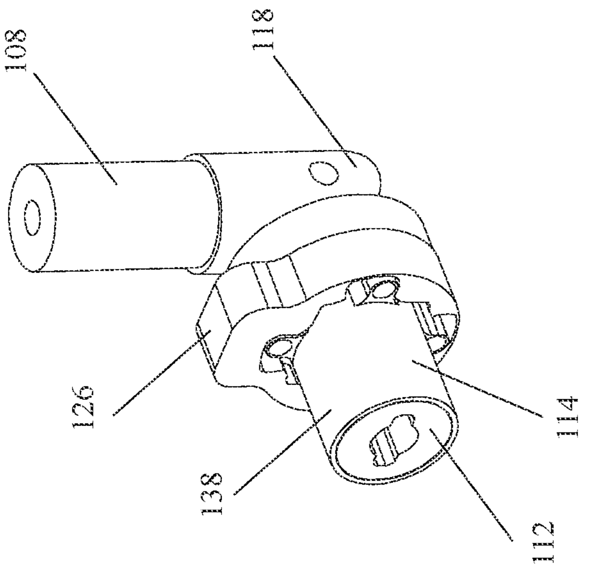
FIG. 15 is a perspective view of a handle extension, slide member, locking device, and actuator for the handle assemblies of FIG. 7.
Figure 17:
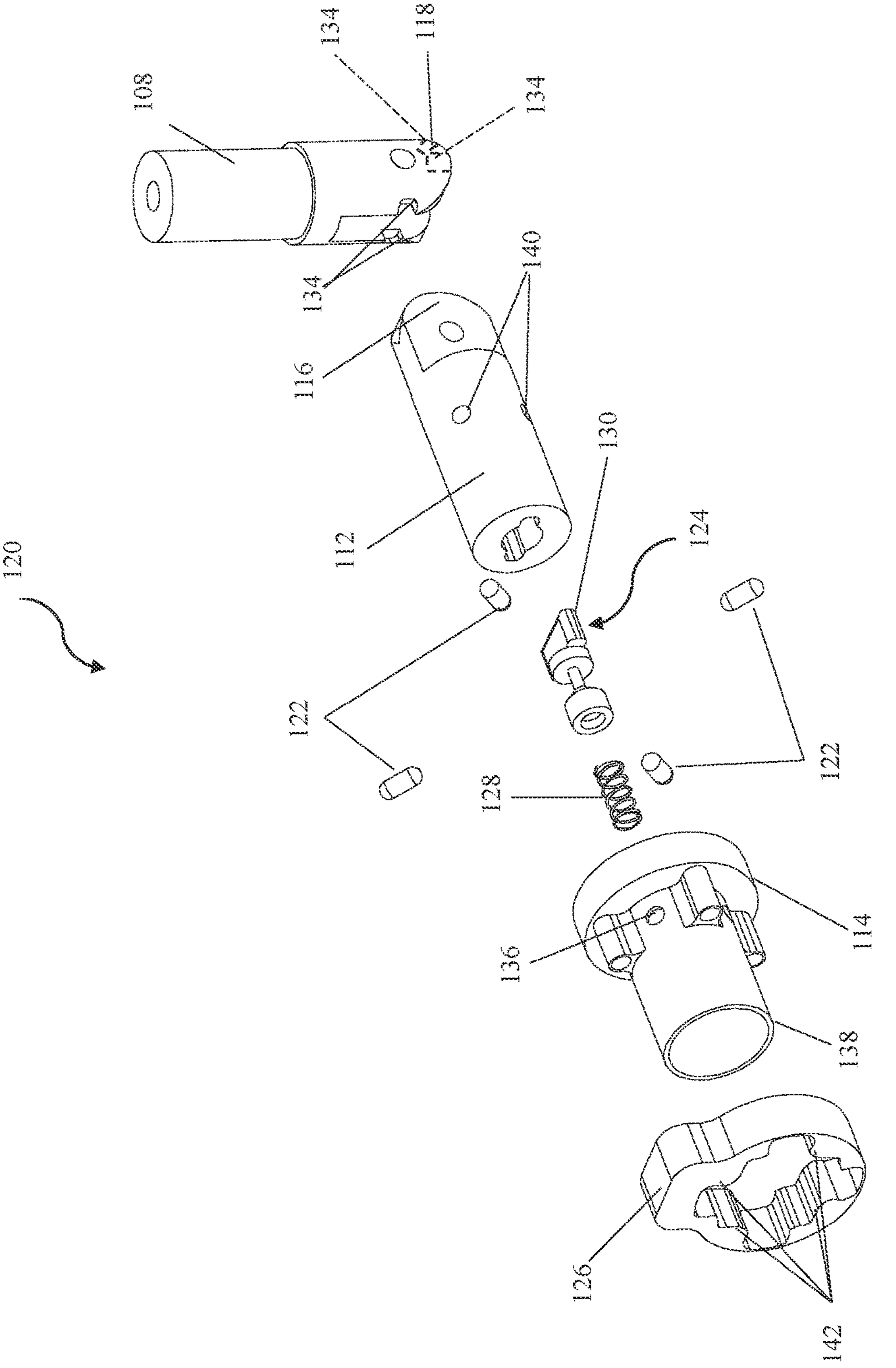
FIG. 17 is an exploded view of the handle extension, slide member, locking device, and actuator of FIG. 15.
Figure 18:
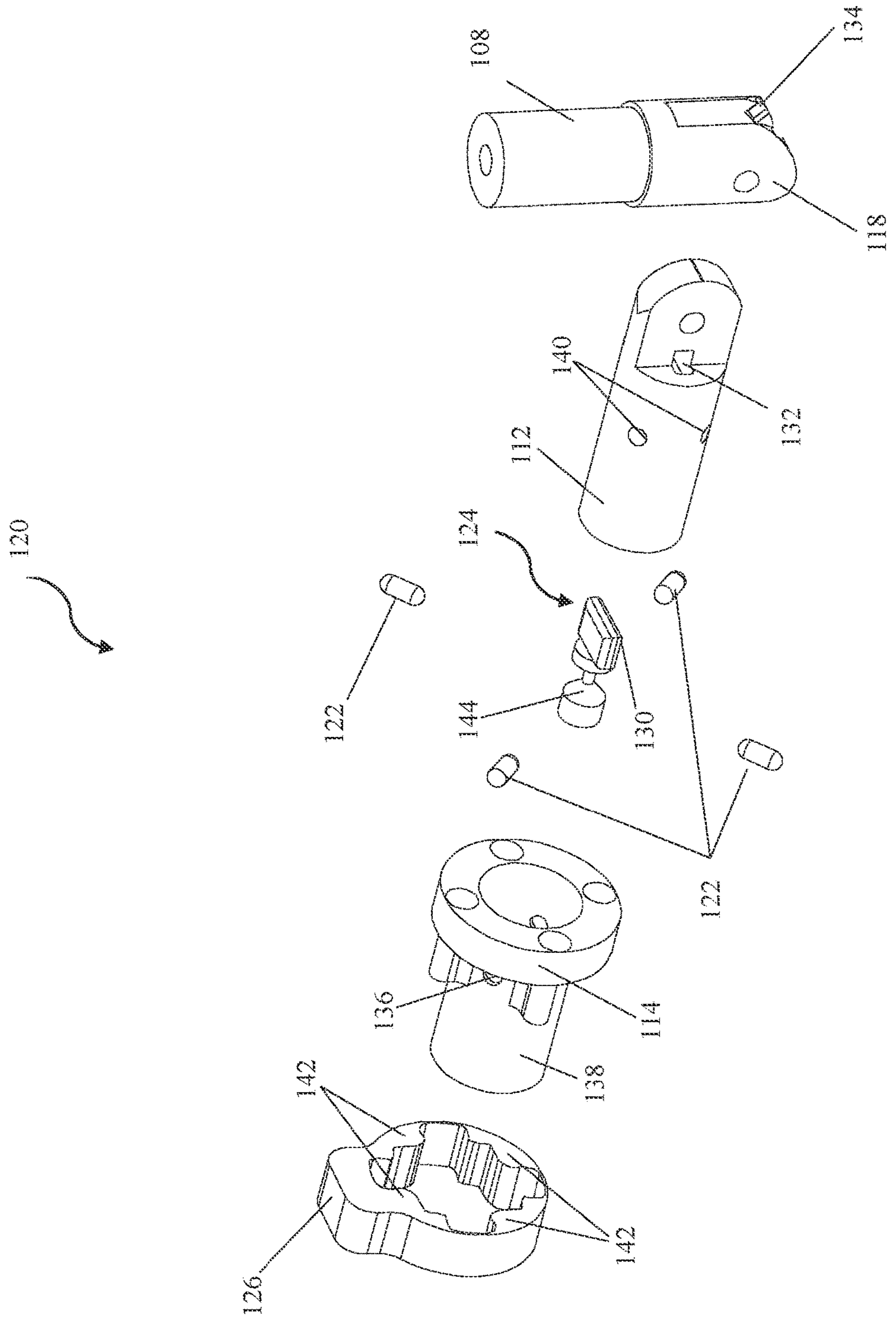
FIG. 18 is another exploded view of the handle extension, slide member, locking device, and actuator of FIG. 15.
Figure 19:
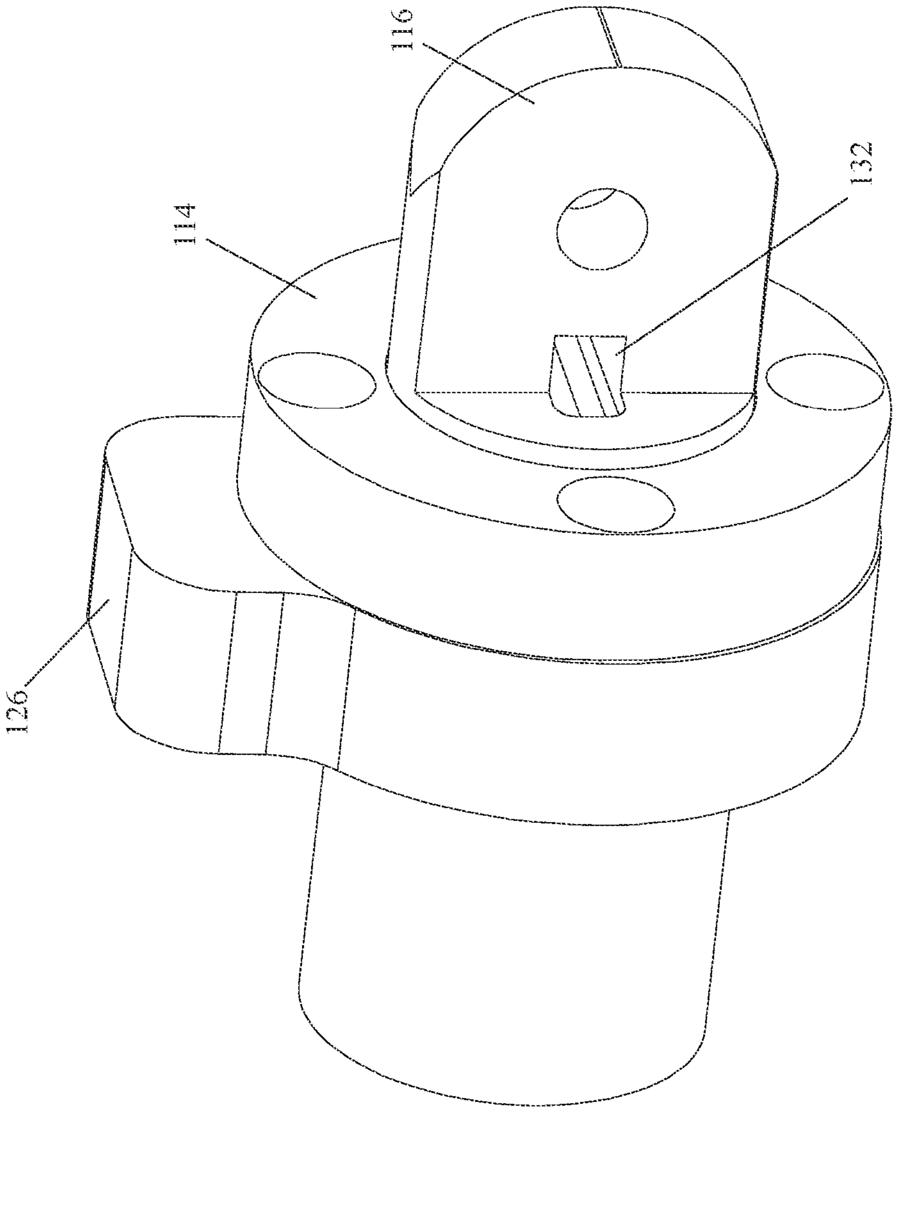
FIG. 19 is an assembled view of the slide member, locking device, and actuator of FIG. 15 (handle extension removed).

Referring to FIGS. 13-15, the handle assembly 106 comprises a slide member 112 pivotally connected to the handle extension 108 to form a pivot joint (see also FIGS. 17, 18). The slide member 112 is configured to slide along the translation axis T within the rail 86 from the stowed position to the extended position. The joint is arranged to be disposed inside the rail 86 in the stowed position and to extend outside of the rail 86 in the extended position.

Figure 16:
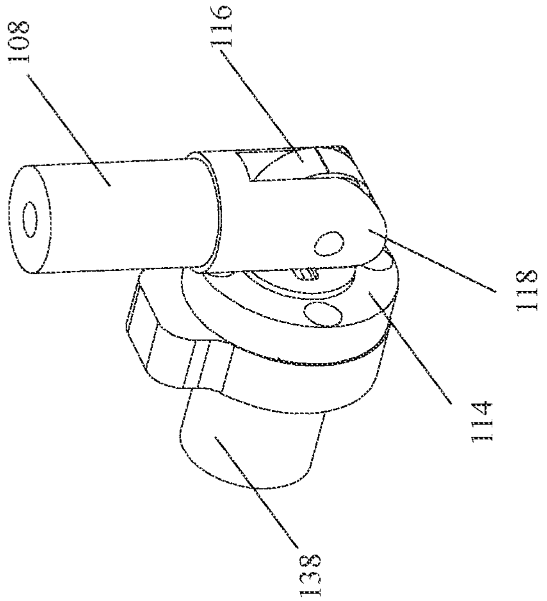
FIG. 16 is another perspective view of the handle extension, slide member, locking device, and actuator of FIG. 15.

A receiver 114 is fixed to an end of the rail 86. The receiver 114 has an aperture large enough to allow the handle extension 108, which is elongated and cylindrical in the embodiment shown, to slide therethrough. The receiver 114 is shown fixed to the rail 86 in FIG. 12 and separated from the rail 86 in FIGS. 13-15. As shown in FIG. 16, a connector 116 of the slide member 112 also extends past the receiver 114 in the extended position. The handle extension 108 has a corresponding connector 118 (in the form of a clevis in the embodiment shown), that pivotally connects to the slide member 112 at the connector 116 via a pivot pin or other connection device to form the joint.

Referring to FIGS. 17-25, the handle assembly 106 further comprises a locking device 120 configured to lock the handle assembly 106 relative to the support frame 36 in various handle configurations. The locking device 120 may be capable of locking the handle assembly 106 in the stowed position, the extended position, and/or one or more translation positions therebetween. The locking device 120 may also be capable of locking the handle extension 108 and the handle 110 in the first orientation, the second orientation, the third orientation, and/or any other orientation. Further, the locking device 120 may additionally be capable of locking the handle extension 108 and the handle 110 in one or more rotational positions.

The locking device 120 in this embodiment comprises several locking elements. For instance, the locking elements may comprise one or more first latches 122 and a second latch 124 (see FIGS. 17, 18). The first latches 122 are configured to lock the handle assembly 106 in various translation and rotational positions. In the embodiment shown, the handle extension 108 is capable of being discretely locked in four rotational positions about the translation axis T, including a first rotational position, a second rotational position, a third rotational position, and a fourth rotational position. These various rotational positions provide rotational adjustment. In this embodiment, the first latches 122 may be configured to discretely lock the handle extension 108 relative to the support frame 36 in fewer or more rotational positions, or may be configured to enable infinite rotational adjustment.

The second latch 124 is configured to lock the handle extension 108 and the handle 110 in various orientations, including in at least the first orientation, second orientation, and third orientation. These various orientations provide pitch and/or yaw adjustment. More specifically, whether the adjustment is a purely pitch adjustment, a purely yaw adjustment, or a combination of pitch and yaw adjustment, is dependent on the rotational position in which the handle extension 108 is locked. For instance, if the handle extension 108 is rotationally locked so that it can only articulate in a plane perpendicular to the floor surface (e.g., a vertical plane), then the orientation adjustment is said to be in pitch (see FIGS. 10-12). If, however, the handle extension 108 is rotationally locked so that it can articulate in a plane acutely oriented relative to the floor surface (see FIG. 8), then the orientation adjustment is a combination of pitch and yaw adjustment. Further, if the handle extension 108 is rotational locked so that it can articulate in a plane parallel to the floor surface (e.g., a horizontal plane), then the orientation adjustment is said to be in yaw (not shown). In other embodiments, the second latch 124 may be configured to discretely lock the handle extension 108 relative to the support frame 36 in fewer or more orientations, or may be configured to enable infinite adjustment of the orientation. The locking elements may also be referred to as rotational locking elements and orientation locking elements, depending on the type of movement they're intended to lock.

One or more actuators 126 are operable to move the latches 122, 124 to unlocked positions. In the embodiment shown, the actuator 126 is capable of simultaneously placing each of the latches 122, 124 in their unlocked positions upon a single actuation from a normal, unactuated state. When actuated, the actuator 126 allows the user to manipulate and move the handle extension 108 between various rotational positions and/or orientations simultaneously until a desired configuration is established. Then, the actuator 126 is released and biased by a biasing device, such as spring 128, back to the unactuated state. In the embodiment shown, the actuator 126 is actuated by rotation about the translation axis T and relative to the receiver 114.

Figure 24:
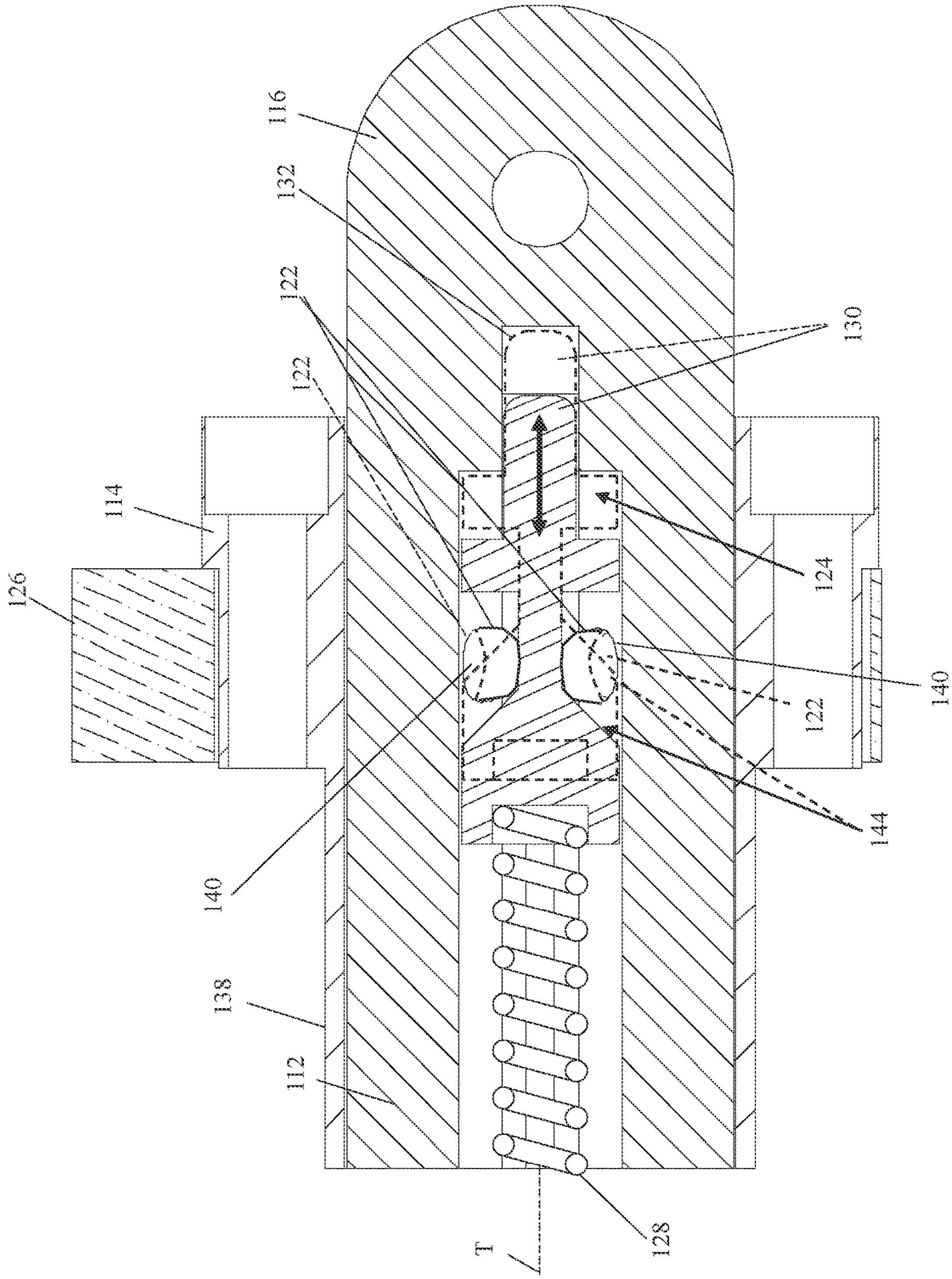
FIG. 24 is a cross-sectional view taken along the line 24-24 in FIG. 23 with locking elements in unlocked positions.
Figure 25:
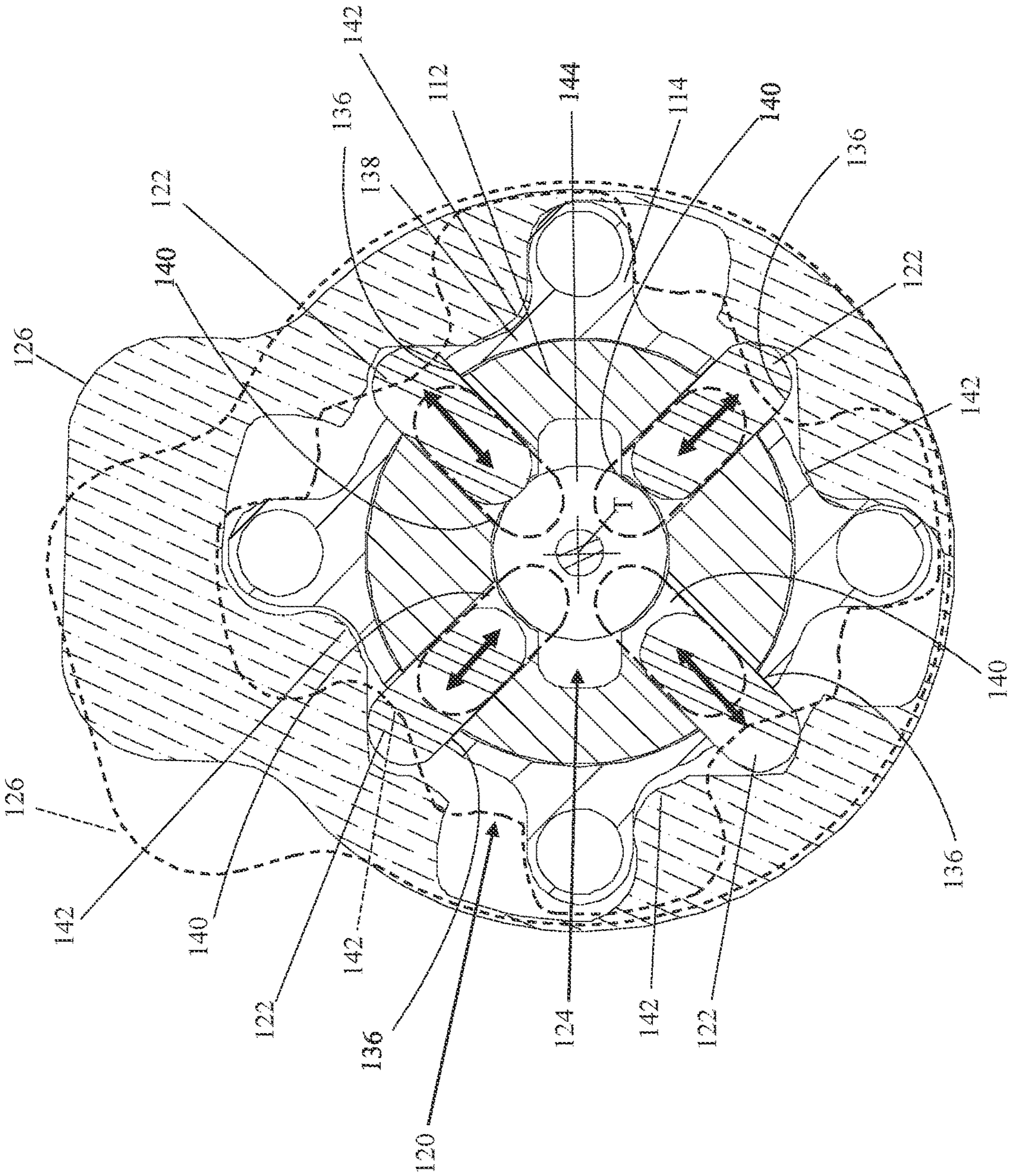
FIG. 25 is a cross-sectional view taken along the line 25-25 in FIG. 23 with the locking elements in locked positions.

Referring to FIGS. 24 and 25 operation of the actuator 126 to unlock the latches 122, 124 is described. FIG. 24 and the hidden lines in FIG. 25 show the actuator 126 in the actuated state with the latches 122, 124 in their unlocked positions. FIG. 25 and the hidden lines in FIG. 24 show the actuator 126 in the unactuated state with the latches 122, 124 in their locked positions. It should be appreciated that other types or configurations of the actuator 126 and the locking device 120, and other ways to lock, unlock, and/or manipulate the handle assemblies 106 are contemplated in addition to those described herein.

Figure 20:
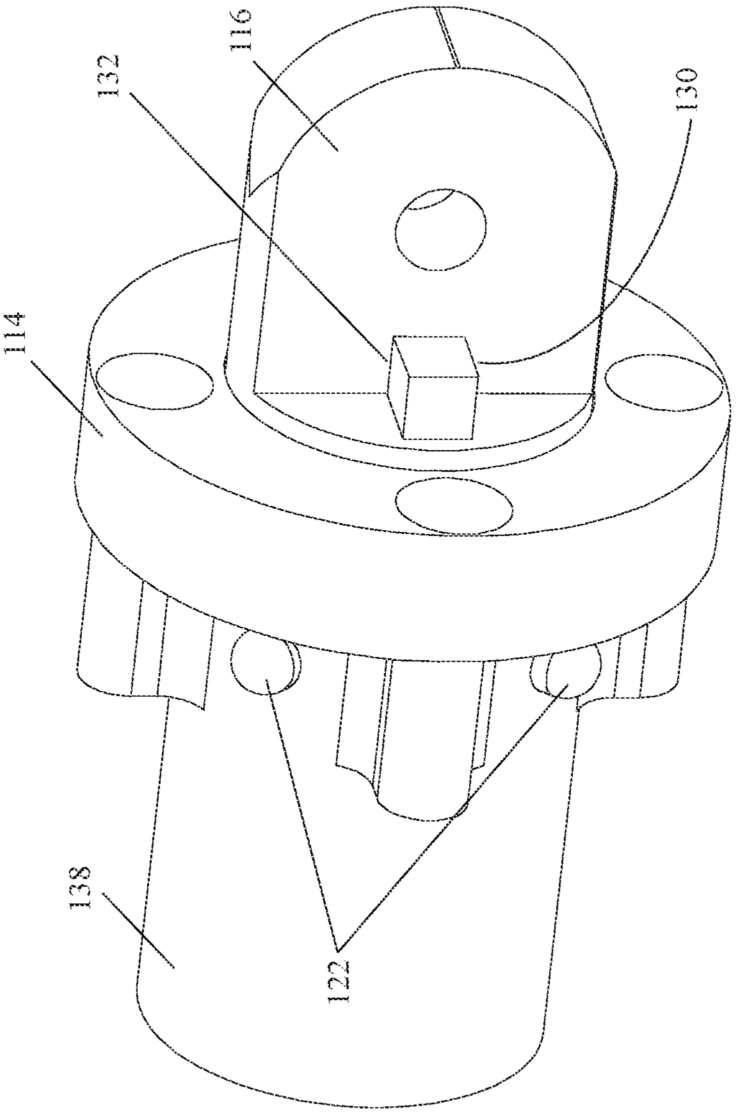
FIG. 20 is an assembled view of the slide member and locking device of FIG. 15 (handle extension and actuator removed).
Figure 21:
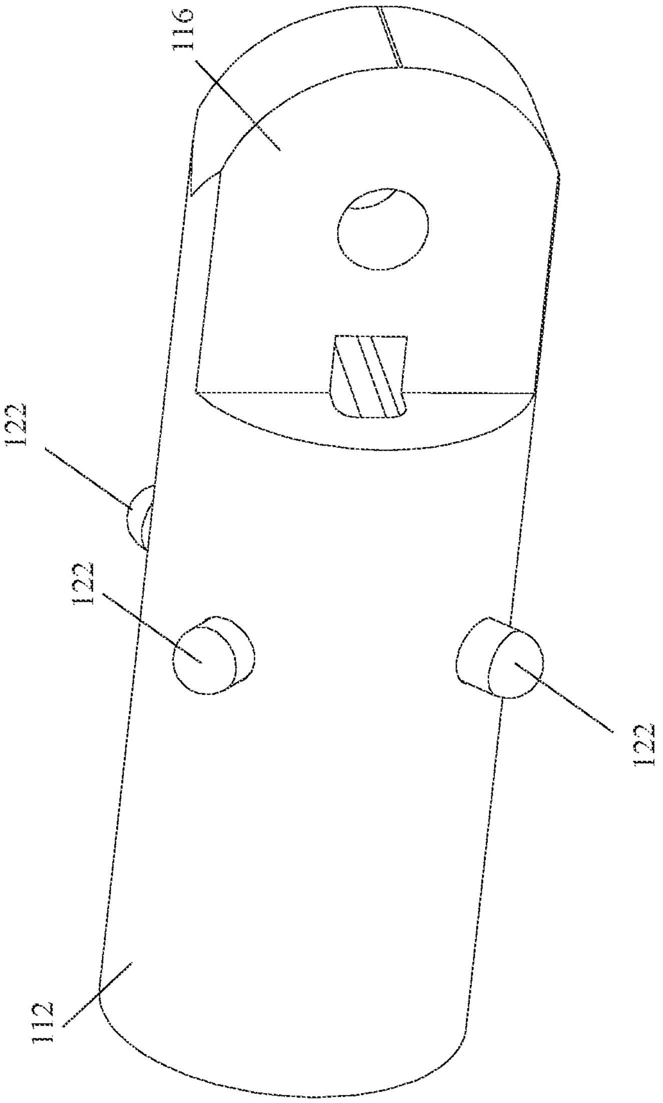
FIG. 21 is a perspective view of the slide member illustrating locking elements of the locking device of FIG. 15.
Figure 22:
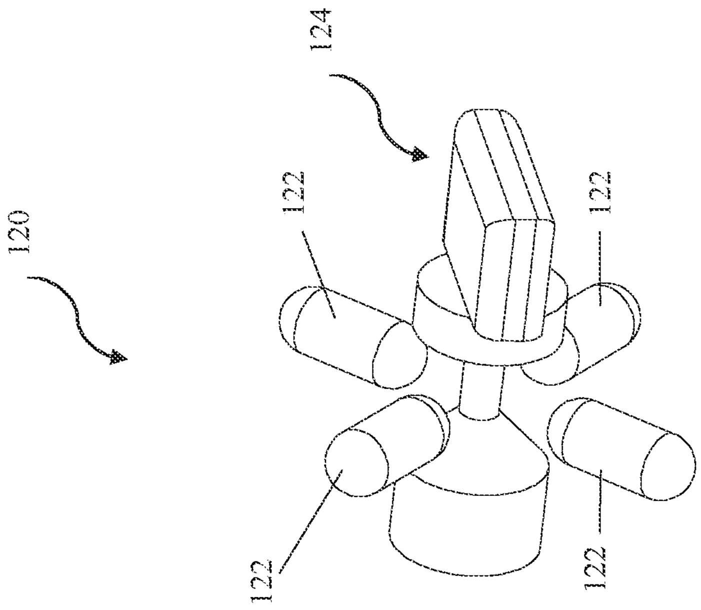
FIG. 22 is a perspective view of the locking elements of the locking device of FIG. 15.
Figure 23:
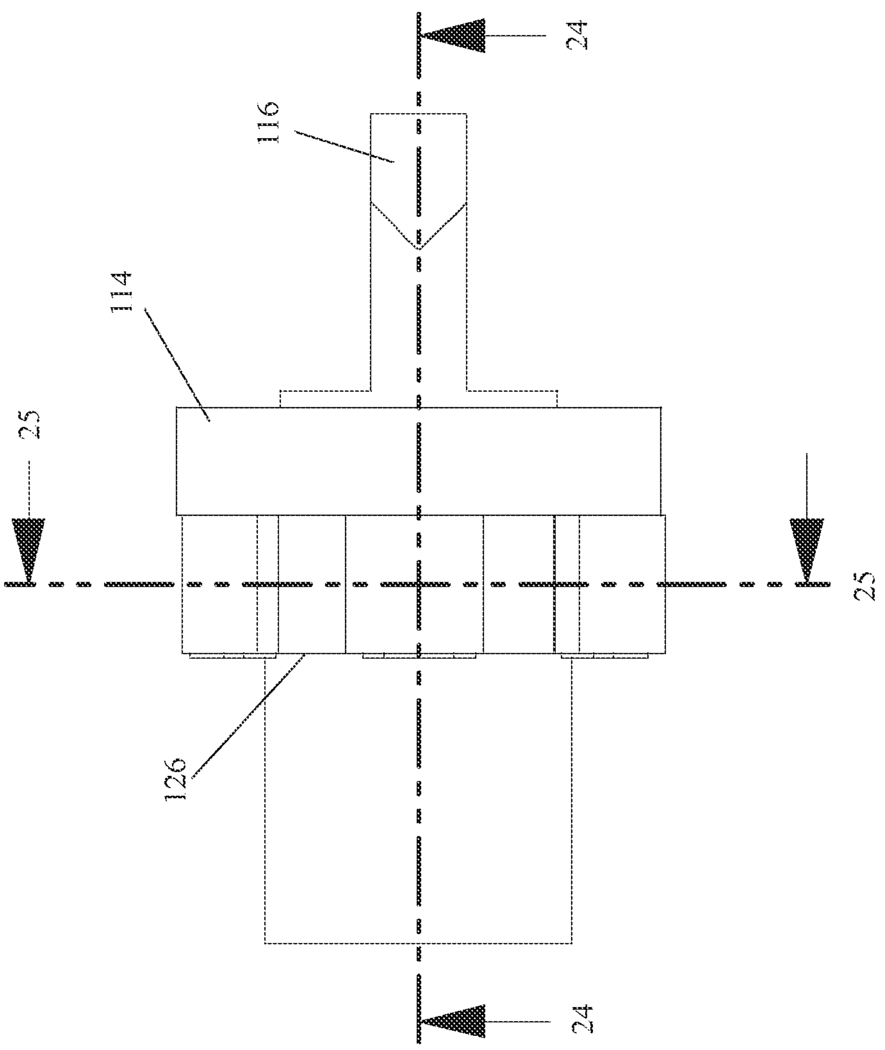
FIG. 23 is an elevational view of the slide member, locking device, and actuator of FIG. 15.

Referring to the hidden lines in FIG. 24, when the actuator 126 is in its normal, unactuated state, the spring 128 biases the second latch 124 so that a mating protrusion 130 of the second latch 124 is located in forward slot 132 and exposed outside of the slide member 112. FIG. 20 best illustrates the exposed protrusion 130. By virtue of being exposed outside of the slide member 112, the protrusion 130 is able to engage a pair of catches. The pair of catches may comprise a pair of notches 134 (see FIGS. 17 and 18) disposed in the connector 118. This engagement of the protrusion 130 and the pair of notches 134 places the handle extension 108 in one of the first, second, or third orientations, e.g., there is one pair of notches 134 associated with each of the different orientations.

Referring now to FIG. 25, at the same time that the protrusion 130 is positioned in one pair of notches 134 to hold the handle extension 108 in its current orientation, the first latches 122 are located in first catches to hold the current translation and rotational positions of the handle extension 108. In the embodiment shown, the first catches comprise openings 136 defined through an outer wall 138 of the receiver 114 (see also FIGS. 17, 18). The slide member 112 also defines similar openings 140 (see also FIGS. 17, 18) that align with the openings 136 in the outer wall 138. The first latches 122 are located in both openings 136, 140 to thereby lock the slide member 112 from translating or rotating relative to the outer wall 138. Accordingly, since the outer wall 138 is fixed to the rail 86 of the support frame 36, the handle extension 108 is thus held in its current translation and rotational position relative to the support frame 36.

The actuator 126 is actuated by the user (or may be electronically actuated or otherwise automated) to place the first latches 122 into their unlocked positions. In particular, when the actuator 126 is rotated counterclockwise about the translation axis T (with respect to FIG. 25), then a release device operates to unlatch the first latches 122. In the embodiment shown, the release device comprises cam lobes 142 of the actuator 126 that abut and push the first latches 122 radially inwardly (e.g., such movement shown by hidden lines in FIG. 25) such that the first latches 122 are substantially moved out of the openings 136. Thereafter, the slide member 112 and the handle extension 108 (by virtue of its connection to the slide member 112) can be adjusted in translation and rotation.

Referring back to FIG. 24, the actuator 126 is also actuated by the user to place the second latch 124 into its unlocked position (unlocked position shown in solid lines in FIG. 24). The first latches 122 contact a conical surface 144 of the second latch 124 such that when the first latches 122 move radially inwardly during actuation they apply a force on the conical surface 144. Owing to their acutely-angled contact with the conical surface 144, and the applied force, the second latch 124 is moved axially along the translation axis T against the bias of the spring 128. This axial movement results in the second latch 124 withdrawing from the pair of notches 134 to back inside the slide member 112. As the user holds the actuator 126 in its actuated state with one hand, the user can move the handle extension 108 and associated handle 110 with the other hand to adjust the handle extension 108 and handle 110 in translation, rotation, and/or orientation with respect to the support frame 36. Once the new configuration is set, the actuator 126 is released back to its normal, unactuated state under the bias of spring 128.

Figure 26:
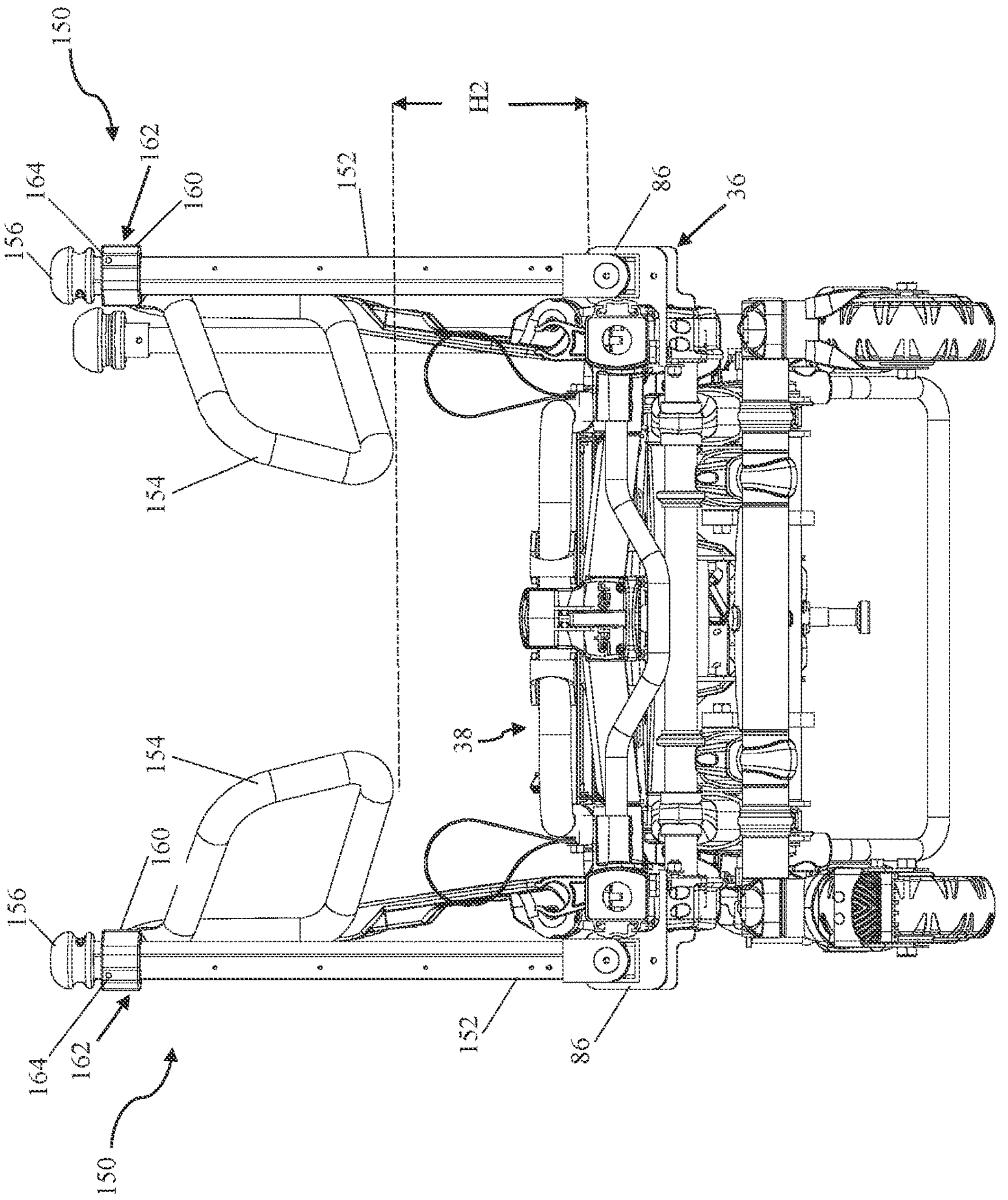
FIG. 26 is an end view of the patient transport apparatus with still other handle assemblies.

Alternative handle assemblies 150 are shown in FIG. 26. Each of the handle assemblies 150 comprises a handle extension 152 and handle 154. In this embodiment, there are two separate handle assemblies 150 shown coupled to the support frame 36. However, in other embodiments, only one handle assembly 150 may be present, or additional handle assemblies 150 may be present. By providing two or more separate handle assemblies 150 that are each capable of assuming various configurations independently, the resulting combined handle configurations are numerous and provide additional advantages to users of the patient transport apparatus 30. The handle assemblies 150 may be identical as shown, or may have different configurations.

The handle assemblies 150 further comprise a second handle 156 (also referred to as a grip) fixed to an end of the handle extension 152. The second handle 156 may be in the shape of a grasping knob or other type of handle for being manipulated by the user to push/pull the patient transport apparatus 30 on its wheels 58 along the floor surface. In some cases, the handle extension 152 is fixed in the upright orientation as shown such that the second handles 156 are continuously spaced above the support frame 36. The handle extensions 152 may also be collapsible (one at a time or simultaneously) to a stowed orientation (not shown) so that the one or more handle extensions 152 are stowed out of the way to ease transferring patients to and from the patient support surface 42. Additional pivot or slide joints (not shown) could be provided to stow the handle assemblies 150. The handle extension 152 may also be capable of pivoting or otherwise articulating relative to the rail 86 in any of the ways previously described, or in some other manner. The handle extensions 152 may also be telescoping in some embodiments.

Collars 160 are fixed to the handles 154 to move with the handles 154 as the handles 154 are adjusted. The handles 154 may be adjusted to various heights (e.g., first height H1, second height H2, or other heights to accommodate users of various heights), various lifting positions (e.g., first lifting position, second lifting position, or other lifting positions) relative to the support frame 36, and/or various rotational positions relative to the handle extensions 152. Movement between the various heights H1, H2, etc., also provides different lifting positions, particularly for the same user. In the embodiment shown, the collars 160 are sized to slide along the handle extensions 152 between the various heights/lifting positions and/or to rotate about the handle extensions 152 between the various rotational positions.

In this embodiment, a locking device 162 is provided to hold the collar 160 in place on the handle extension 152 at a desired height and desired rotational position. The locking device 162 comprises a locking element, such as a set screw 164. The set screw 164 is threaded to mate with internal threads present in a through hole in the collar 160 such that the set screw 164 is threaded in one direction to snugly abut an outer surface of the handle extension 152 in the locked position and the set screw 164 is unthreaded in an opposite direction to be spaced from the outer surface to allow the collar to slide and/or rotate along the outer surface during adjustment. Other types of locking devices are contemplated for securing the handles 154 in translational and/or rotational position relative to the handle extensions 152.

Figure 27:
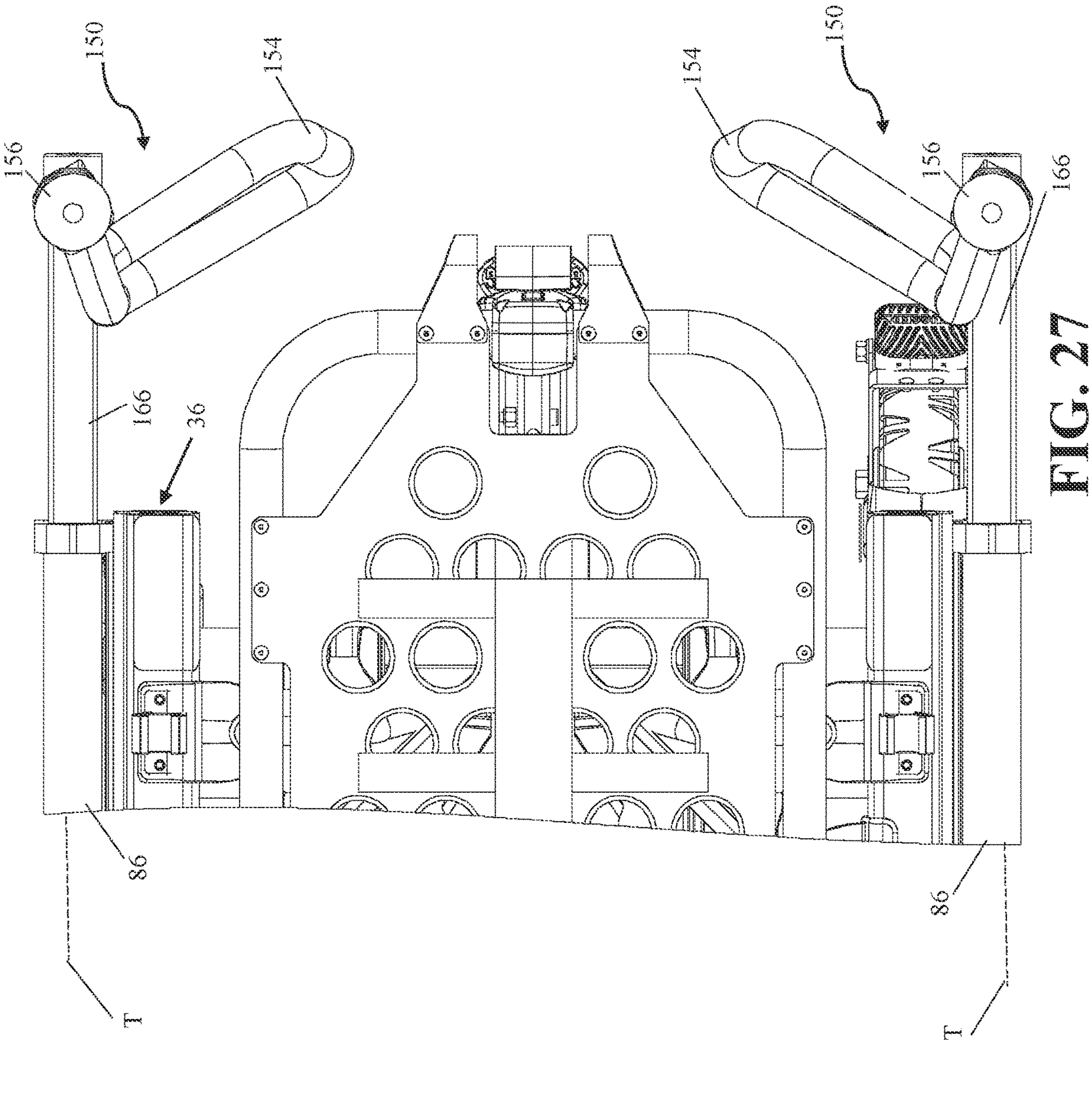
FIG. 27 is a top view of the handle assemblies of FIG. 26.

In FIGS. 26 and 27, the handle assemblies 150 may be positioned such that the handle extensions 152 are in upright orientations relative to the support frame 36 and generally perpendicular to the rails 86, with the handles 154 vertically spaced from the support frame 36 at the second height H2 and in the second lifting position.

Second handle extensions 166 (see FIG. 27) support the handle extensions 152 in their upright orientations. In the embodiment shown, the handle extensions 152 are fixed in their upright orientations relative to the second handle extensions 166. The second handle extensions 166 are able to slide in the rails 86 between stowed and extended positions as previously described. Accordingly, the handles 154 can be spaced further away from the patient in some cases, which may be beneficial in allowing the user to maneuver the patient transport apparatus 30 while a caregiver simultaneously attends to the patient. Additionally, in FIGS. 26 and 27, the handles 154 are rotated inwardly toward one another. This configuration may benefit smaller users, provide an ergonomic gripping arrangement, and/or provide additional leverage to lift the patient transport apparatus 30 over bumps, curbs, other obstacles, etc.

Figure 28:
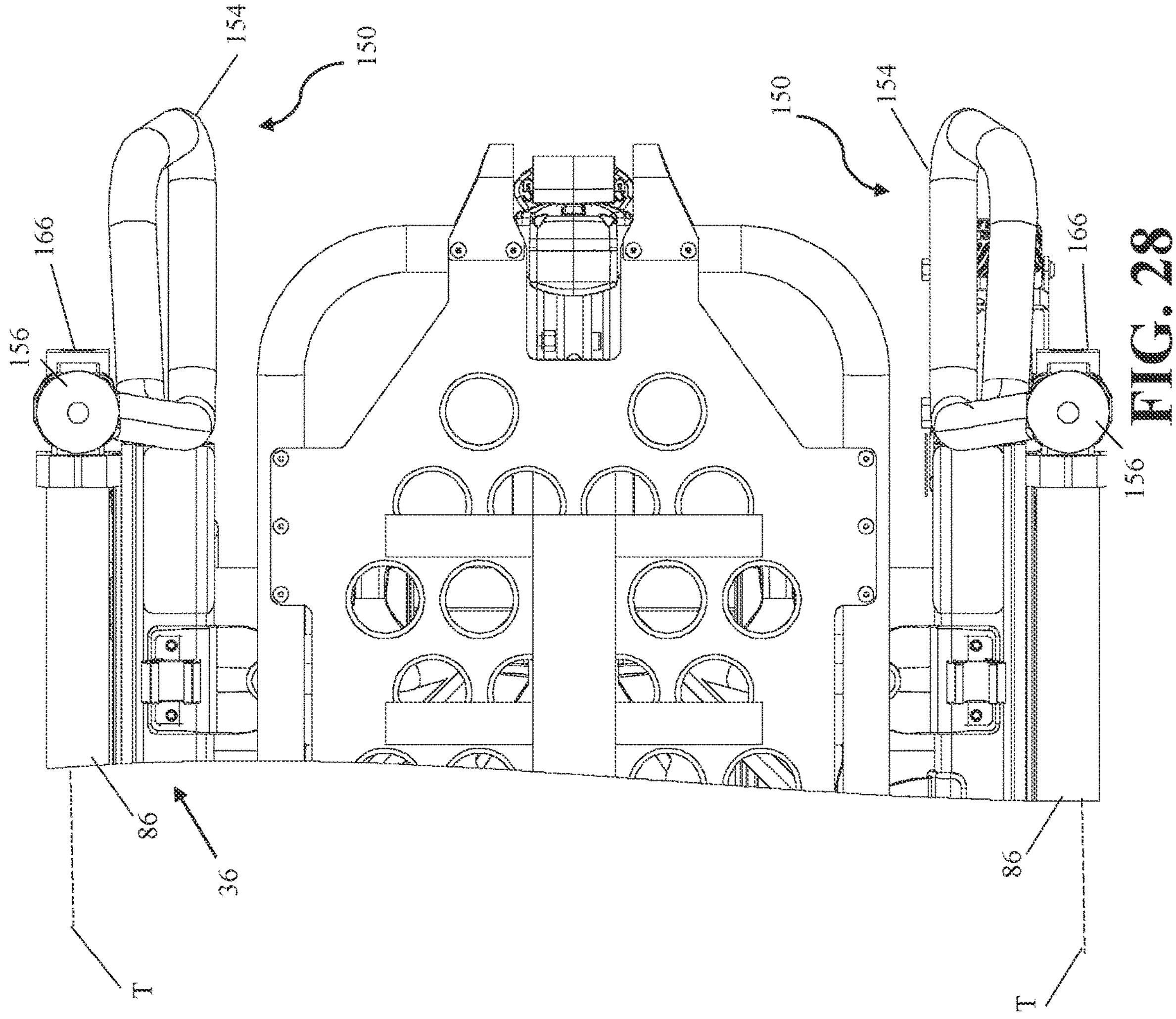
FIG. 28 is a top view of the handle assemblies of FIG. 26 in a stowed position with the handles shown in another rotational position.
Figure 29:
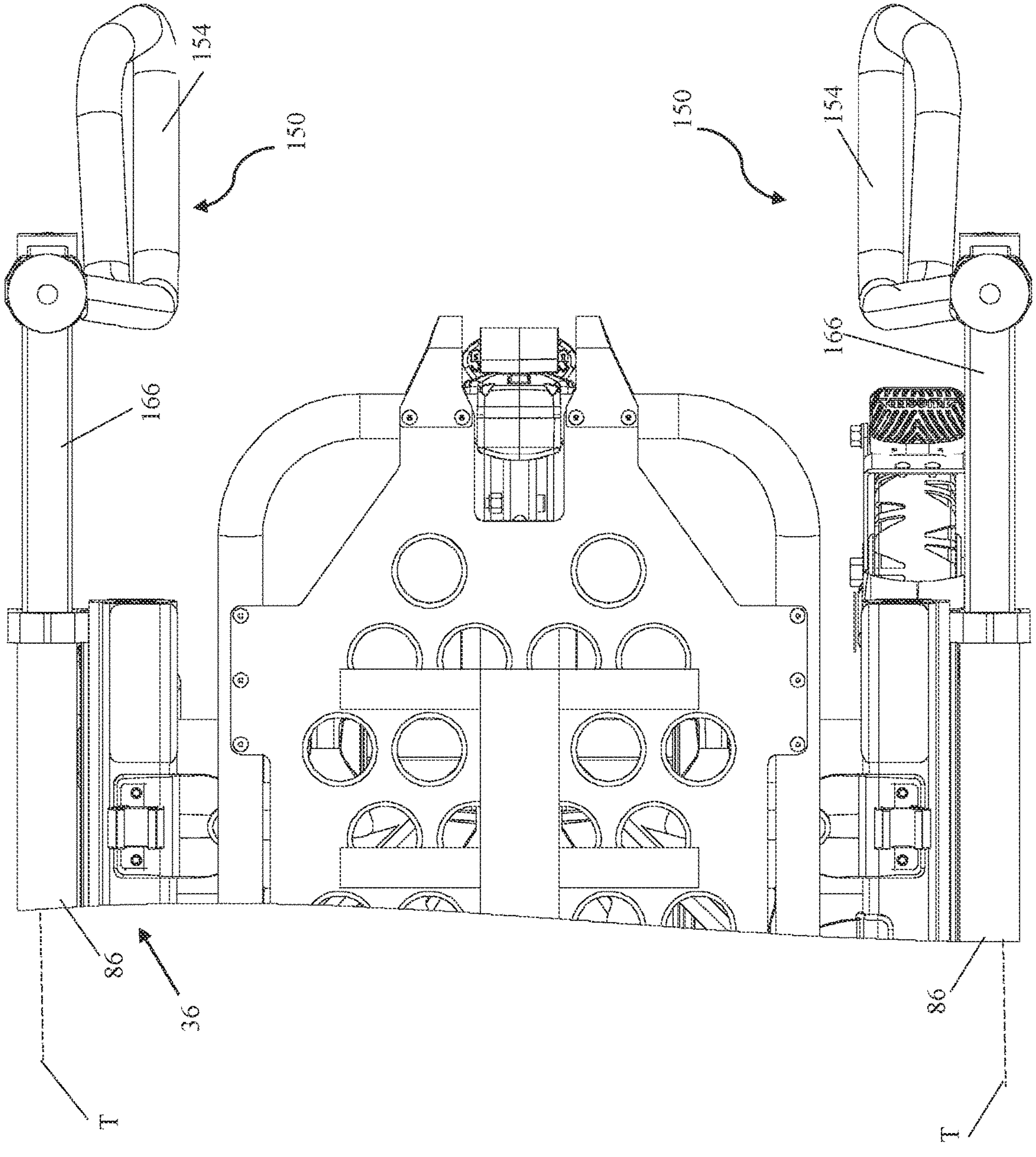
FIG. 29 is a top view of the handle assemblies of FIG. 28 in an extended position.
Figure 30:
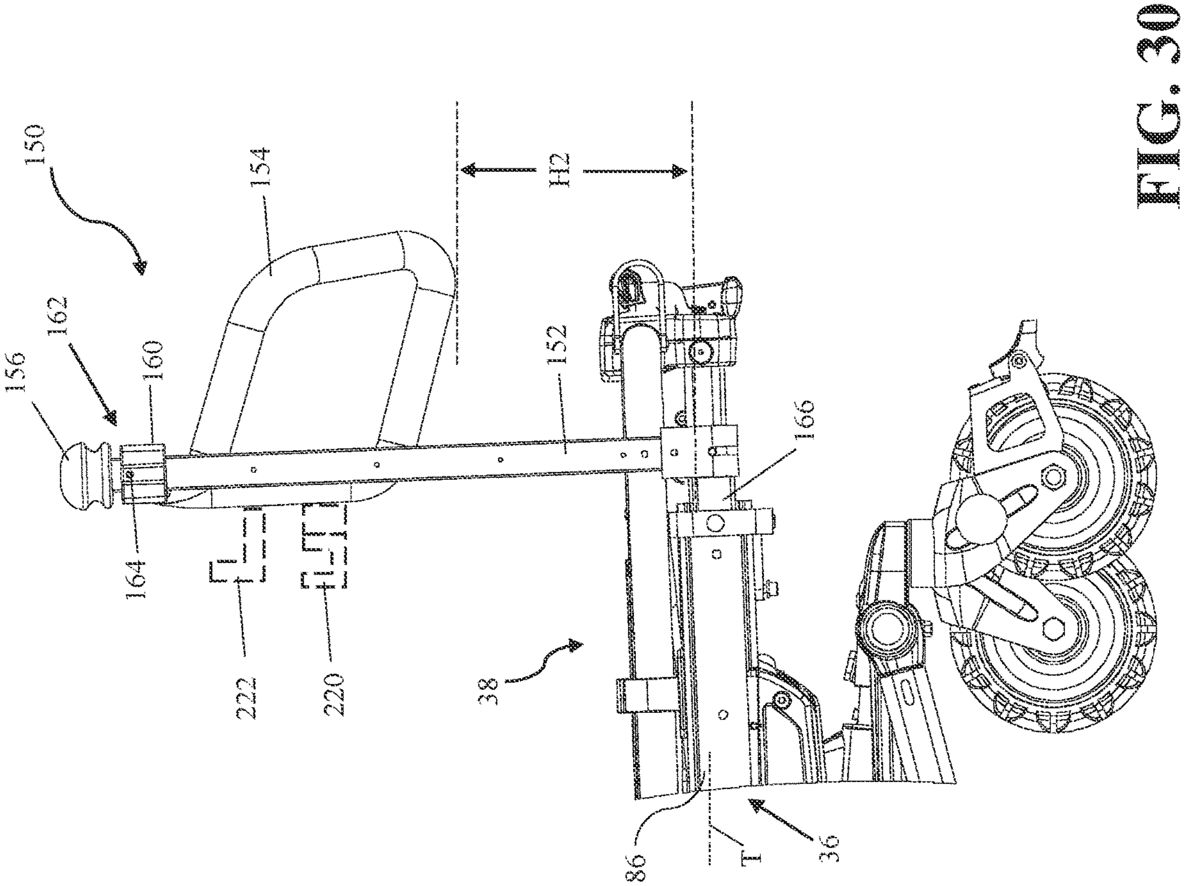
FIG. 30 is an elevational view illustrating one of the handle assemblies of FIG. 28 with a handle located at a second height relative to a support frame.

In FIG. 28, the handle assemblies 150 are shown with the second handle extensions 166 in stowed positions inside the rails 86, with the handles 154 rotationally disposed about the handle extensions 152 so that the handles 154 are generally parallel to the rails 86. In FIG. 29, the second handle extensions 166 have been moved by the user to extended positions so that the handles 154 are longitudinally spaced away from the support frame 36. In FIG. 30, the handle assemblies 150 (only one is visible) are shown with the handles 154 raised above the support frame 36 at the second height H2 such that the handles 154 are in the second lifting position. In some cases, placing the handle assemblies 150 at the second height H2 provides higher lifting points to ease lifting over bumps, curbs or other obstacles.

Figure 31:
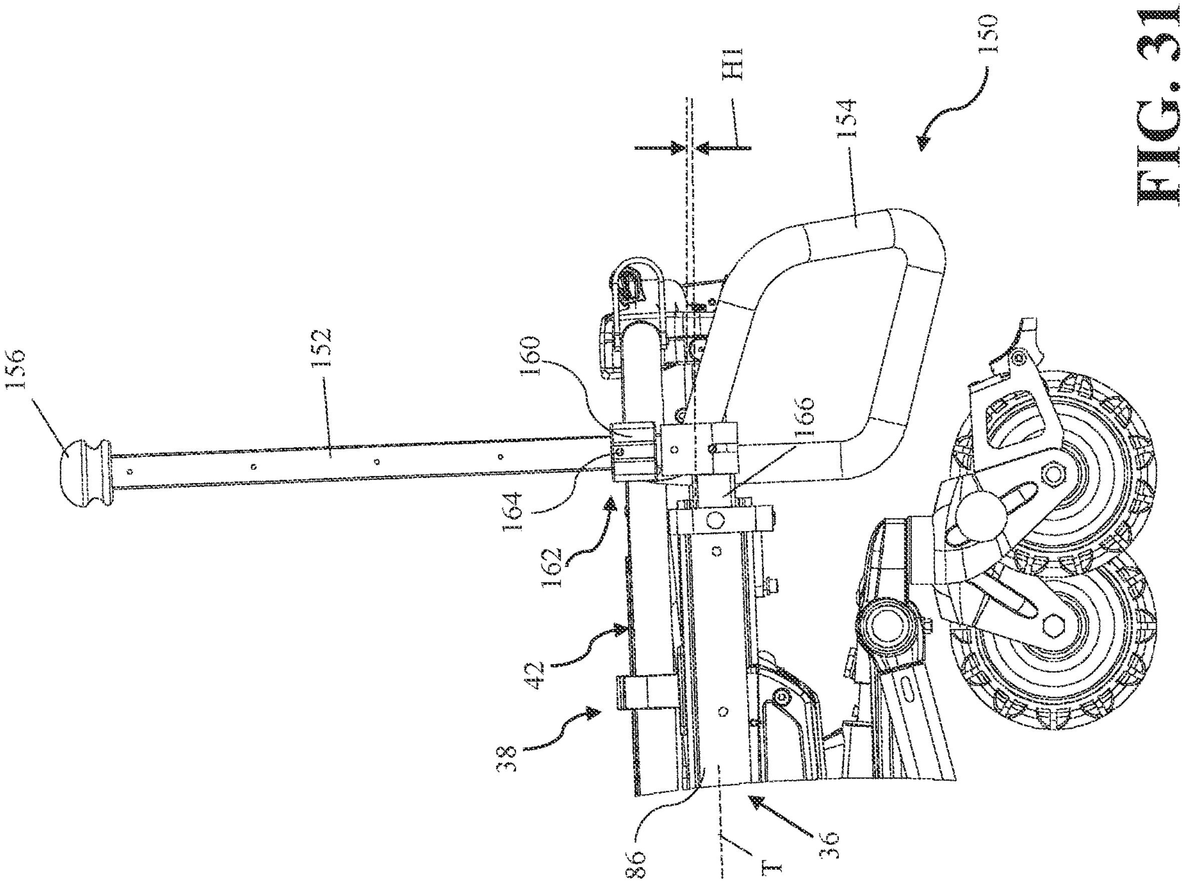
FIG. 31 is an elevational view of the handle assembly of FIG. 30 shown with the handle located at a first height relative to the support frame.

In FIG. 31, the handles 154 of FIG. 30 have moved by the user so that the handles 154 are adjacent to the support frame 36 in a stowed position at the first height H1 and in the first lifting position. In this configuration, the first lifting position provides additional leverage and/or more ergonomic lifting points, particular for shorter users, to lift the patient transport apparatus 30, such as when maneuvering the patient transport apparatus 30 into or out of the emergency vehicle. The user loosens the set screws 164 to slide the handles 154 along the handle extensions 152 from the second height H2 to the first height H1, and from the second lifting position to the first lifting position and then retightens to set screws 164 to lock and secure the handles 154 from movement relative to the handle extensions 152.

Figure 32:
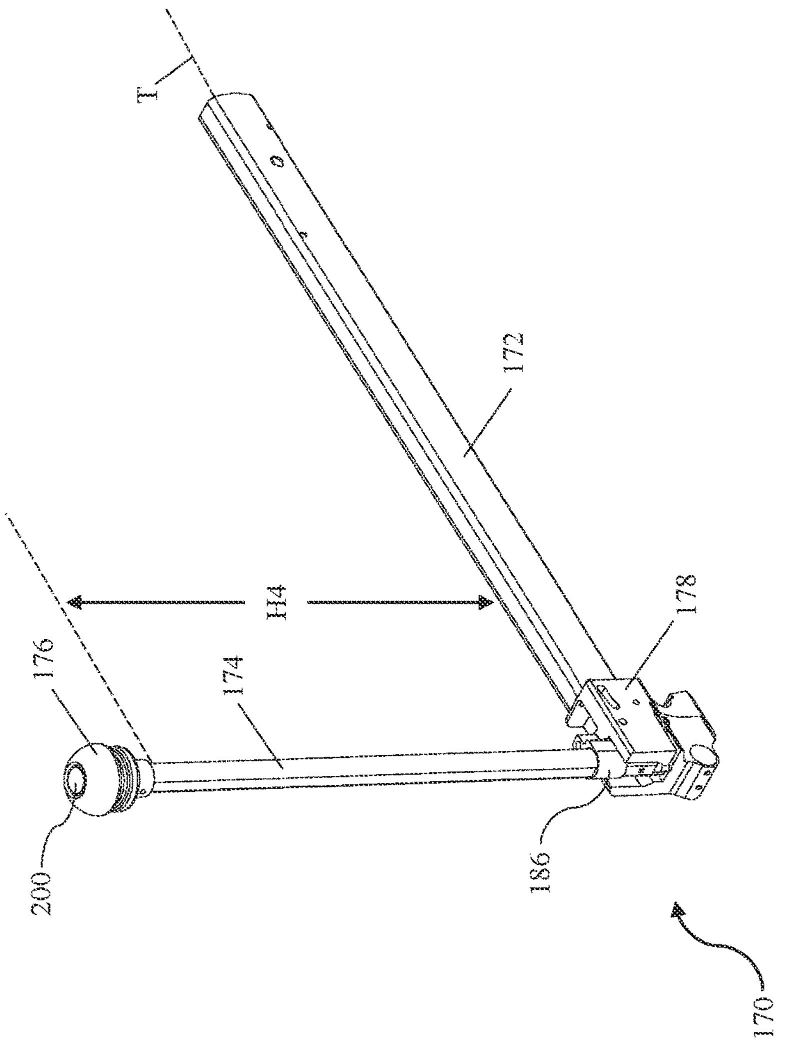
FIG. 32 is a perspective view of the second handle assembly of the patient transport apparatus of FIG. 1 shown in the upright orientation relative to a telescoping rail of the patient transport apparatus.

Referring to FIG. 32, another handle assembly 170 is shown coupled to a telescoping rail 172 of the support frame 36. In the embodiment shown (see also FIG. 1), the handle assembly 170 is coupled to a head end of the support frame 36 via the telescoping rail 172, which slides independently in a telescoping manner into the rail 86. The handle assembly 170 comprises a handle extension 174 and handle 176. One, two, or more such handle assemblies 170 may be coupled to the support frame 36 or to any other suitable location on the patient transport apparatus 30. Moreover, additional handle assemblies of different types may be present. For example, any one or combination thereof of the handle assemblies 80, 106, 150, 170 may additionally be provided. Further, the various components of the described handle assemblies 80, 106, 150, 170 can be interchanged to yield additional variations of the handle assemblies. By providing two or more different handle assemblies that are each capable of assuming various configurations independently, the resulting combined handle configurations for the patient transport apparatus 30 are numerous and provide additional advantages to users of the patient transport apparatus 30.

In FIG. 32, the handle assembly 170 is shown with the handle extension 174 in an upright orientation relative to the telescoping rail 172. In this orientation, the handle 176 is spaced from an upper surface of the telescoping rail 172 (or from the translation axis T) by a fourth height H4. The fourth height H4 may be at least 10, 12, 15, 18, 20, 25 inches, or more. In other embodiments, the fourth height H4 is greater than 0.0 inches, but less than 30 inches. In yet other embodiments, the fourth height H4 is from 10 to 30 inches.

Figure 33:
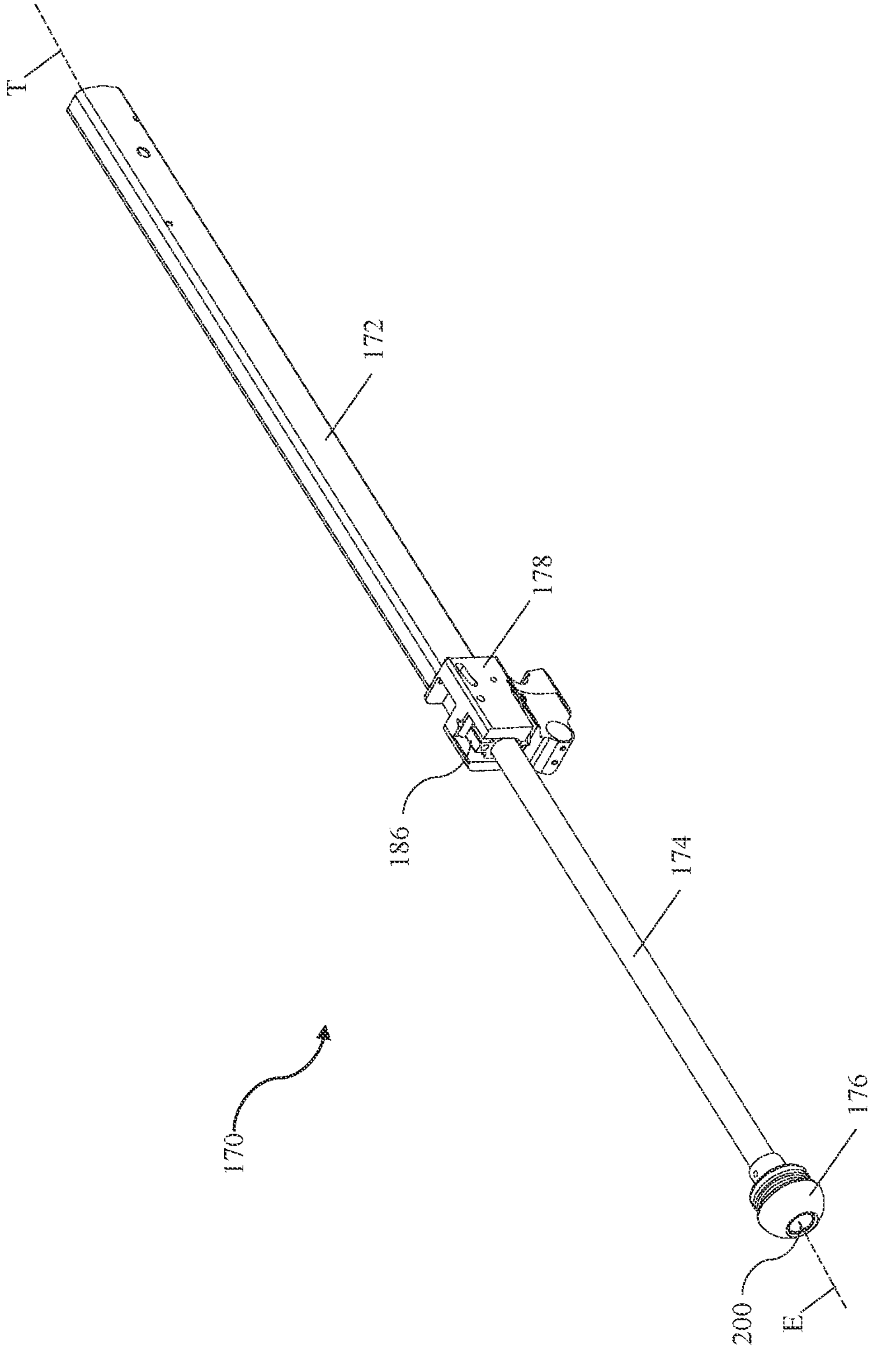
FIG. 33 is a perspective view of the handle assembly of FIG. 32 with the handle assembly in an extended position.
Figure 34:
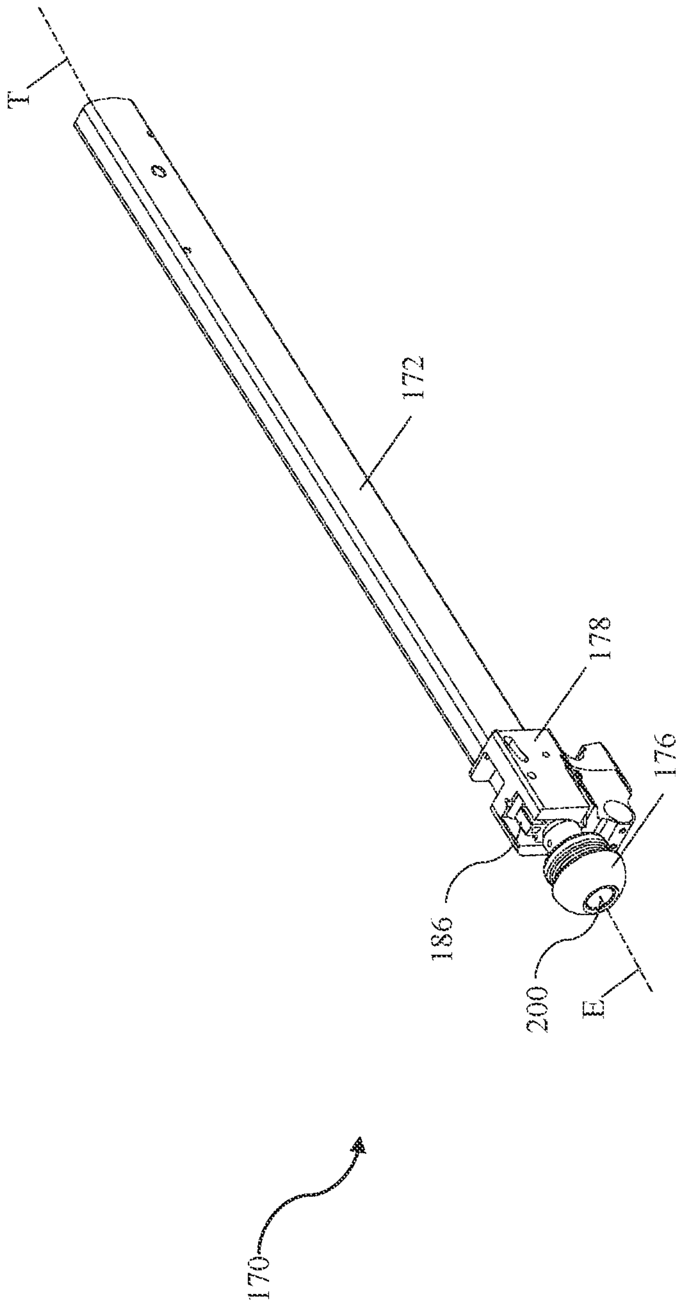
FIG. 34 is a perspective view of the handle assembly of FIG. 32 with the handle assembly in a stowed position.

In FIG. 33, the handle assembly 170 is shown in an extended position with the handle 176 longitudinally spaced from the telescoping rail 172 of the support frame 36 by the handle extension 174. The extension axis E of the handle extension 174 is parallel and/or coaxial with the translation axis T. In this case, the handle 176 is located at approximately the same height as the telescoping rail 172 of the support frame 36. In FIG. 34, the handle assembly 170 has been moved to a stowed position with the handle extension 174 slidably stowed inside the telescoping rail 172 and the handle 176 located adjacent to the telescoping rail 172.

Figure 35:
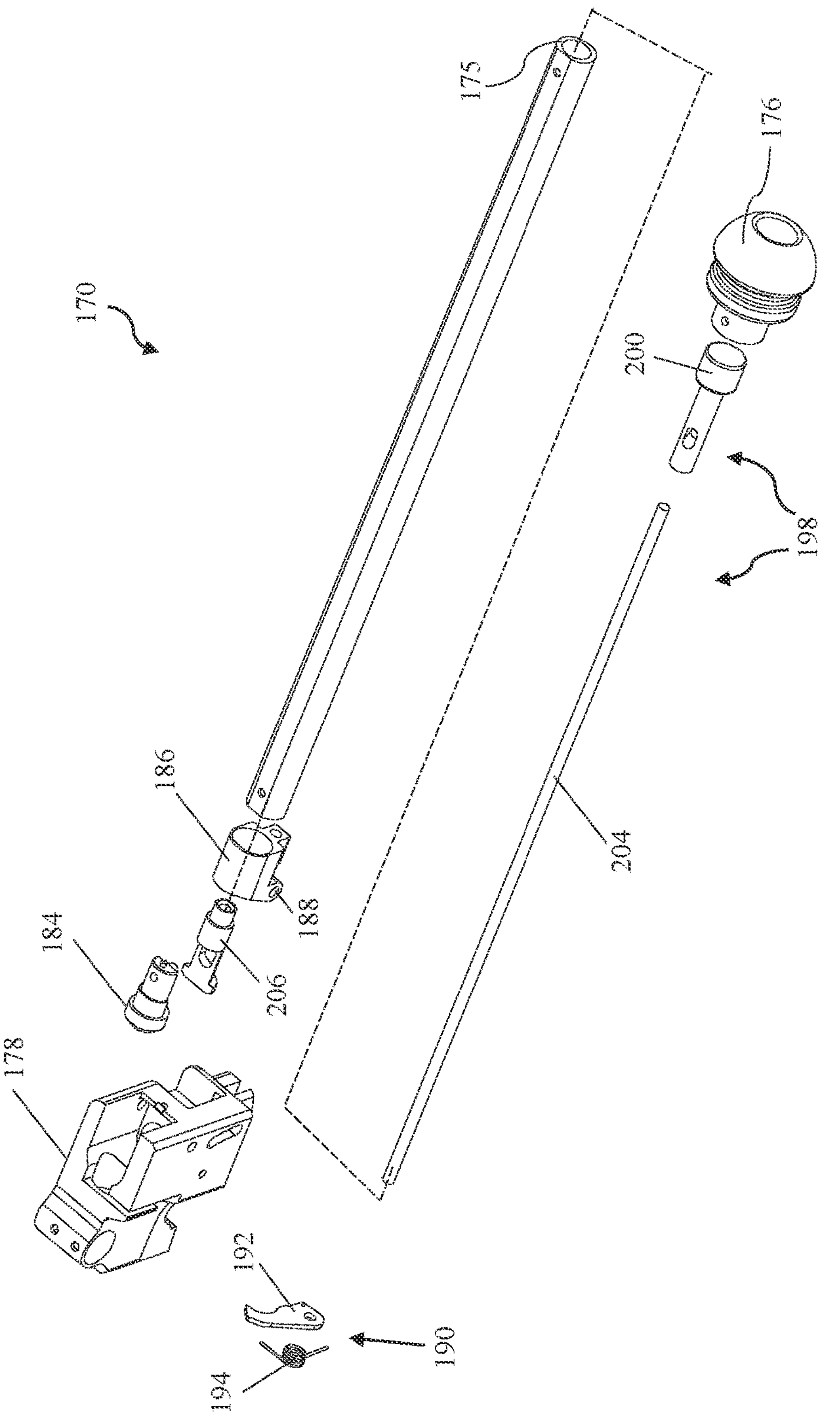
FIG. 35 is an exploded view of the handle assembly of FIG. 32 with associated locking device, actuator, and release device.
Figure 36:
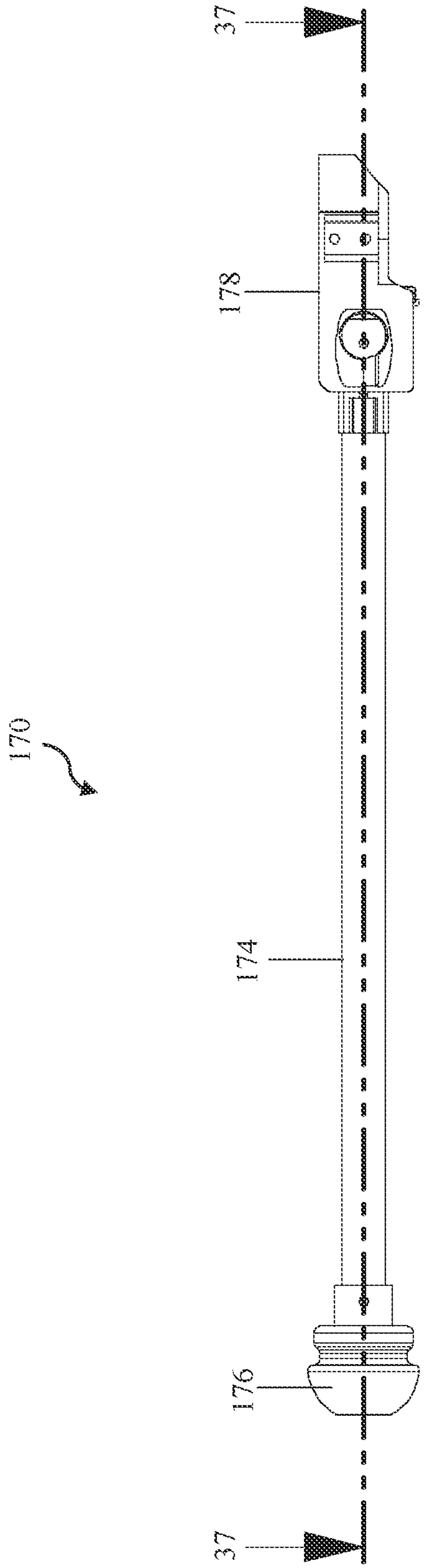
FIG. 36 is an elevational view of the handle assembly of FIG. 32.
Figure 37:
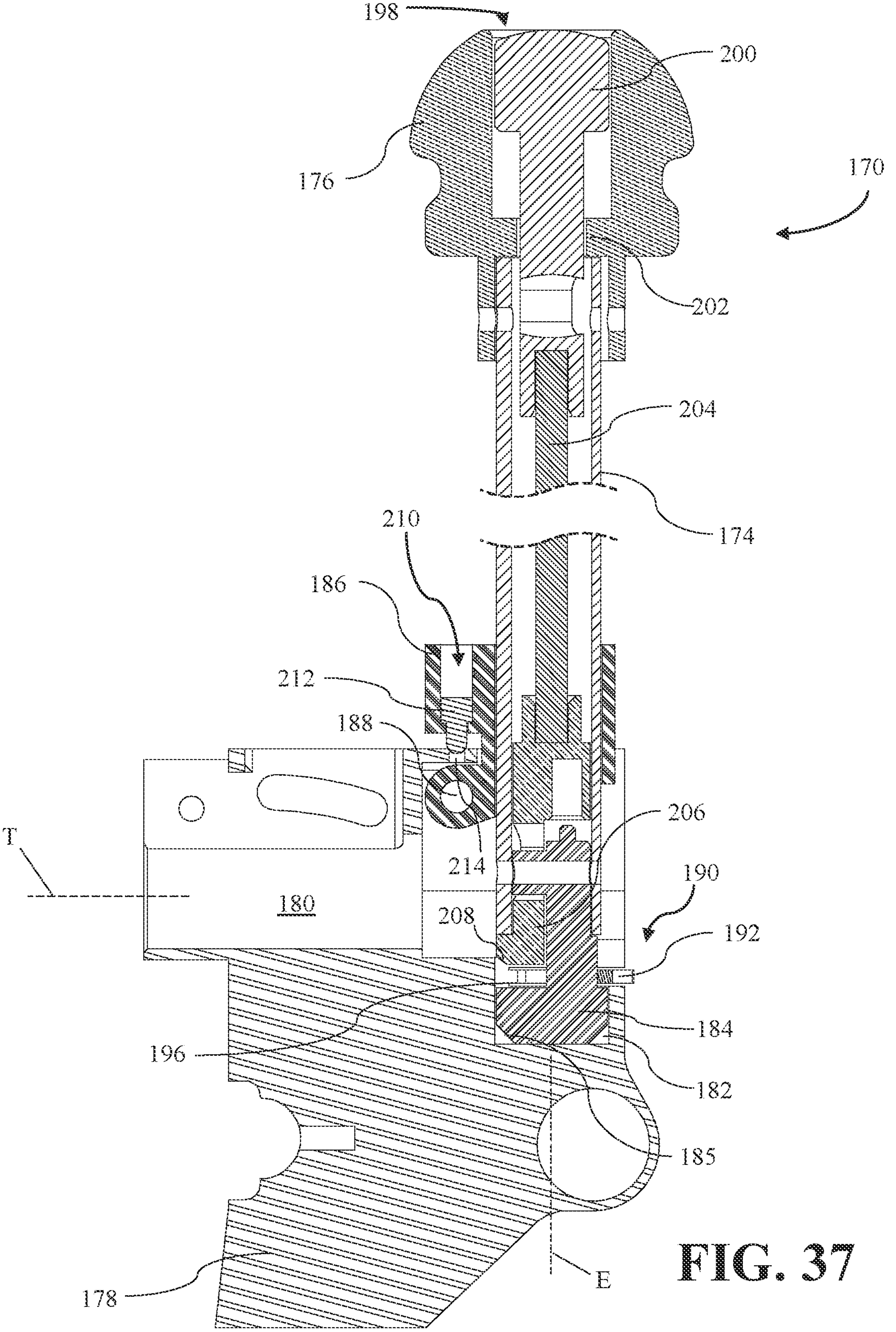
FIG. 37 is a cross-sectional view taken along the line 37-37 in FIG. 36.

A receiver 178 is fixed to an end of the telescoping rail 172 to receive the handle extension 174. The receiver 178 is shown fixed to the telescoping rail 172 in FIG. 34 and separated from the telescoping rail 172 in FIG. 35. As shown in FIG. 37, the receiver 178 comprises a block with a stowing passage 180 through which the handle extension 174 slides when being moved to the stowed position. Thus, the stowing passage 180 is sized and shaped to slidably receive the handle extension 174. The receiver 178 further comprises a pocket 182 into which a foot 184 of the handle extension 174 is seated when the handle extension 174 is in the upright orientation. The handle extension 174 may comprise a separate outer shaft 175 (see FIG. 35) fixed to the foot 184 or the outer shaft 175 and foot 184 may be one-piece. When the foot 184 is seated in the pocket 182, the handle extension 174 is unable to pivot from the upright orientation (see FIGS. 32 and 37) to its stowing orientation (see FIG. 33).

Referring to FIG. 37, a pivot sleeve 186 is pivotally connected to the receiver 178 by a pivot pin 188 to facilitate articulation (e.g., pivoting) of the handle extension 174 between various orientations, such as from the stowing orientation to the upright orientation and vice versa. The handle extension 174 is sized and shaped to slide within the pivot sleeve 186. When being stowed, the handle extension 174 slides through the pivot sleeve 186 from the extended position to the stowed position until the handle 176 abuts one end of the pivot sleeve 186. When being extended, the handle extension 174 slides in reverse back through the pivot sleeve 186 until the foot 184 abuts an opposed end of the pivot sleeve 186. At this point, the user then articulates the handle extension 174 by pivoting the pivot sleeve 186 about its pivot axis relative to the receiver 178 until the handle extension 174 is in the upright orientation. The user then lowers the foot 184 of the handle extension 174 into the pocket 182.

Figure 38:
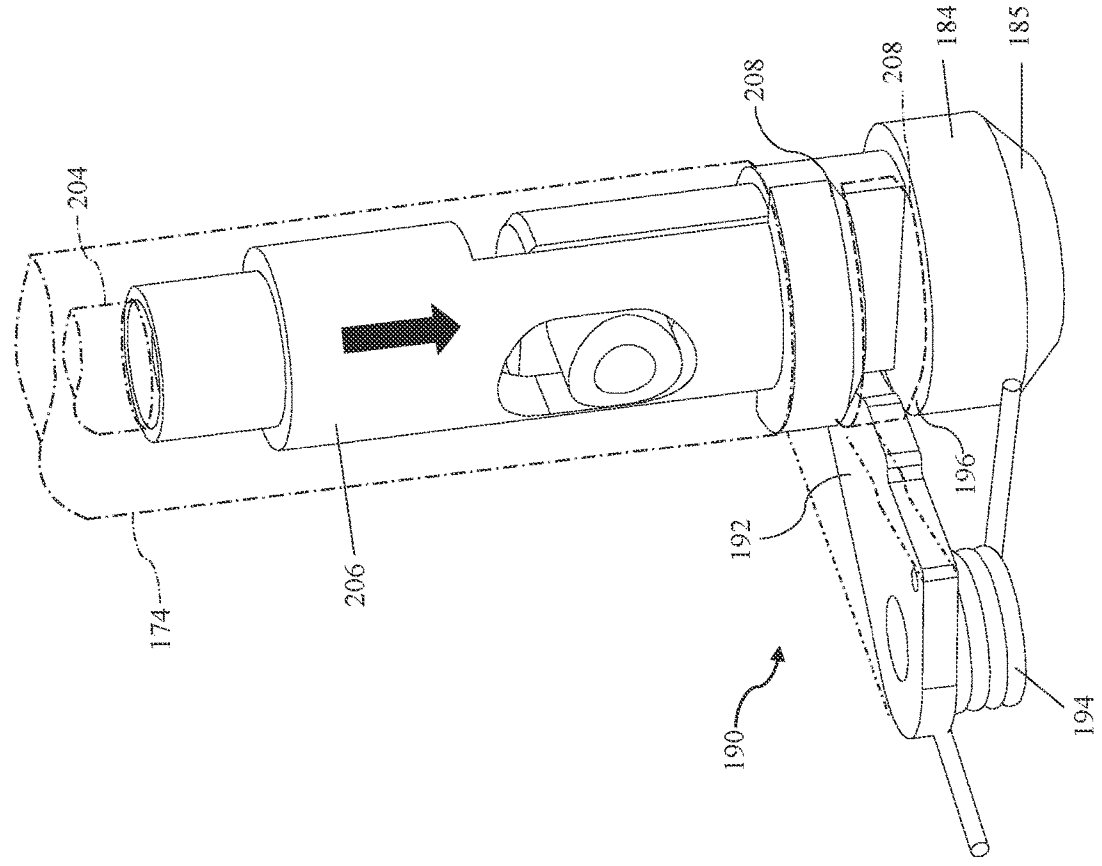
FIG. 38 is a perspective view showing the locking device, release device, and handle extension of the handle assembly of FIG. 32.

Referring to FIGS. 37 and 38, a locking device 190 is configured to lock the handle assembly 170 relative to the receiver 178 in the upright orientation when the foot 184 is seated into the pocket 182. In particular, in the embodiment shown, the locking device 190 comprises a locking element, such as a pivoting latch 192, which is pivotally connected to the receiver 178 by a pivot pin. The latch 192 is configured to engage the foot 184 and hold the foot 184 in the pocket 182 by preventing the foot 184 from withdrawing out of the pocket 182. A spring 194 (see FIG. 38) biases the latch 192 into engagement with the foot 184. More specifically, the foot 184 has a shoulder 196 over which the latch 192 engages the foot 184 in a locked position to hold the foot 184 in place in the pocket 182.

An actuator 198 is operable to move the latch 192 to an unlocked position to allow the user to withdraw the foot 184 out of the pocket 182 and move the handle extension 174 back to the stowing orientation for stowing the handle assembly 170. In this embodiment, the actuator 198 is associated with the handle 176 so that the user is able to operate the actuator 198 while grasping the handle 176.

As shown in FIGS. 37 and 38, the actuator 198 comprises a push button 200 slidable relative to the handle 176. The handle 176 comprises an actuator opening 202 and a neck of the push button 200 extends through the actuator opening.

The actuator 198 further comprises an actuator shaft 204 fixed to the push button 200. The actuator shaft 204 moves distally toward the latch 192 when the push button 200 is pressed by the user. The actuator 198 is operatively connected to a release device. In this embodiment, the release device comprises a plunger 206 that has a beveled distal end 208.

When the push button 200 is pressed by the user, the beveled distal end 208 is pushed distally until the beveled distal end 208 engages the latch 192 (see hidden lines in FIG. 38). The beveled distal end 208 is shaped to engage the latch 192 in a manner that pivots the latch 192 away from the foot 184 to unlock the foot 184 so that the foot 184 can be removed from the pocket 182. More specifically, while the user is continuing to press the push button 200, the beveled distal end 208 abuts the shoulder 196 to prevent the latch 192 from engaging the foot 184. Accordingly, the foot 184 can then be withdrawn from the pocket 182. Subsequently, the handle extension 174 can be articulated from the upright orientation to the stowing orientation and stowed in the stowed position (see FIG. 34).

When the foot 184 is withdrawn from the pocket 182, the latch 192 returns back to its locked position. In order to again lock the handle extension 174 in the upright orientation (shown in FIG. 37), the user pulls the handle extension 174 out of the stowed position to the extended position (see FIG. 33), articulates the handle extension 174 to the upright orientation (see FIG. 32), and then pushes the foot 184 downwardly until a beveled distal end 185 of the foot 184 engages the latch 192 and urges the latch 192 to pivot back to the unlocked position so that the foot 184 can pass the latch 192 into the pocket 182. Once the foot 184 is in the pocket 182, the shoulder 196 is presented at an elevation below the latch 192. As a result, the latch 192 again engages the foot 184 over the shoulder 196 to hold the foot 184 in place. It should be appreciated that other types of locking devices, actuators, and release devices are contemplated and that the handle assembly 170 may be locked in any of various translational positions, rotational positions, and/or orientations.

A tactile locator 210 (see FIG. 37) may be fixed to the pivot sleeve 186 to pivot with the pivot sleeve 186 from the upright orientation to the stowing orientation and vice versa. One purpose of the tactile locator 210 is to provide the user with a tactile sensation as to when the handle extension 174 is in the upright orientation. In the embodiment shown, the tactile locator 210 comprises a detent 212 having a rounded end. The detent 212 is sized and shaped to engage a detent pocket 214 defined in the receiver 178. The detent 212 engages the detent pocket 214 when the pivot sleeve 186 rotates with the handle extension 174 to the upright orientation. The seating of the detent 212 in the detent pocket 214 provides a tactile sensation to the user that indicates that the upright orientation has been reached and the handle extension 174 can thereafter be lowered so that the foot 184 is seated in the pocket 182. Accordingly, the tactile locator 210 also acts as an alignment device for the user. In some embodiments, one or more tactile locators 210 or indicators may be provided to indicate any of the various orientations into which the handle extension 174 can be placed. In some cases, the detent 212 is fixed to the pivot sleeve 186. In other embodiments, a biasing device (e.g., a compression spring) (not shown) may act between the pivot sleeve 186 and the detent 212 to bias the detent 212 toward the detent pocket 214.

Figure 39:
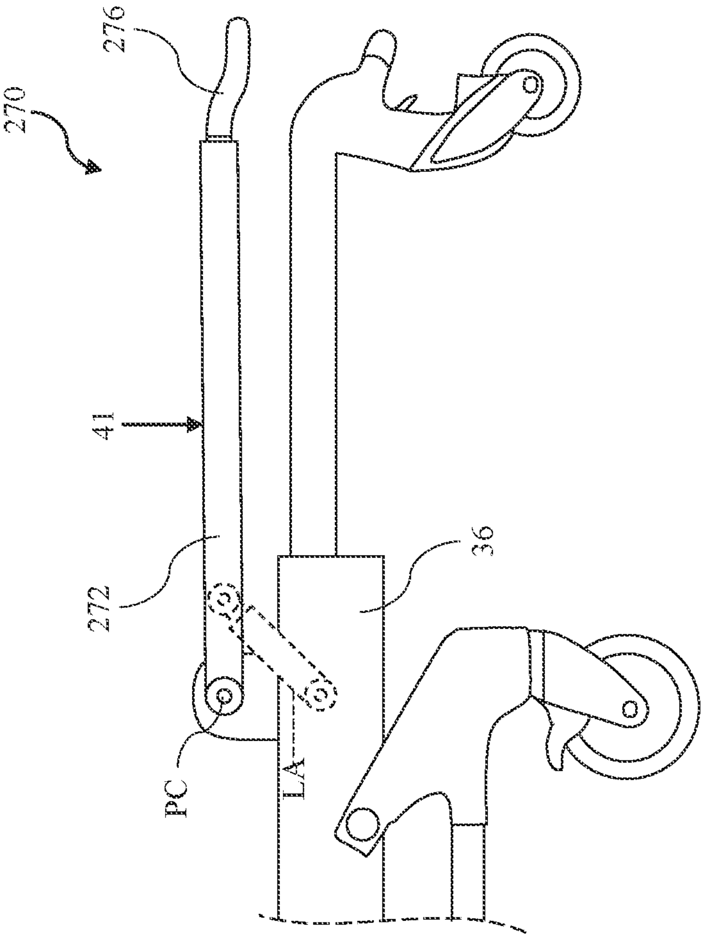
FIGS. 39-42 are elevational views illustrating a handle assembly integrated into an articulating deck section, such as a back section, of the patient transport apparatus.
Figure 40:
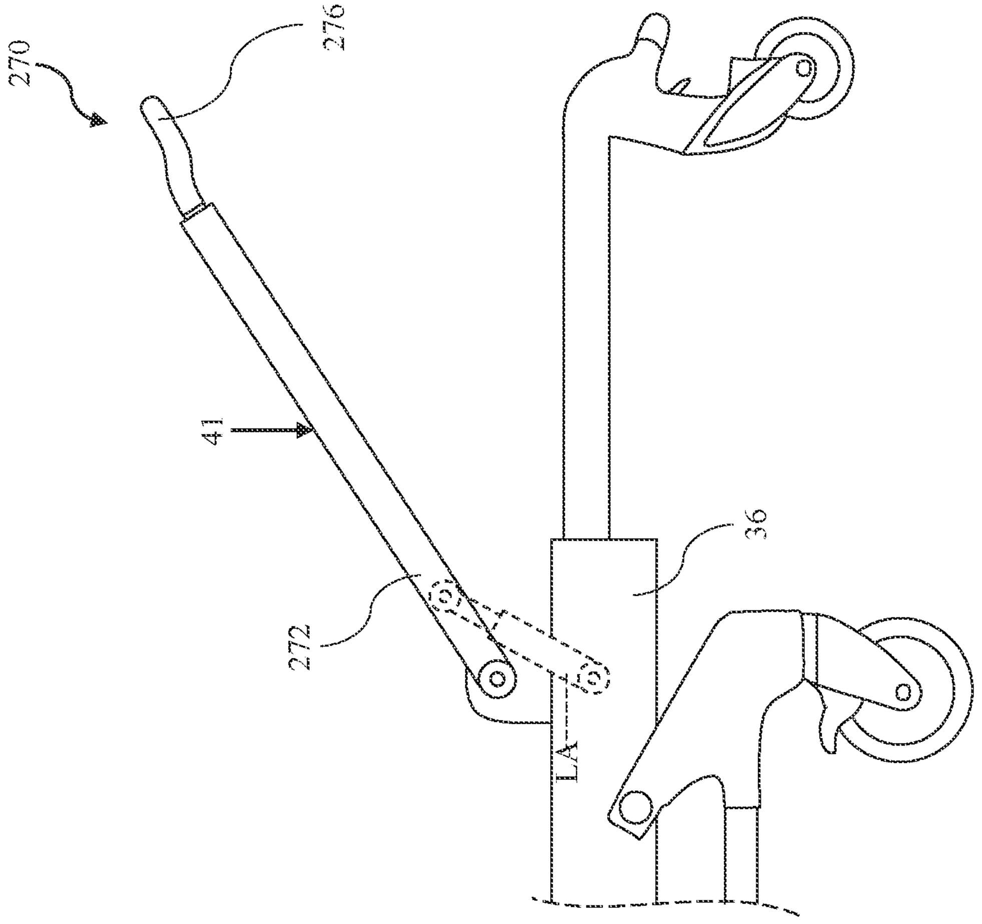
Figure 41:
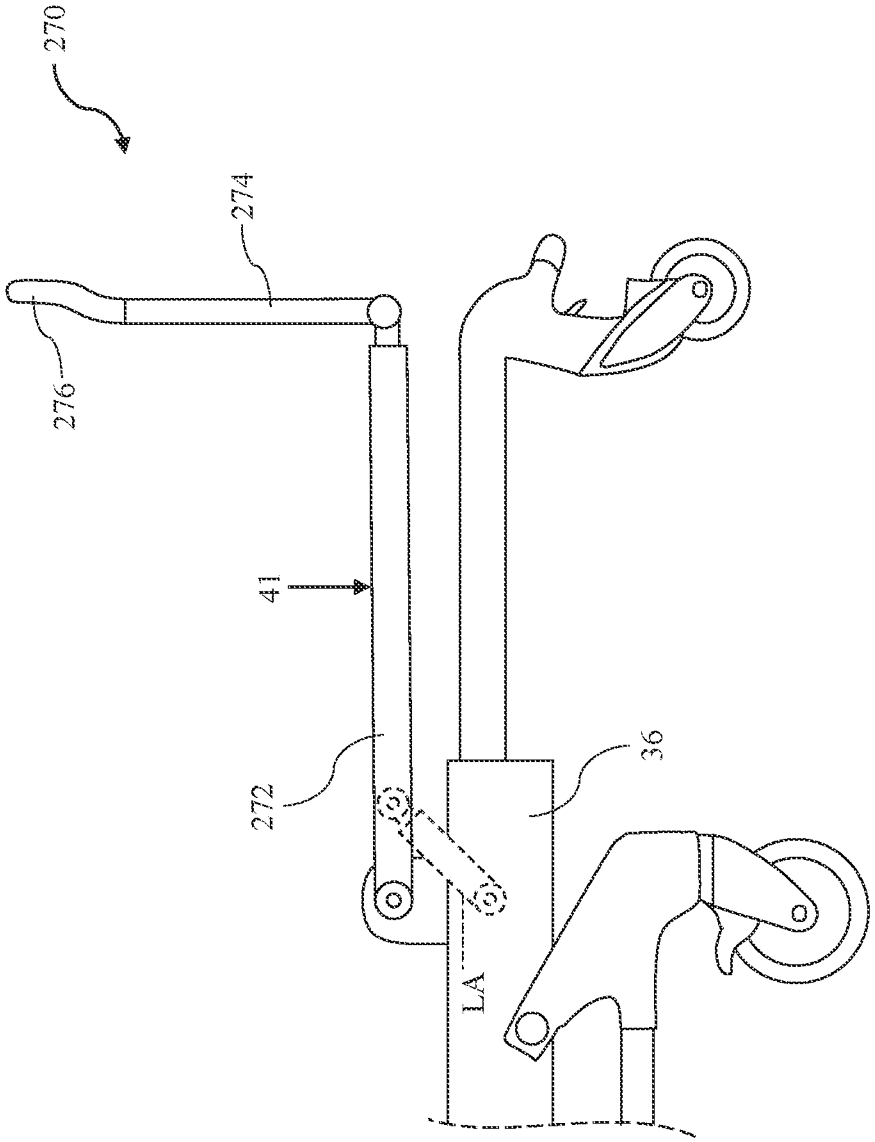
Figure 42:
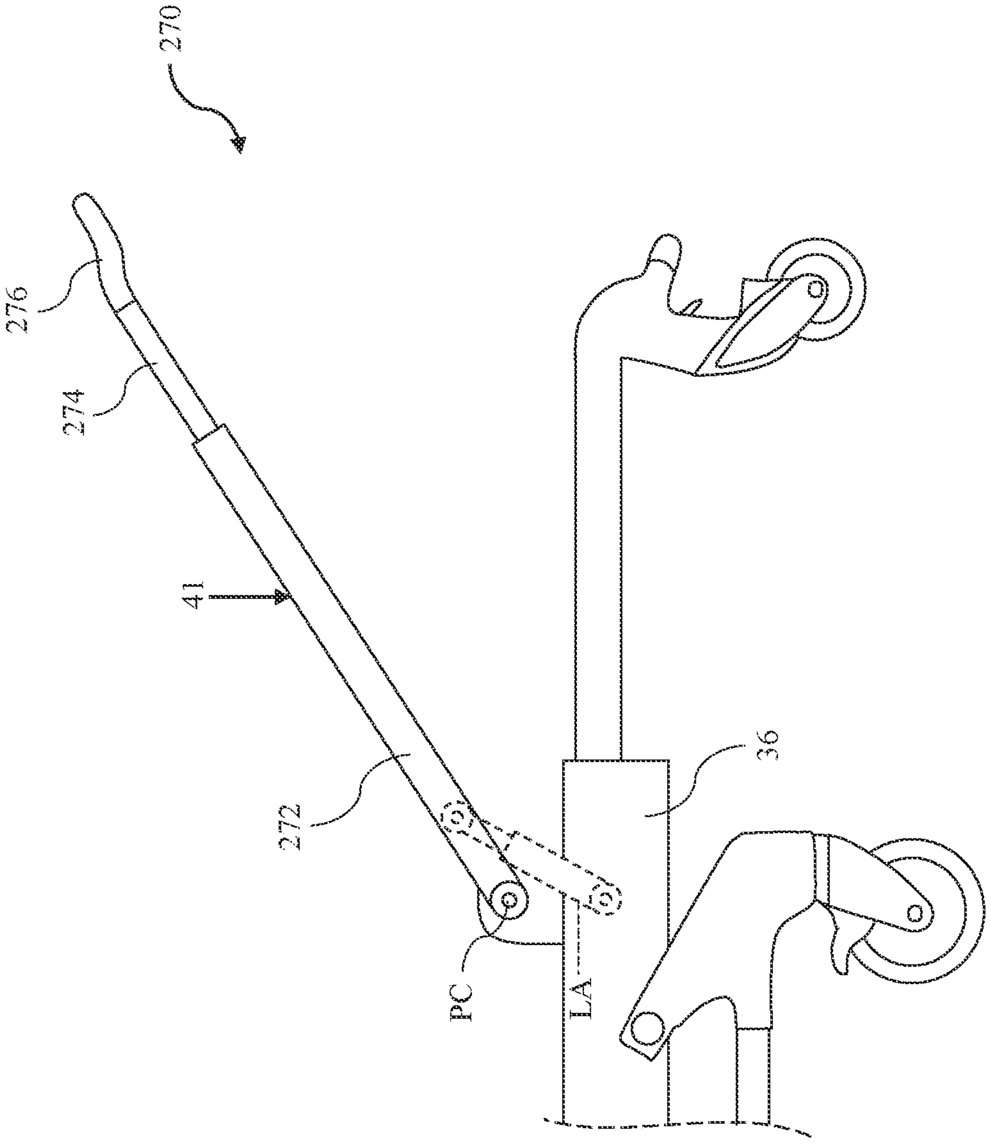

Referring to FIGS. 39-41, a handle assembly 270 is shown integrated into the back section 41 and is capable of being stowed, extended, and oriented with respect to a telescoping rail 272 of the back section 41. In this embodiment, the handle assembly 270 and telescoping rail 272 may have the same features and operate in the same manner as the handle assembly 170 and the telescoping rail 172 previously described, or as any of the other handle assemblies and/or rails previously described. There may also be two handle assemblies 270, one for each telescoping rail 272 on both sides of the back section 41 (only one side shown). Additionally, however, in this embodiment the back section 41 (and associated telescoping rails 272) is capable of being articulated (manually or powered) relative to the support frame 36 (see pivot connection PC in FIGS. 40 and 42). For instance, an electric linear actuator LA may be pivotally coupled to the support frame 36 and the back section 41. As the linear actuator LA extends and retracts, the back section 41 raises and lowers. Other actuation mechanisms, prop rods, etc., are also contemplated to raise the back section 41. When the back section 41 is in a flat configuration (see FIGS. 39 and 41), the handle assembly 270 may be stowed (FIG. 39) or extended and oriented to its upright orientation (FIG. 41). When the back section 41 is articulated relative to the support frame 36, the handle assembly 270 may remain stowed (FIG. 40) or may be at least partially extended (FIG. 42). When at least partially extended, handle extension 274 may be capable of being locked from moving relative to the telescoping rail 272 in any number of extended positions. In this manner, handle 276 is capable of being grasped to facilitate maneuvering of the patient transport apparatus 30 with the back section 41 articulated upwardly away from the support frame 36.

Referring, for example, to the embodiment shown in FIG. 30, any of the handles 82, 110, 154, 176 can also be outfitted with equipment hooks/connectors 220 as well as intravenous (IV) bag hooks 222, or other type of accessory connections that may be useful on the patient transport apparatus 30. Additionally, the handles 82, 110, 154, 176 may be shaped so that users are provided with lift points in some rotational positions (see, e.g., FIG. 8) and ergonomic push/pull points in other rotational positions (see, e.g., FIG. 11). Any of the handles 82, 110, 154, 176, or combinations thereof, may be used at the head end and/or foot end of the patient transport apparatus. Furthermore, other mechanisms are contemplated for stowing any of the handles, including mechanisms enabling folding of the handles and/or handle extensions, in addition to telescoping. Stowing can occur along a lateral axis, across a width of the patient transport apparatus 30, instead of along a longitudinal axis, e.g., into a rail at the head end and/or foot end of the patient transport apparatus 30. In further embodiments, the handle extensions may be formed of telescoping assemblies such that the handle extensions themselves may telescope as an alternative to, or in addition to, telescoping with respect to the rails.

Figure 43:
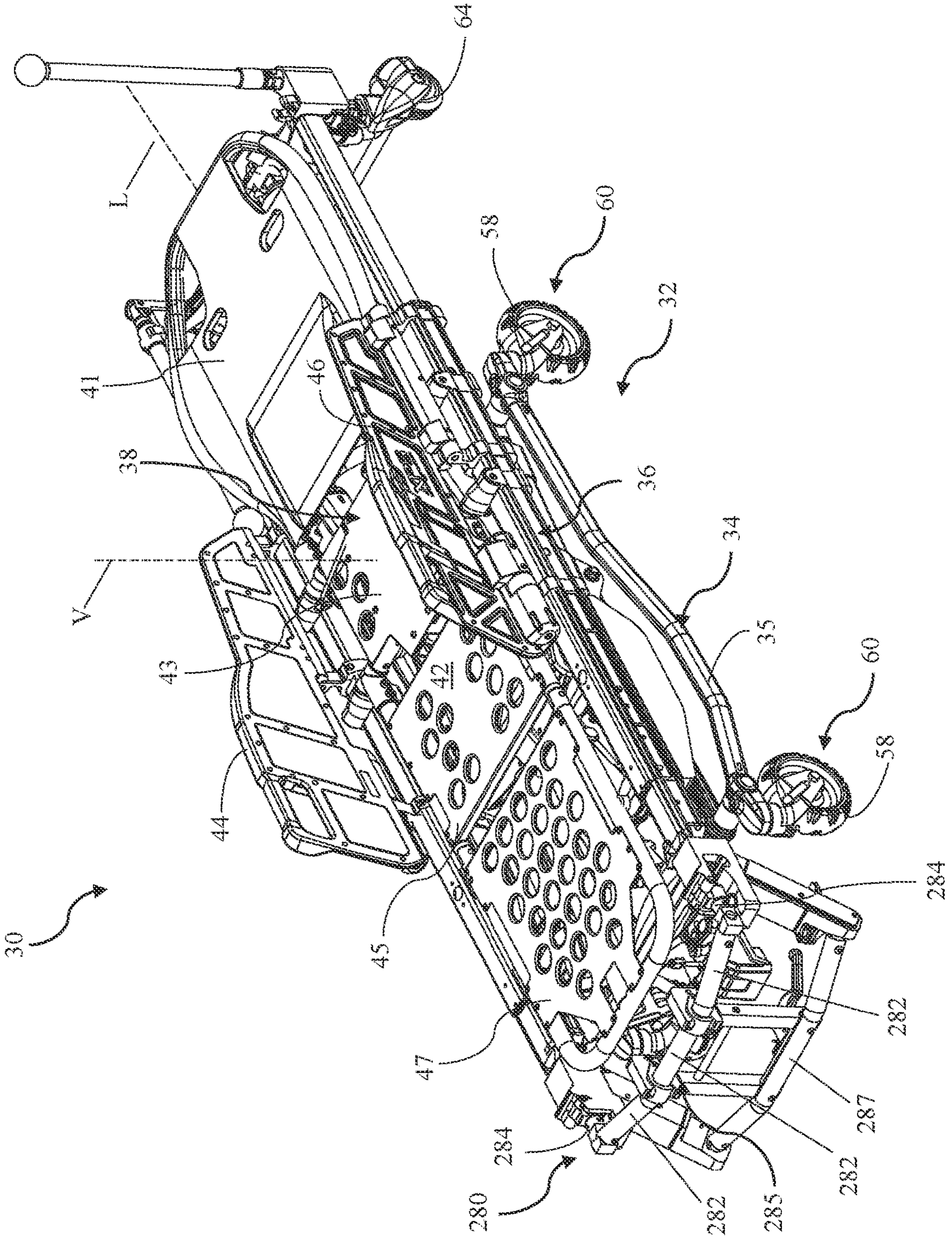
FIG. 43 is a perspective view of a patient transport apparatus at its lowest height with another handle assembly in the stowed position and in the first orientation.
Figure 43A:
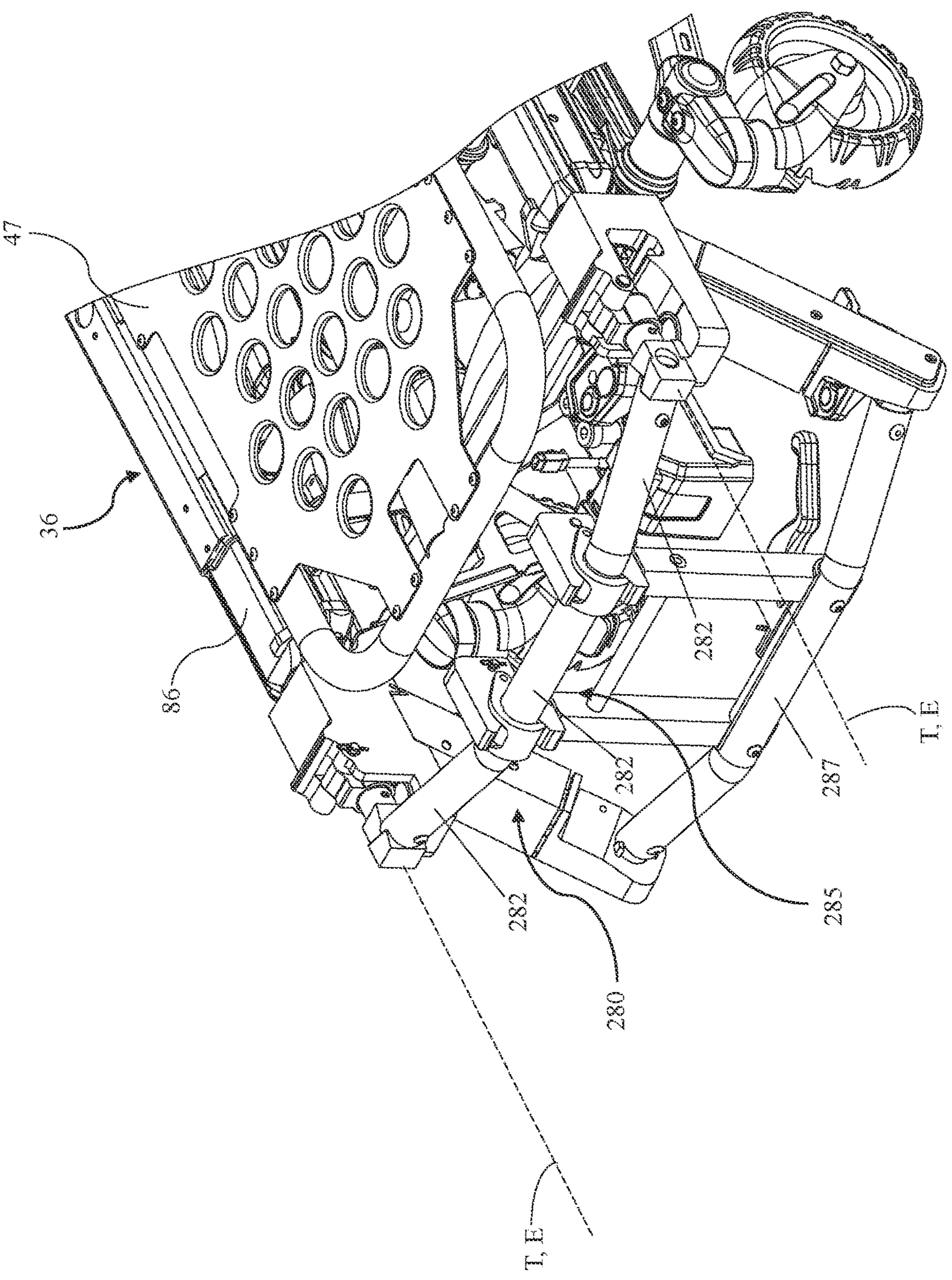
FIG. 43A is a perspective view of the handle assembly of FIG. 43 in the stowed position and in the first orientation.

Referring to FIG. 43, an alternative handle assembly 280 is coupled to the support frame 36. In the embodiment shown, the handle assembly 280 is arranged nearer the foot end than the head end, but may be present nearer the head end or at both ends in other embodiments. The handle assembly 280 may be located near the foot end, head end, and/or locations therebetween. The handle assembly 280 is provided to facilitate maneuvering of the patient transport apparatus 30. Such maneuvering includes, for example, pushing and pulling of the patient transport apparatus 30 on its wheels 58 along the floor surface and/or lifting and lowering of the patient transport apparatus 30, such as over bumps or curbs, or when loading the patient transport apparatus 30 into the emergency vehicle or unloading the patient transport apparatus 30 from the emergency vehicle. In other embodiments, the handle assembly 280 may be attached to the base 34, the patient support deck 38, or any other suitable location on the patient transport apparatus 30.

The handle assembly 280 comprises one or more adjustable handles 282 configured to be grasped and manipulated by a user to facilitate maneuvering of the patient transport apparatus 30. In the embodiment shown in FIG. 43, the handles 282 are fixed to one or more handle extensions 284. In the embodiment shown in FIGS. 43 through 45, the handles 282 form part of a crossbar 285 interconnecting the handle extensions 284. The handles 282 and handle extensions 284 are coupled together to move in unison relative to the support frame 36.

Figure 44:
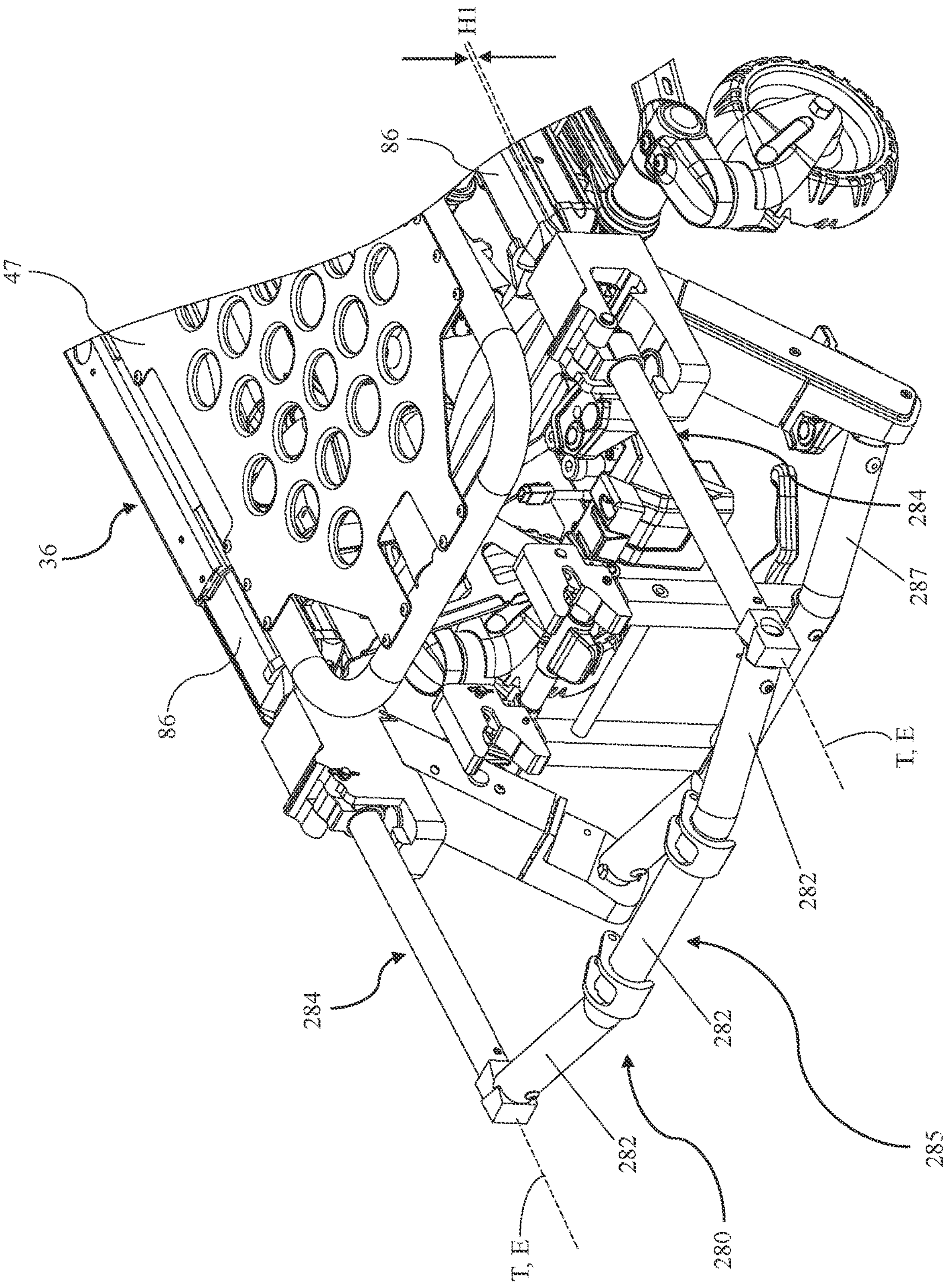
FIG. 44 is a perspective view of the handle assembly of FIG. 43 in the extended position and in the first orientation.

The handle assembly 280 is configured to translate relative to the support frame 36 from a stowed position (see FIG. 43) to an extended position as shown in FIG. 44. More specifically, the handle extensions 284 slide in translation within the rails 86 of the support frame 36 between the stowed position and the extended position. The rails 86 comprise translation axes T along which the handle extensions 284 slide from the stowed position to the extended position. The handles 282 can be grasped and used at the stowed position, the extended position, or any positions therebetween. As discussed further below, the handles 282 are lockable in a locked state at the stowed position. A lower handle 287 is shown coupled to the support frame 36. The handle assembly 280 is movable relative to the lower handle 287 from the stowed position to the extended position. The handle assembly 280 is limited from movement relative to the lower handle 287 in the locked state. In the locked state, the handles 282 and the lower handle 287 provide lift points for users to lift the patient transport apparatus 30.

The handles 282 are located adjacent to the support frame 36 in the stowed position and the handles 282 are longitudinally spaced from the support frame 36 by the handle extensions 284 in the extended position. The handles 282 have various uses in each of the stowed position and the extended position. In the stowed position, the handles 282 are conveniently located close to the support frame 36 so that the patient transport apparatus 30 can be easily moved in an elevator or other tight spaces. The handles 282 can be utilized in the stowed position to lift the patient transport apparatus 30. In the extended position, users are able to freely articulate the handle assembly 280 and associated handles 282 relative to the support frame 36 between a plurality of orientations and/or can secure the handle assembly 280 and associated handles 282 in one or more upright orientations to use the handle assembly 280 for pushing/pulling the patient transport apparatus 30. Other uses of the handles 282 in the stowed and extended positions, and positions therebetween, are also contemplated.

Figure 45:
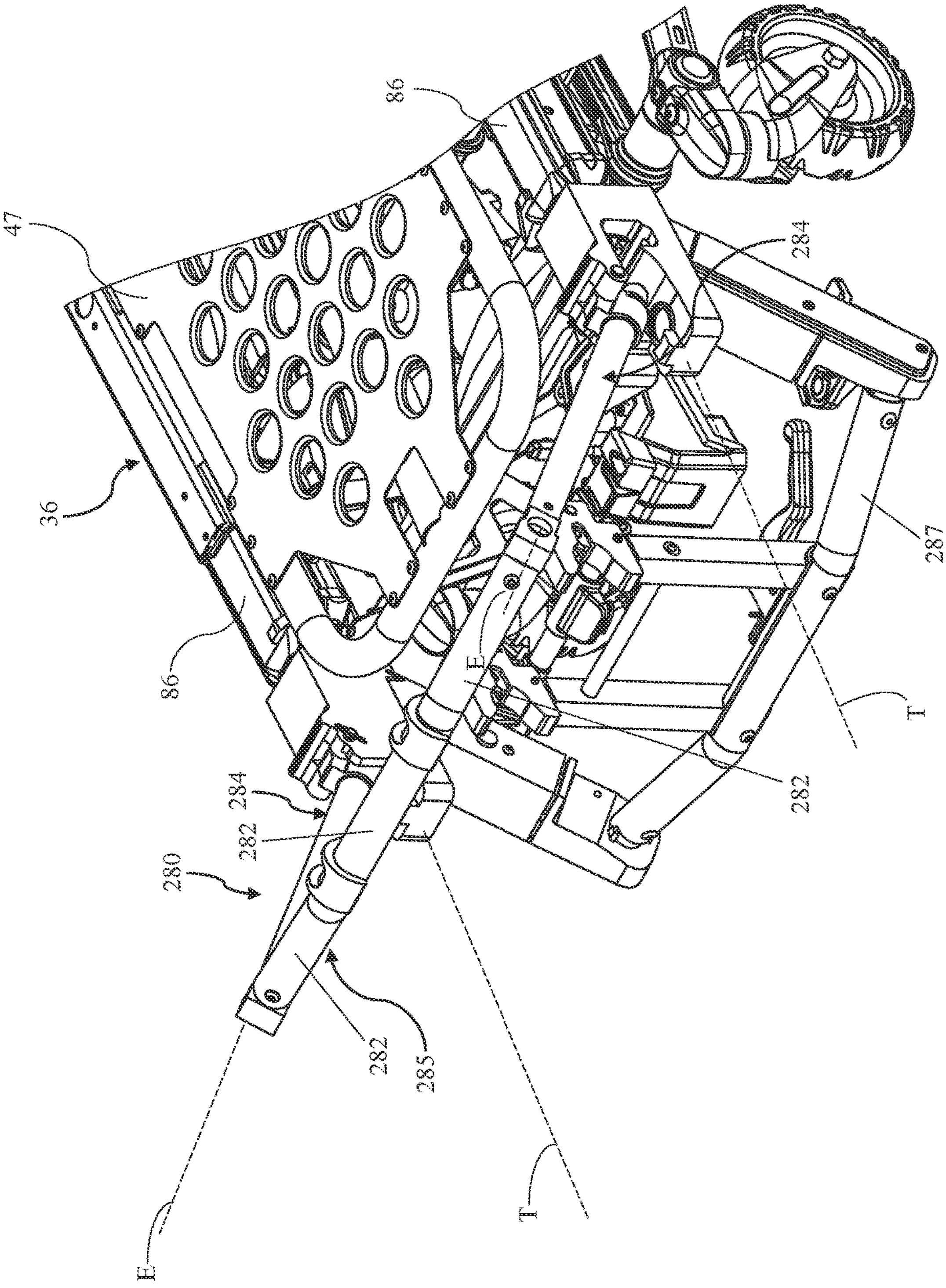
FIG. 45 is a perspective view of the handle assembly of FIG. 43 in the extended position and articulated from the first orientation.
Figure 46:
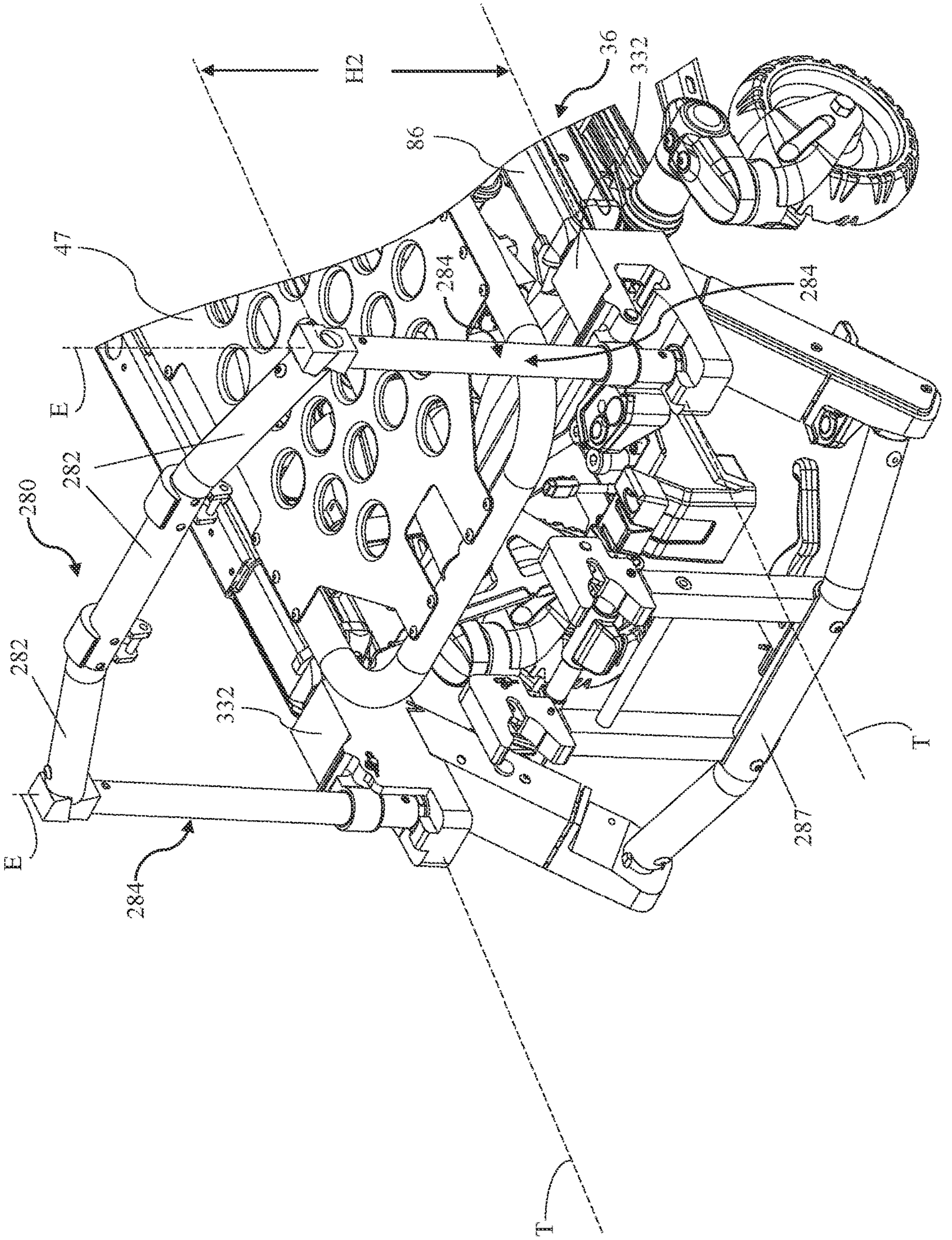
FIG. 46 is a perspective view of the handle assembly of FIG. 43 in the extended position and in the second orientation.

The handle assembly 280 and associated handles 282/handle extensions 284 are configured to freely articulate relative to the support frame 36 from a first orientation as shown in FIG. 44 to a second orientation shown in FIG. 46 (intermediate orientation shown in FIG. 45). In the embodiment shown, the handle assembly 280 is configured to freely articulate while in the extended position. It should be appreciated that the first orientation and the second orientation between which the handle assembly 280 is freely articulable could be any two orientations of the handle assembly 280 and is not limited to any two specific orientations. In one version, the first orientation comprises an orientation in which the handle extensions 284 are parallel to the associated rails 86 in which they slide. The second orientation comprises an upright orientation relative to the support frame 36, such as one in which the handle extensions 284 are parallel to the vertical axis V and/or perpendicular to the support frame 36. The handle extensions 284 comprise extension axes E parallel with the translation axes T of the rails 86 in the first orientation and transverse to the translation axes T in the second orientation. In the embodiment shown in FIG. 46, the extension axes E are perpendicular to the translation axes T in the upright orientation shown. It should be appreciated that other upright orientations are possible, such as other orientations in which the extension axes E are closer to perpendicular than parallel.

The handles 282 are located at the first height H1 relative to the support frame 36 in the first orientation (FIG. 44) and the handles 282 are located at the second height H2 relative to the support frame 36, greater than the first height, in the second orientation (FIG. 46). The heights H1, H2 can be measured from an uppermost surface of the support frame 36, from the translation axes T, from the patient support surface 42 (when all sections 41, 43, 45, 47 are horizontal), from the floor surface, or from any other suitable location to a closest surface of the handles 282, a center of mass of each of the handles 282, a geometric center of each of the handles 282, or to any other suitable location related to the handles 282. The heights H1, H2 may be measured vertically, parallel to the vertical axis V, or could be measured in other ways, such as normal to the support frame 36, e.g., when the support frame 36 is not horizontally positioned.

As shown in FIG. 44, the first height H1, which is illustrated as being nearly zero (and can be zero, or less than zero, in some cases), is measured vertically from the uppermost surface of the support frame 36 when horizontal to an uppermost surface of the handles 282. In FIG. 46, the second height H2 is measured vertically from the same uppermost surface of the support frame 36 to the lowermost surface of the handles 282 (or to the uppermost surface in some versions). Regardless of the way in which the heights are measured, the handles 282 provide users with various advantages at each of the heights. The handles 282 can also be positioned at desired heights to accommodate users of various heights.

In the first orientation, and at the first height H1, the handles 282 could be used to gain leverage and/or provide ergonomic lifting points when lifting the entire patient transport apparatus 30, for instance. In the second orientation, and at the second height H2, the handles 282 are conveniently elevated above the patient support surface 42 of the foot section 47 so that users are able to push/pull the patient transport apparatus 42 along the floor surface without bending over or slouching nearer the patient to reach the handles 282. The second height H2 may be at least 10, 12, 15, 18, 20, 25 inches, or more. In other embodiments, the second height H2 is greater than 0 inches, but less than 30 inches. In yet other embodiments, the second height H2 is from 10 to 30 inches. Other advantages and uses of the handles 282 in each of the first orientation, first height H1, second orientation, and second height H2 are also contemplated.

Figure 47:
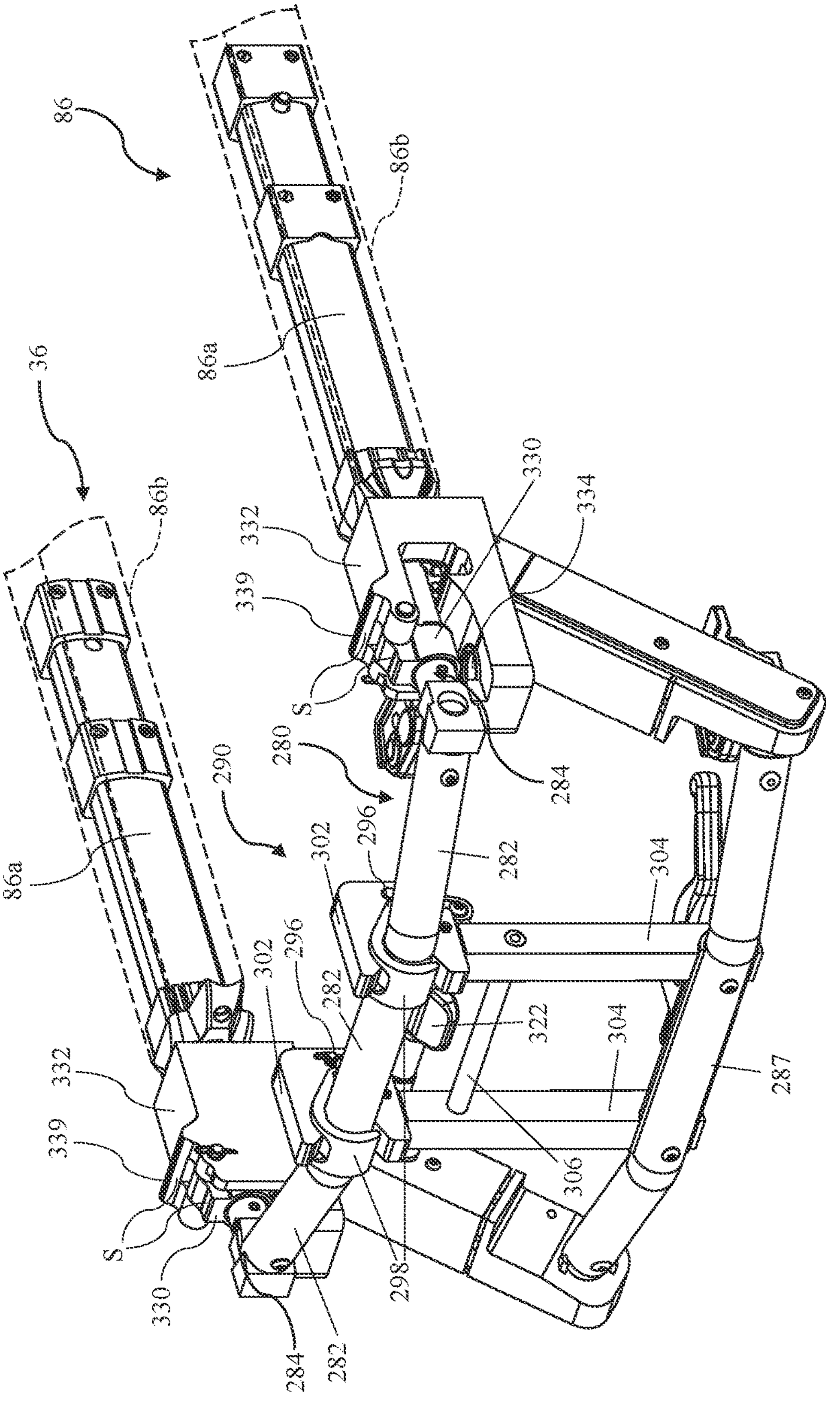
FIG. 47 is a perspective view of the handle assembly of FIG. 43 illustrated separate from the remainder of the patient transport apparatus.
Figure 48:
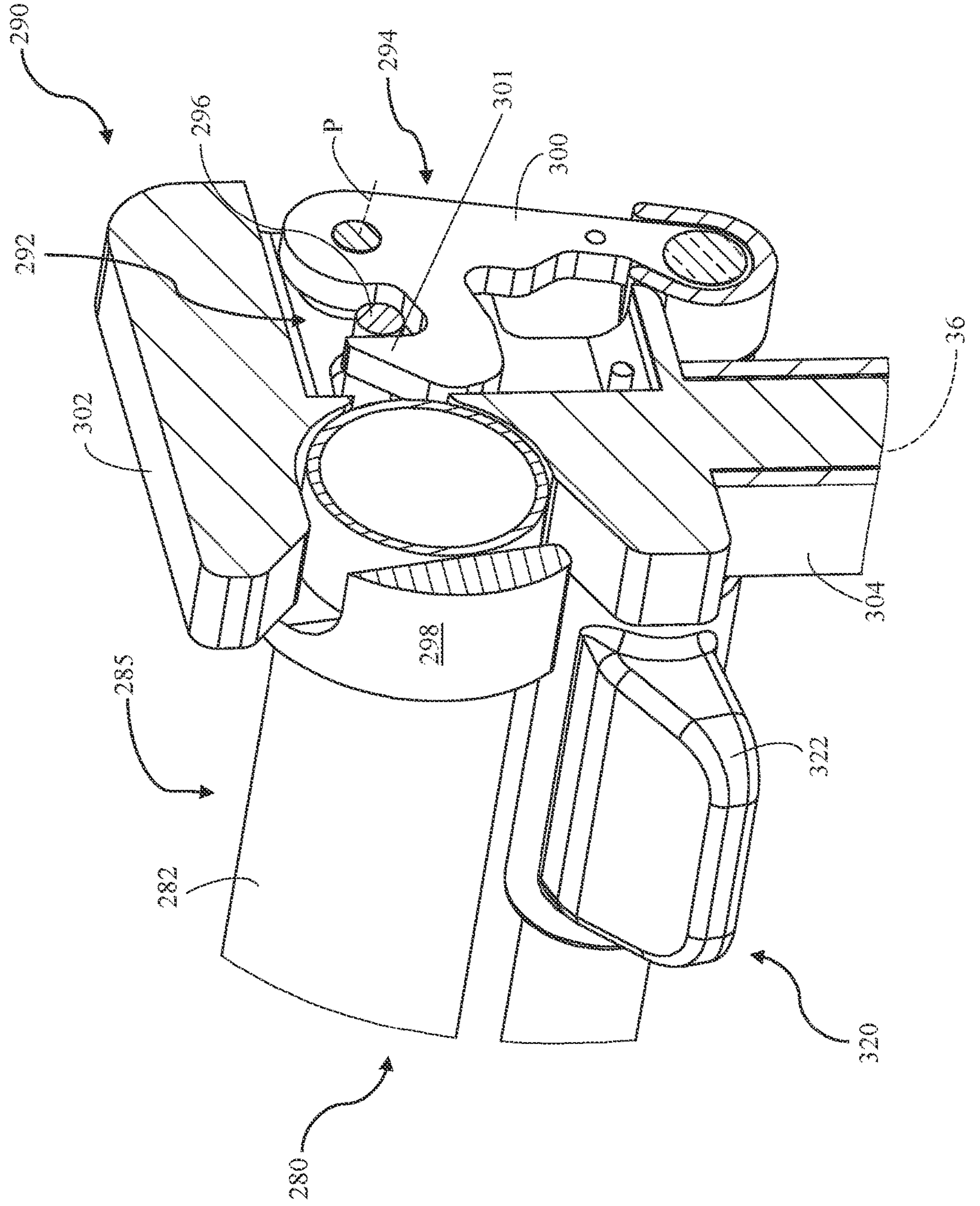
FIG. 48 is a perspective cross-sectional view of a locking device and a release device for the handle assembly of FIG. 43.

Referring to FIG. 47, the handle assembly 280 comprises a locking device 290 configured to lock the handle assembly 280 relative to the support frame 36 in the stowed position. As best shown in FIGS. 48 through 51, the locking device 290 comprises first locking elements 292 connected to the handle assembly 280 and second locking elements 294 connected to the support frame 36. It should be noted that, while FIGS. 48 through 51 show only one pair of such locking elements 292, 294, two pairs of such locking elements 292, 294 are present in the embodiment shown. In other embodiments, only one pair of locking elements 292, 294 may be present or additional pairs of locking elements 292, 294 may be employed.

The first locking elements 292 comprise latches and the second locking elements 294 comprise catches adapted to receive the latches and hold the handle assembly 280 in a locked state. The latches shown comprise pins 296 that are fixed relative to the handles 282. Collars 298 are disposed about the crossbar 285 and are fixed to the crossbar 285 adjacent to the handles 282 to present the pins 296 for receipt by the catches when the handle assembly 280 is moved to the stowed position.

The catches shown comprise pivot arms 300 that are pivotally connected to lock housings 302. The pivot arms 300 have hooks 301 shaped to capture the pins 296 in the locked state. The lock housings 302 are fixed at one end of support arms 304. The support arms 304 are fixed to and extend upwardly from the lower handle 287. An interconnecting support 306 interconnects the support arms 304 near the lock housing 302 for additional support. A spring 308 extends between each of the lock housing 302 and the associated pivot arms 300 to bias the pivot arms 300 toward their locked state, as shown in FIG. 49.

Figure 49:
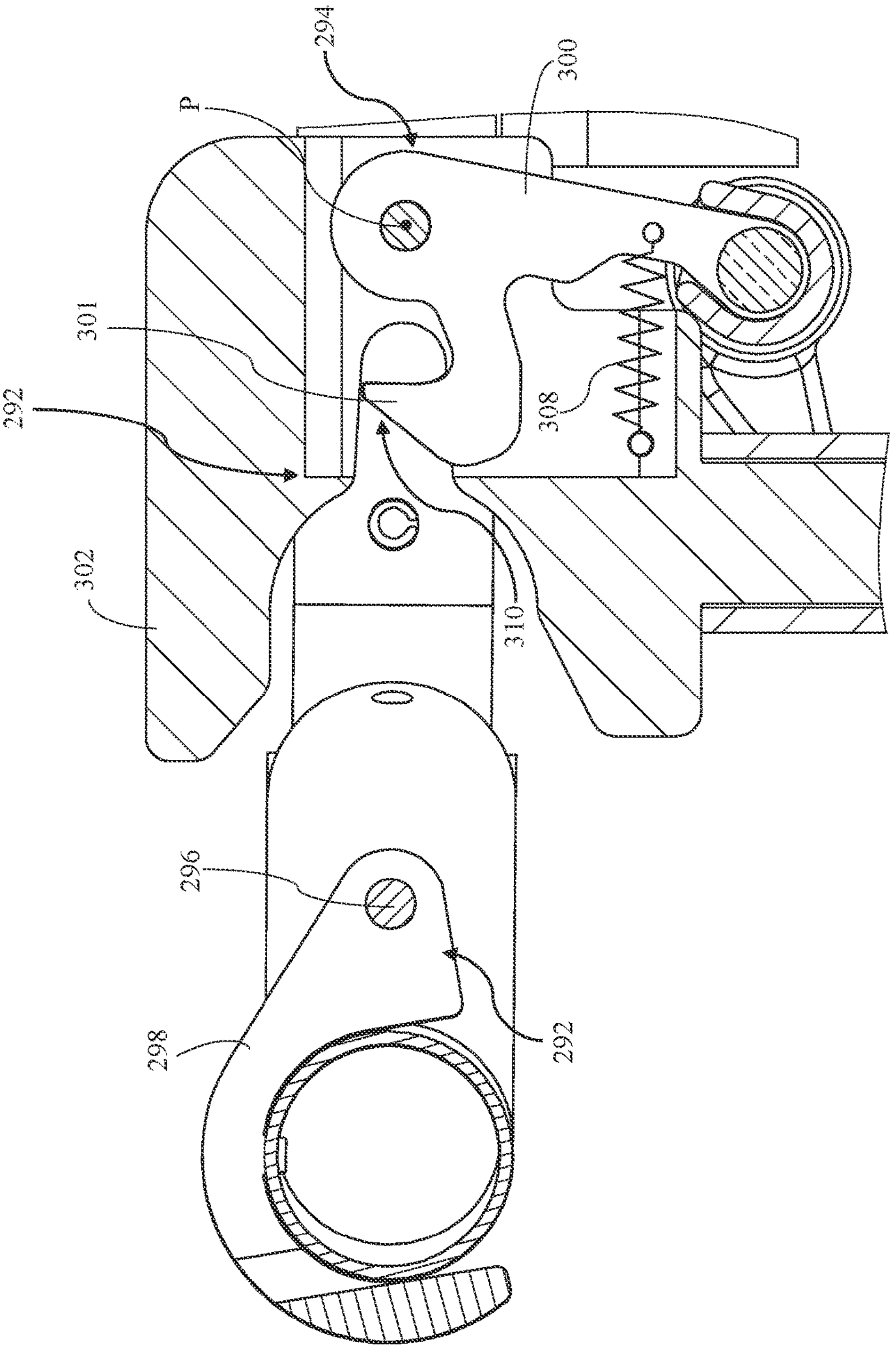
FIGS. 49 through 51 are cross-sectional views illustrating the latching of the handle assembly of FIG. 43 to a frame of the patient transport apparatus.
Figure 50:
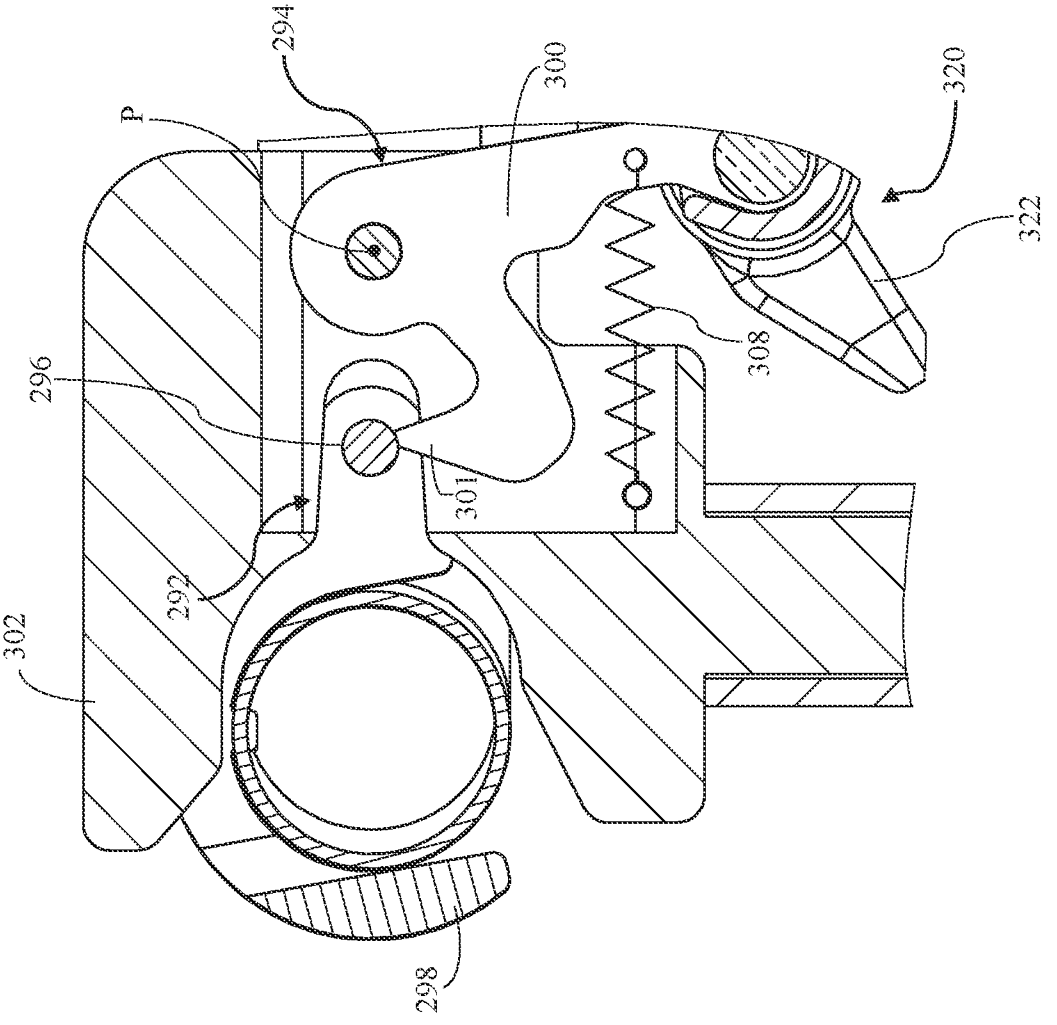
Figure 51:
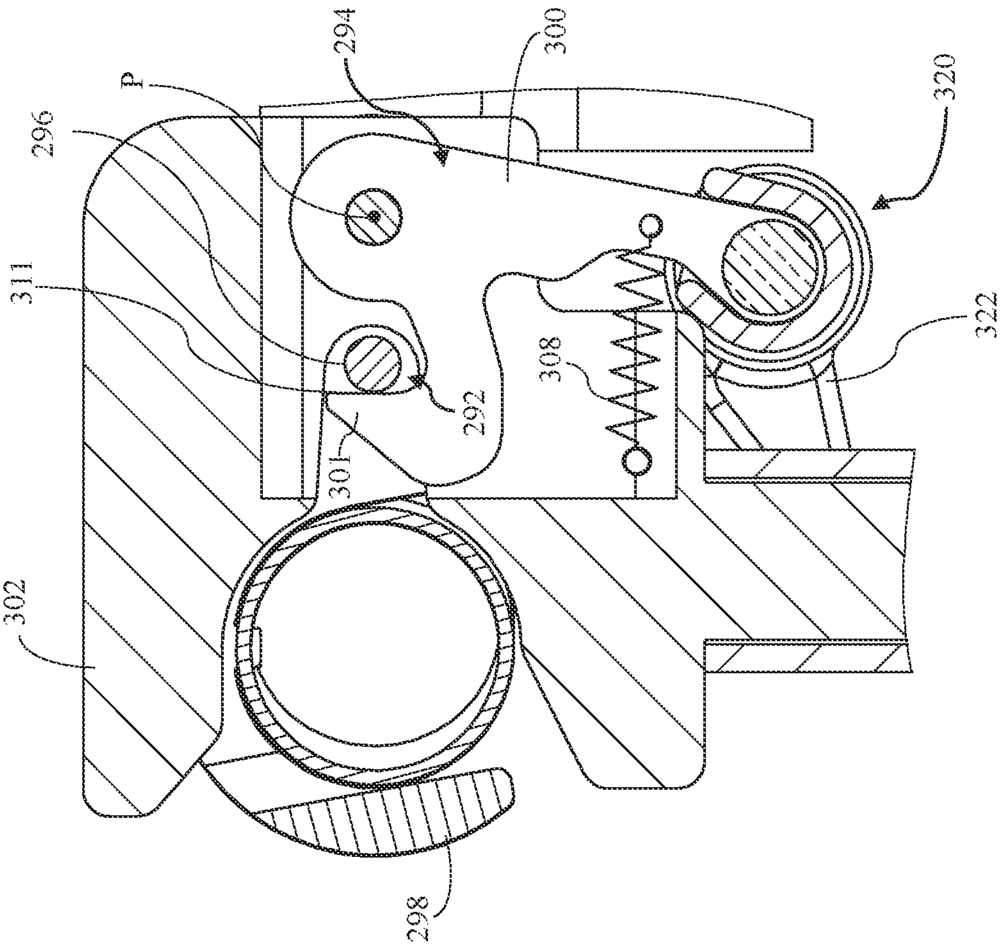
Figure 52:
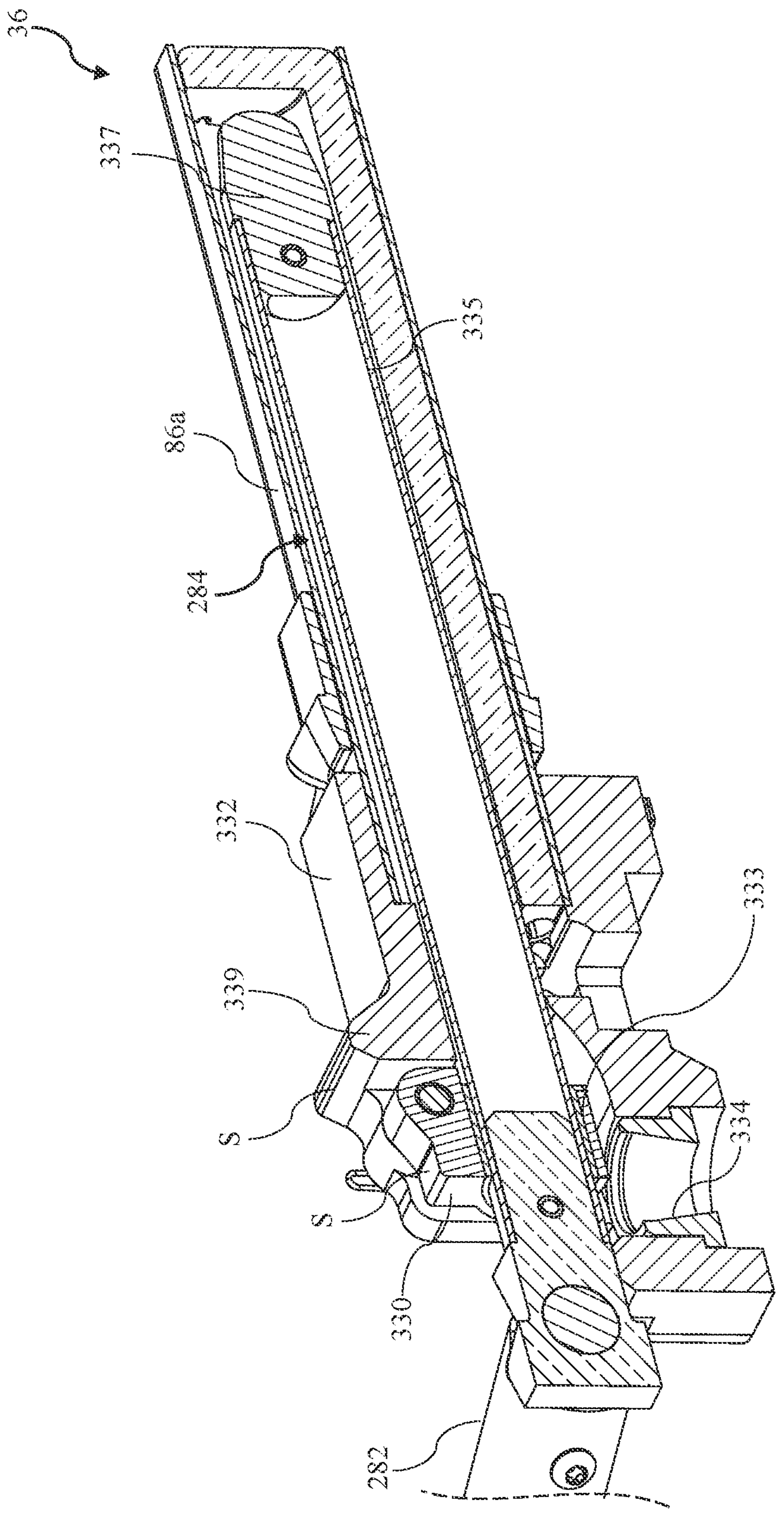
FIG. 52 is a perspective cross-sectional view of a portion of the handle assembly of FIG. 43 illustrating the handle extension in the stowed position.

In operation, referring to FIGS. 49 through 51, when moving the handle assembly 280 from the extended position toward the stowed position, the pins 296 first engage outer cam surfaces 310 of the pivot arms 300. When the user continues to apply force to the handles 282 to move the handle assembly 280 toward the stowed position, the pins 296 transmit such force to pivot the pivot arms 300 about their corresponding pivot axes P against the bias of the springs 308, as shown in FIG. 50, until the pins 296 pass the hooks 301. Once past, the pins 296 fall into catch pockets in the hooks 301 for capture therein in the locked state, as shown in FIG. 51. Owing to the shape of the hooks 301, the pins 296 are retained in the hooks 301 even with attempts to withdraw the pins 296 by pulling on the handles 282. More specifically, the hooks 301 have inner cam surfaces 311 that pull the hooks 301 further into the locked state upon such attempts. Accordingly, the locking device 290 limits movement of the handle assembly 280 from the stowed position.

A release device 320 is configured to cooperate with the locking device 290 to release the first locking elements 292 from the second locking elements 294 to allow movement of the handle assembly 280 from the stowed position to the extended position. The release device 320 comprises a manual actuator 322 (see FIG. 48) coupled to the second locking elements 294. The manual actuator 322 is configured to be operated by the user to release the first locking elements 292 from the second locking element 294. The manual actuator 322 shown in FIG. 48 comprises a lever fixed to the pivot arms 300 to pivot the pivot arms 300 out of their locked state such that the pins 296 are free from the hooks 301. Actuation of the manual actuator 322 would result in movement similar to that shown in FIG. 50.

Referring to FIGS. 47 and 52 through 56, the handle assembly 280 comprises one or more pivot brackets 330. The pivot brackets 330 are pivotally connected to one or more support brackets 332, which are connected to the support frame 36. In the embodiment shown, the support brackets 332 are fixed to the rails 86 of the support frame 36. In one version, the rails 86 are extendible and comprise extension rails **86*a* that telescope inside and relative to outer rails 86*b*, as shown in FIG. 47. The extensions rails 86*a* may be configured to lock in a plurality of various extension positions relative to the outer rails 86*b*. The rails 86*a*, 86*b* form part of the support frame 36. In the embodiment shown, the support brackets 332 are fixed to the extension rails 86*a* to extend/retract with the extension rails 86*a* relative to the outer rails 86*b***.

Figure 55:
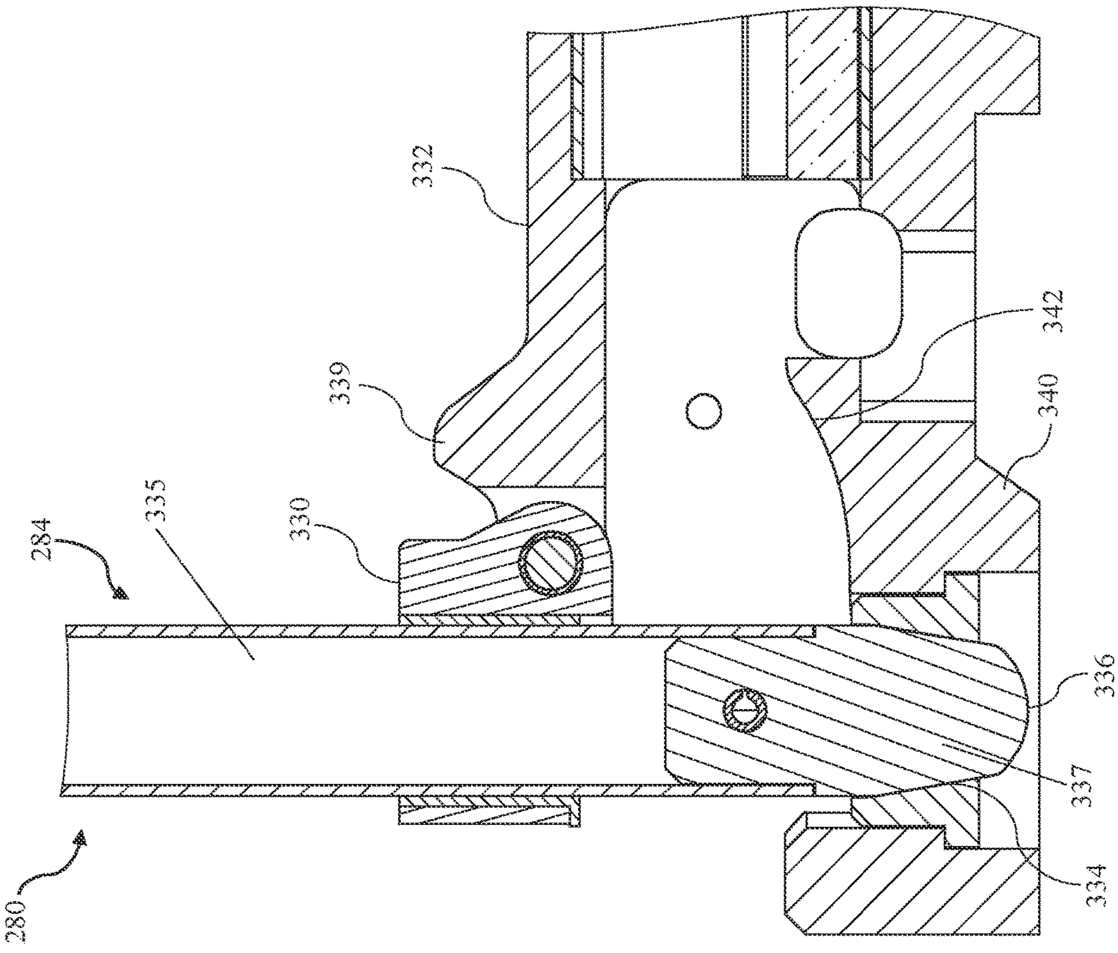

The pivot brackets 330 are pivotally connected to the support brackets 332 to form pivot joints so that the pivot brackets 330 are capable of pivoting relative to the support frame 36. As a result, the handle assembly 280 is able to freely pivot relative to the support frame 36 between the first orientation and the second orientation. The handle extensions 284 are slidable relative to the pivot brackets 330 from the stowed position (FIG. 52) to the extended position (FIG. 53) and pivot with the pivot brackets 330 between the first orientation (FIG. 53) and the second orientation (FIG. 55). The pivot brackets 330 define openings 333 (see FIG. 52) in which the handle extensions 284 slide. The pivot brackets 330 may comprise bushings (not numbered) to define the openings 333 and support sliding of the handle extensions 284 therein.

The support brackets 332 are connected to the support frame 36 to support and secure the handle extensions 284 in the second orientation. More specifically, the support brackets 332 comprise one or more pockets 334 sized and shaped to receive and releasably hold distal ends 336 of the handle extensions 284 in the second orientation (FIG. 55) so that the handle assembly 280 is secured for being pushed/pulled when maneuvering the patient transport apparatus 30 with the handle assembly 280. In some versions, the handle assembly 280 may be locked in the second orientation. Each of the handle extensions 284 comprises a tube 335 and a distal body 337 attached to the tube 335 to form the distal end 336. The distal body 337 may be solid in some embodiments or hollow in other embodiments.

Figure 53:
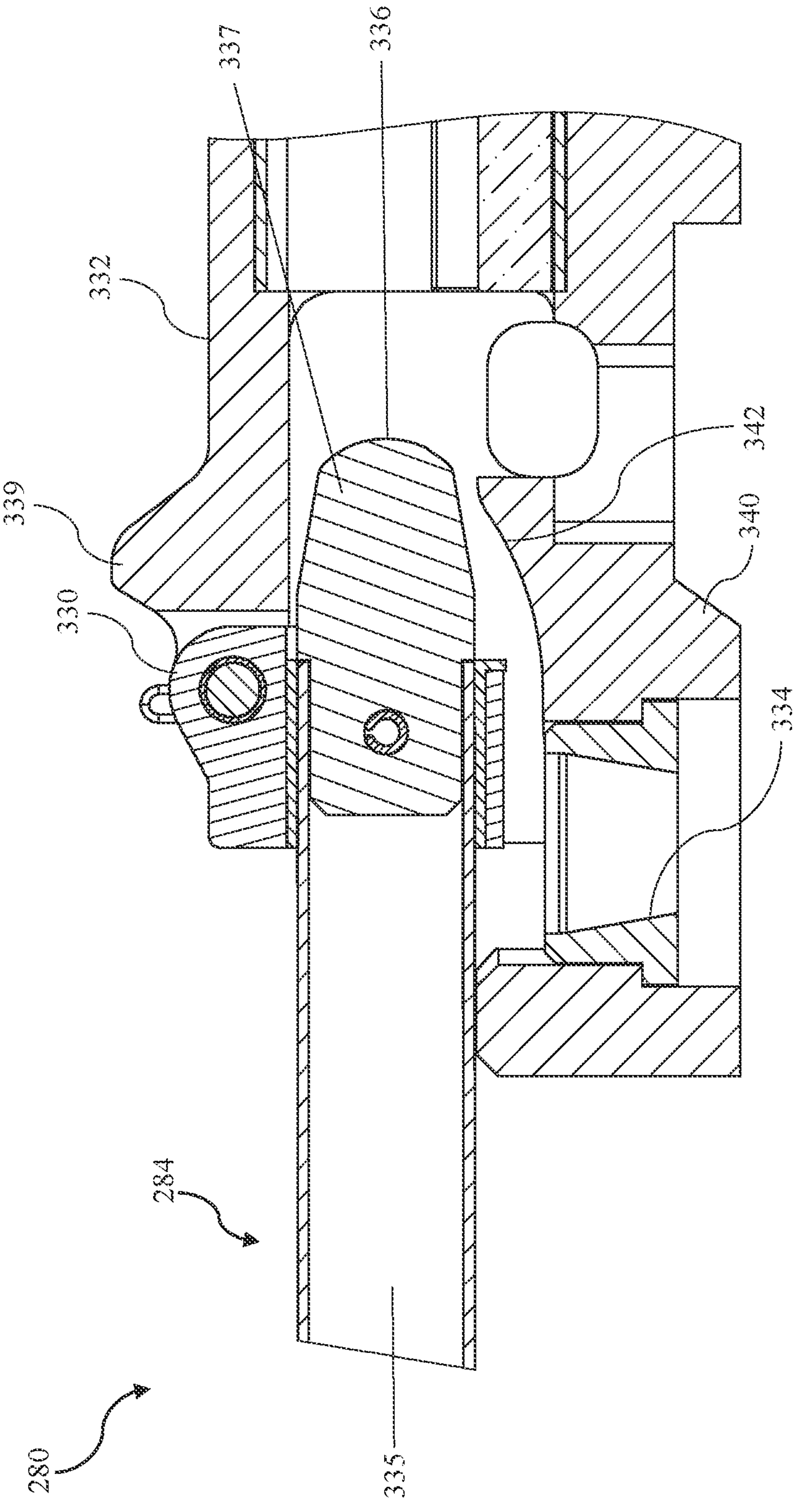
FIGS. 53 through 56 are cross-sectional views illustrating movement of the handle extension of FIG. 52 to the extended position in the first orientation, articulated from the first orientation, further articulated to the second orientation, and then articulated to a resting orientation.
Figure 54:
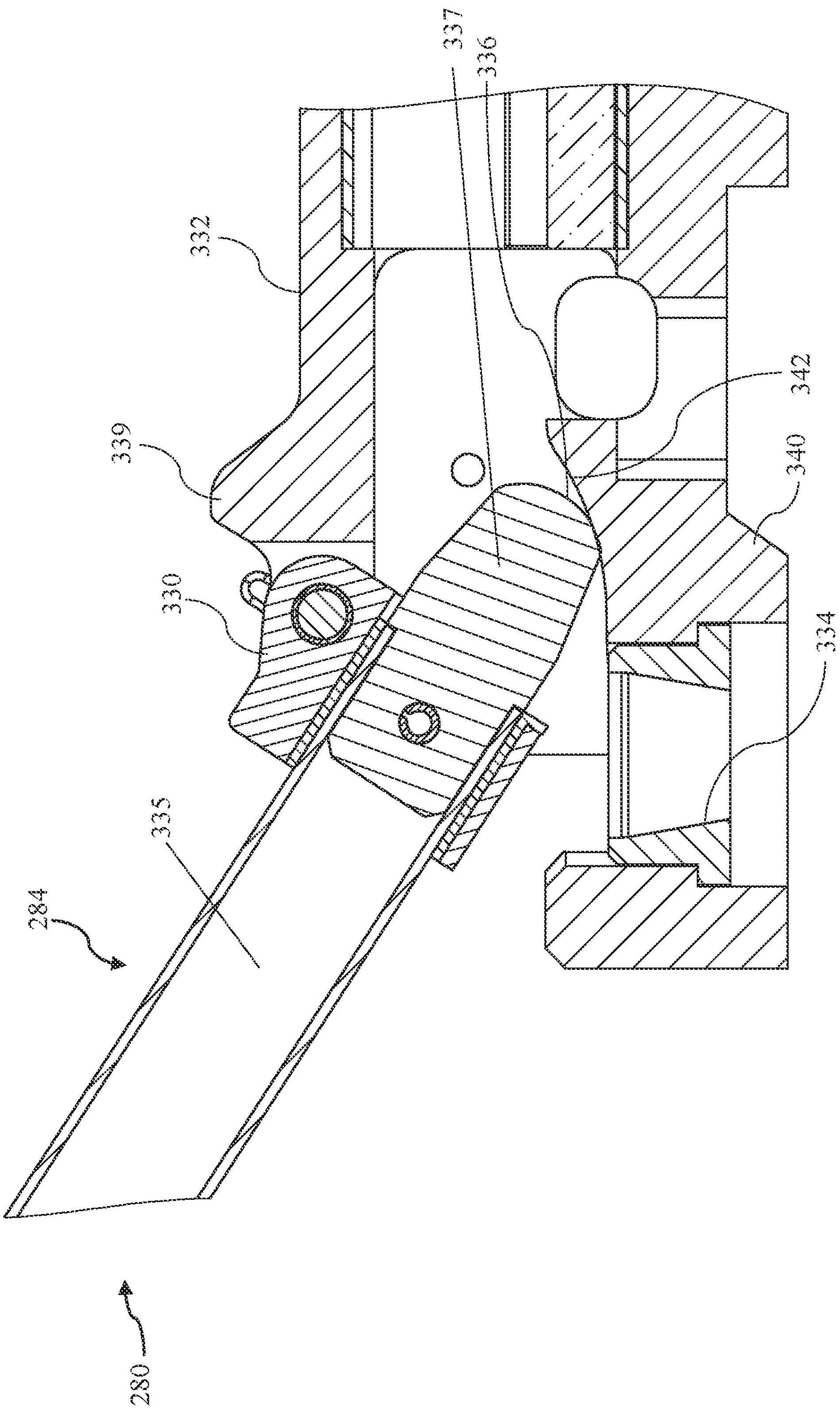

The pockets 334 have a depth to which the distal ends 336 of the handle extensions 284 are inserted. In operation, the user first slides the handles extensions 284 in the first orientation from the stowed position (after release from the locking device 290) to the extended position (FIG. 53). The handle extensions 284 thus slide relative to the pivot brackets 330 until they reach the extended position. Notably, the distal body 337 is shaped with an enlarged portion that is sized to be greater in diameter than the opening 333 so that the handle extensions 284 are prevented from being pulled beyond the extended position. Next, the user articulates the handle extensions 284 (and the pivot brackets 330) from the first orientation to the second orientation (FIG. 55). Finally, the user then distally lowers the handle extensions 284 (with the assistance of gravity) to insert the distal ends 336 and associated portions of the distal body 337 of the handle extensions 284 into the pockets 334. During this movement, the handle extensions 284 slide downwardly slightly relative to the pivot brackets 330 until secured within the pockets 334. The pockets 334 may be defined by inserts as shown, which may be tapered to capture the distal bodies 337 and prevent them from passing therethrough.

The support brackets 332 further comprise guides 340 to facilitate movement of the distal ends 336 and associated portion of the distal bodies 337 of the handle extensions 284, either from the second orientation back to the first orientation, or vice versa, while simultaneously moving the handle assembly 280 toward the stowed position or the extended position. The guides 340 have surface profiles 342 shaped to guide the distal ends 336 of the handle extensions 284. The surface profiles 342 comprise arcuate profiles with the distal ends 336 of the handle extensions 284 being configured to ride along the arcuate profiles during extension/retraction and/or reorientation of the handle extensions 284. In the embodiment shown, the surface profile 342 ramps gradually upwardly in an arcuate manner toward the head end of the patient transport apparatus 30. The distal body 337 has a corresponding rounded profile to enable smooth contact between the distal body 337 and the guide 340 and little resistance to sliding of the distal body 337 along the guide 340. The distal body 337 and the guide 340 may be formed of low friction materials, such as polytetrafluoroethylene (PTFE), may having coatings of such material, or may be formed of any suitable material that allow such sliding.

Figure 56:
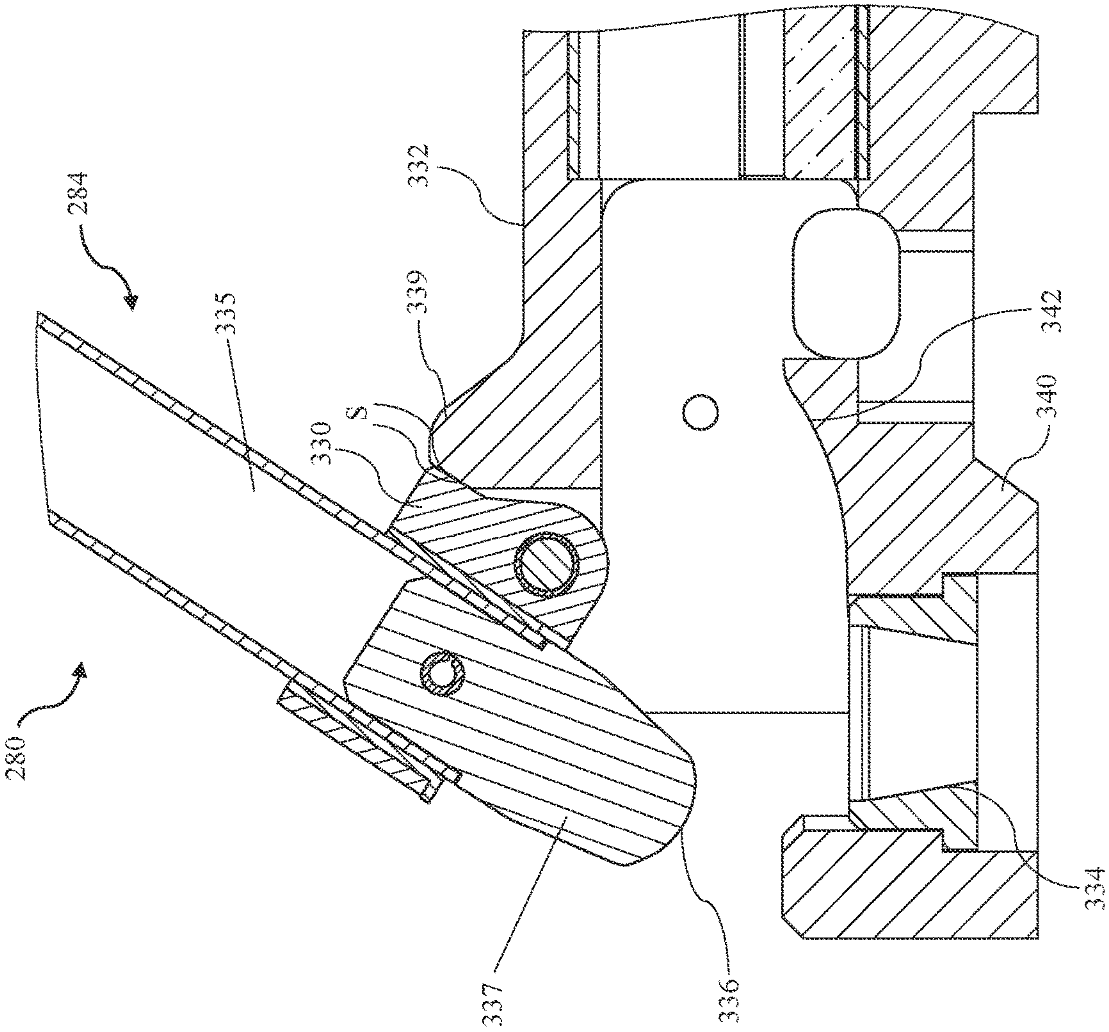

Referring to FIG. 56, the support brackets 332 further comprise stops 339 having stop surfaces shaped to engage and limit rotation of the handle assembly 280 beyond a predetermined orientation. In the embodiment shown, the stops 339 are located so that the handle assembly 280 is able to rotate beyond the second orientation (FIG. 55) to a resting orientation beyond the second orientation. More specifically, the pivot brackets 330 and the support brackets 332 have cooperating stop surfaces S, S (see FIG. 56) that engage one another when the user pivots the handle assembly 280 about the pivot axis beyond the second orientation to the resting orientation.

In this version, the resting orientation is one in which the handle extensions 284 (and pivot brackets 330) are able to rest under the influence of gravity against the support brackets 332, but still remain out of the way of the user if the user is present at the foot end of the patient support apparatus 30. In this way, the user is able to rotate the handle assembly 280 up and beyond the second orientation and rest the handle assembly 280 against the stops 339 of the support brackets 332. This may be to merely clear the handle assembly 280 away from the face of the user or to more easily access, for instance, the lower handle 287. Notably, in the embodiment shown, the handle assembly 280 remains unlocked when in this resting orientation and, in some cases, unsecured. In other words, any force applied to the handle assembly 280 about the pivot axis of the pivot brackets 330, in a direction away from the stop surfaces S, would result in rotation of the handle assembly 280. Furthermore, although not shown in FIG. 56, the handle extensions 284 may slide downwardly under the force of gravity until they engage a shoulder 341 of the support brackets 332, but will still remain unlocked and unsecured. In other embodiments, the handle assembly 280 may be locked and/or secured in the resting orientation.

Figure 57:
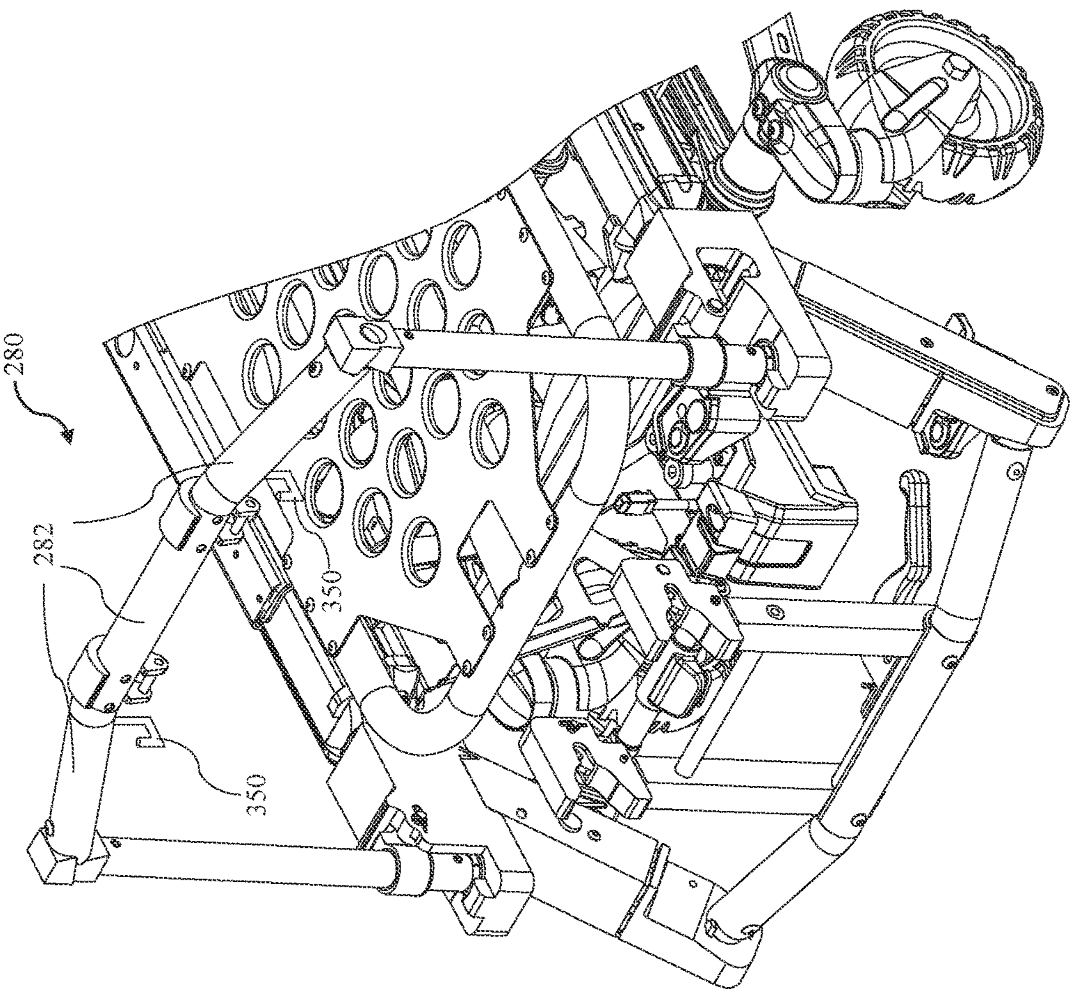
FIG. 57 is a partial perspective view illustrating support hooks connected to the handle assembly of FIG. 43 to support various items.

Referring to FIG. 57, in certain embodiments, support hooks 350 may be mounted to the handle assembly 280, such as shown adjacent to the handles 282. The support hooks 350 may be fixed to the handles 282 or movable on the handles 282. The support hooks 350 may be J-shaped hooks like those shown or may comprise carabiners or other similar form of device for hanging or mounting items, such as personal items, medical equipment, and the like.

Figure 58:
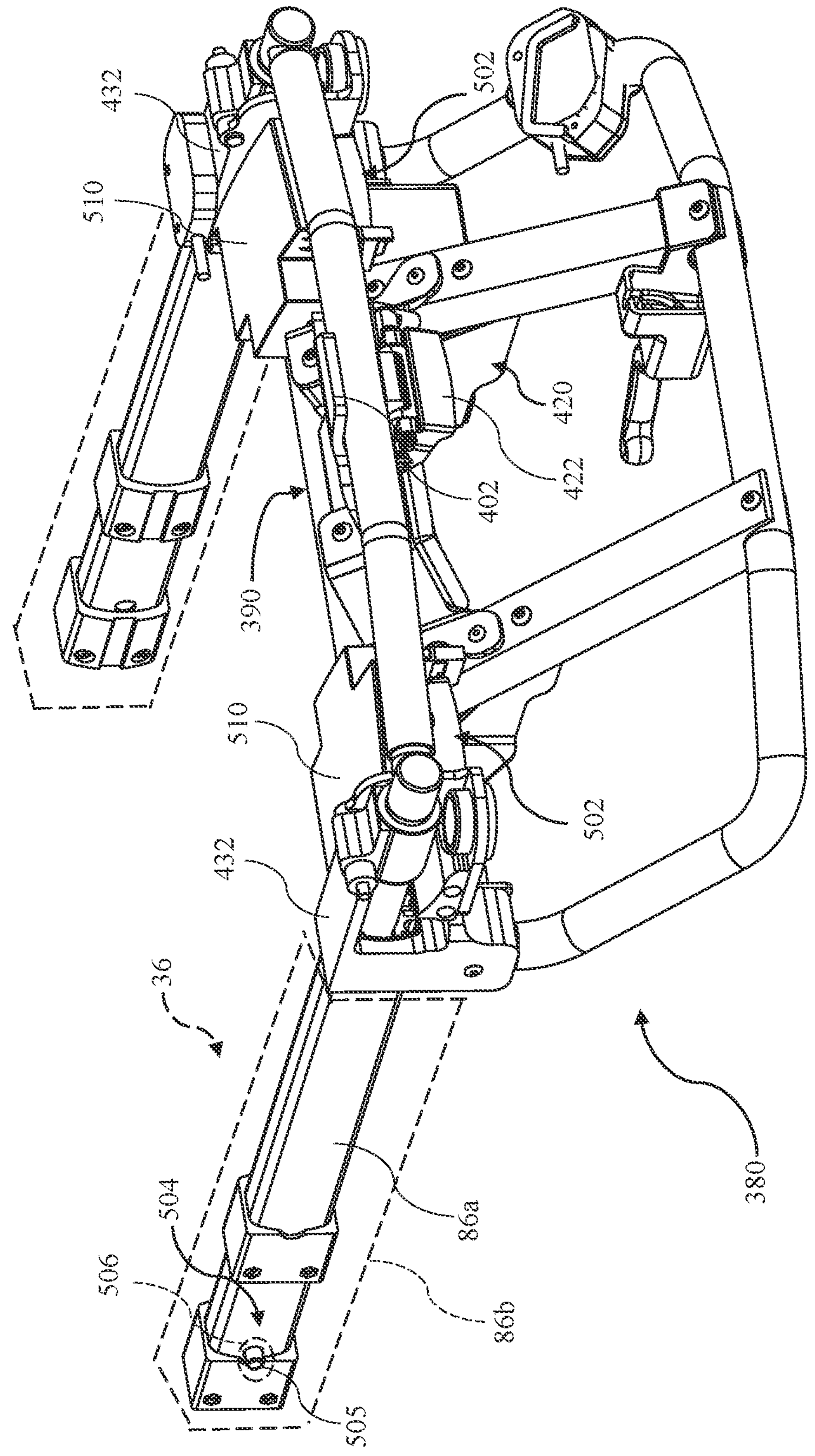
FIGS. 58-60 are various perspective views of another handle assembly in the stowed position and in the first orientation.
Figure 59:
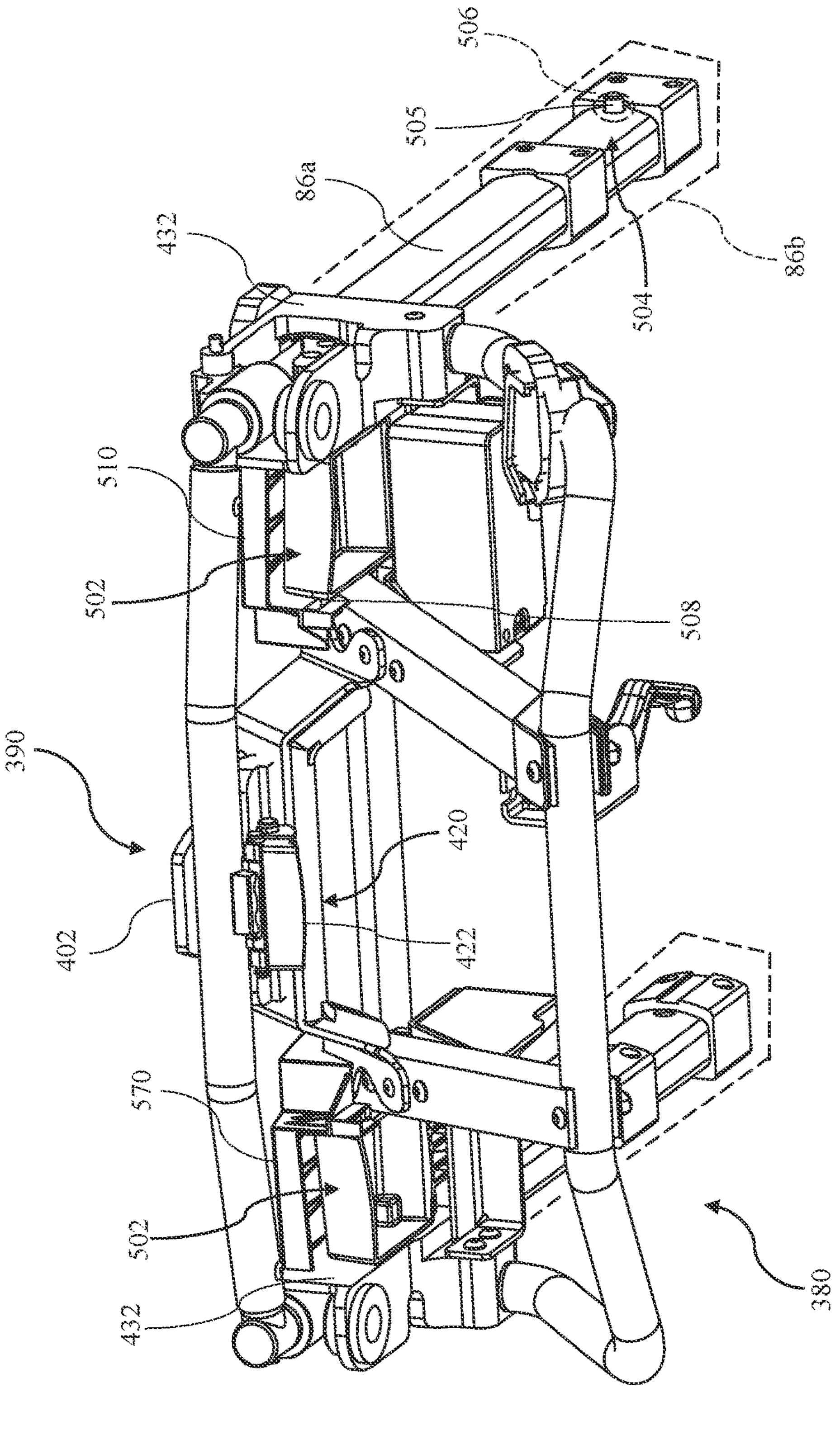
Figure 60:
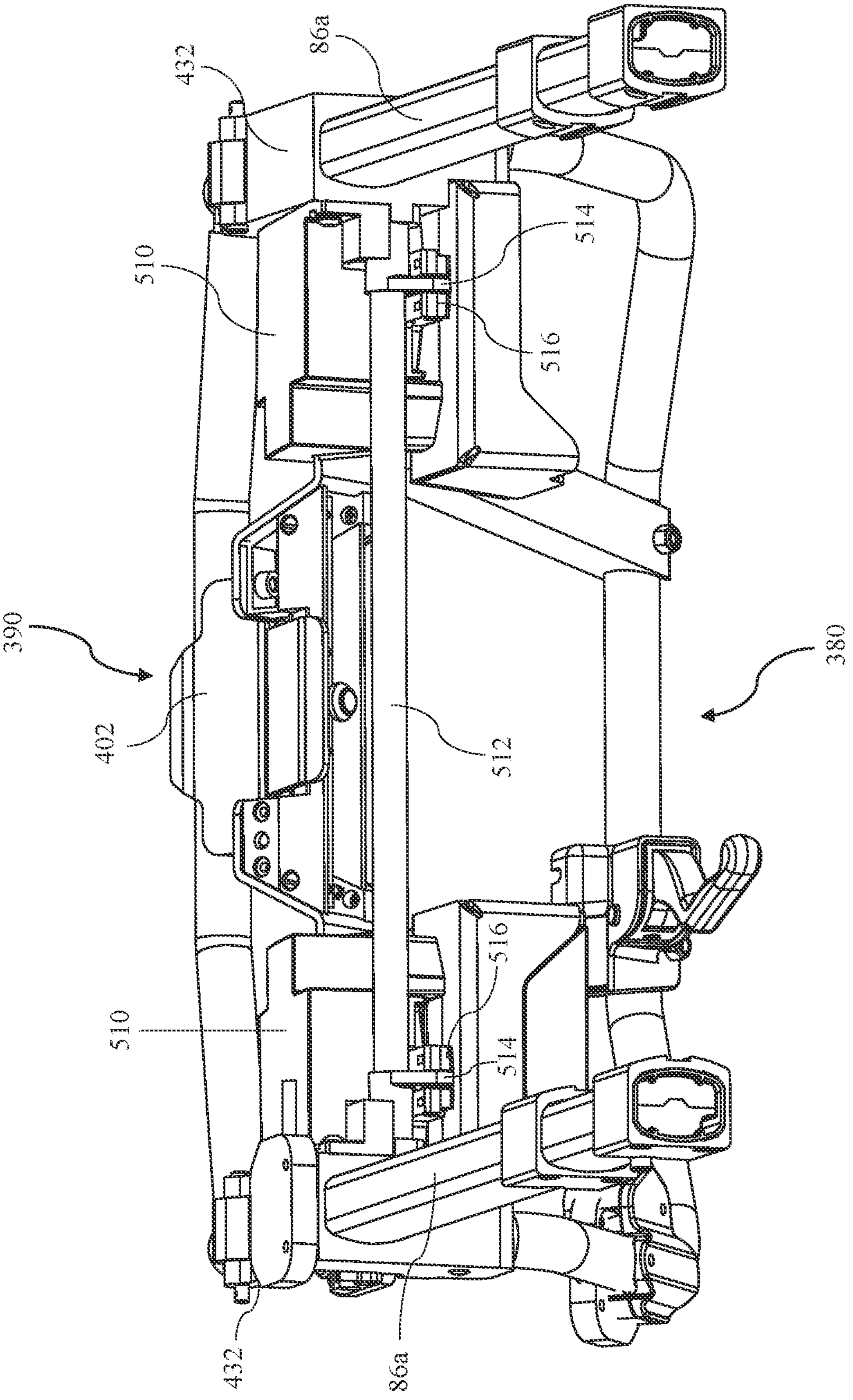
Figure 61A:
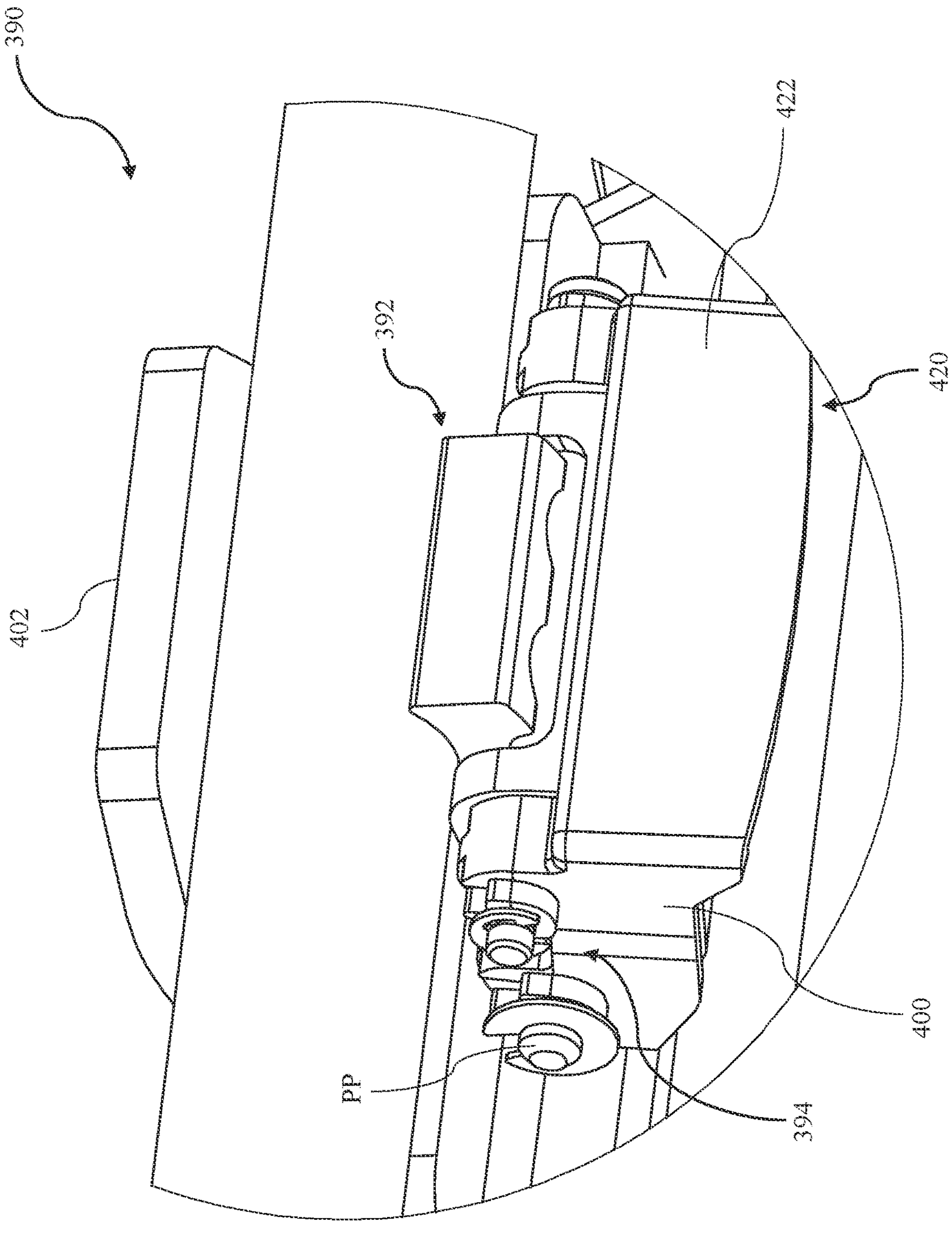
FIGS. 61A and 61B are partial perspective views of a manual actuator moving from a locked state (FIG. 61A) to an unlocked state (FIG. 61B).
Figure 61B:
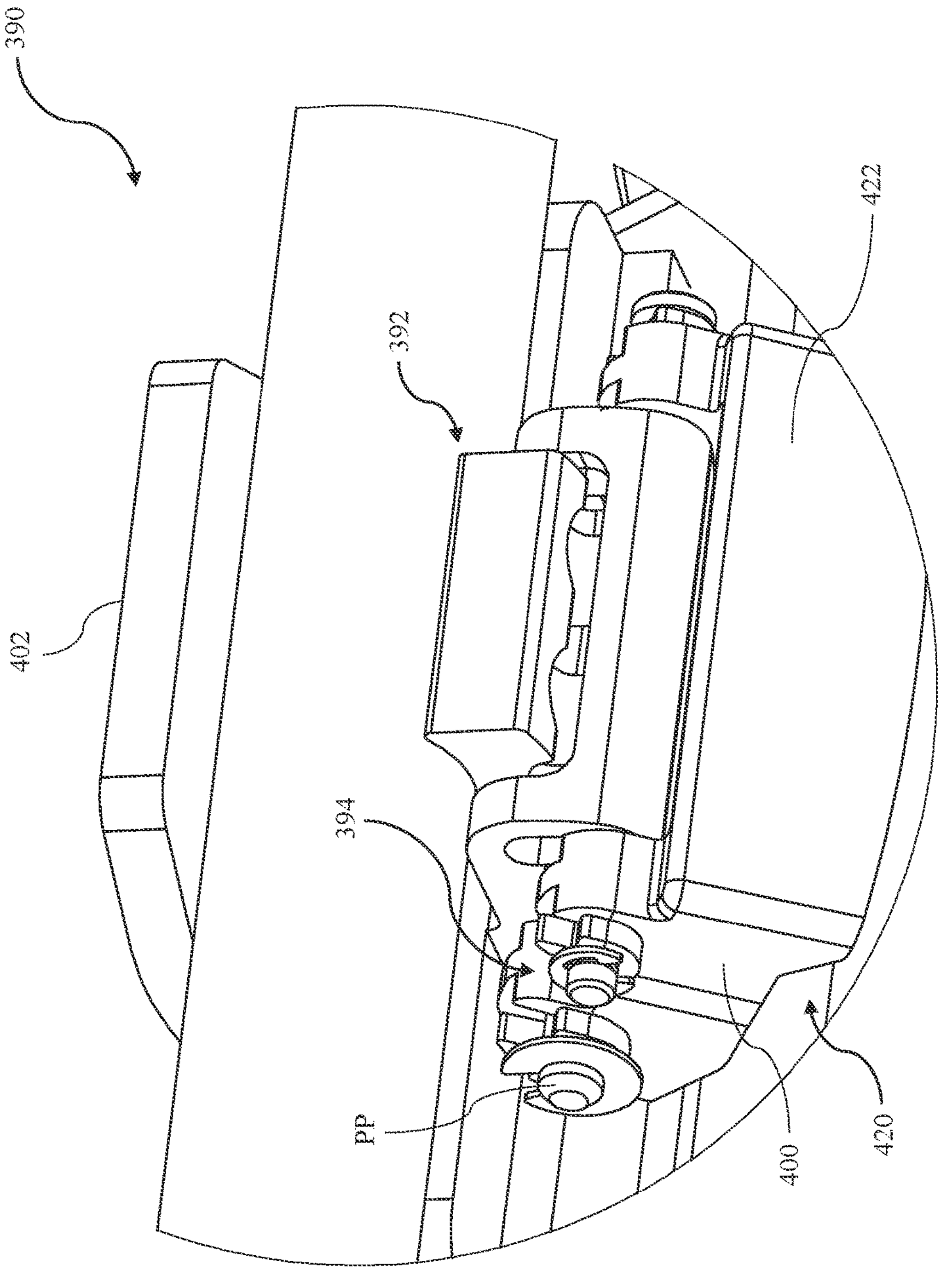
Figure 62A:
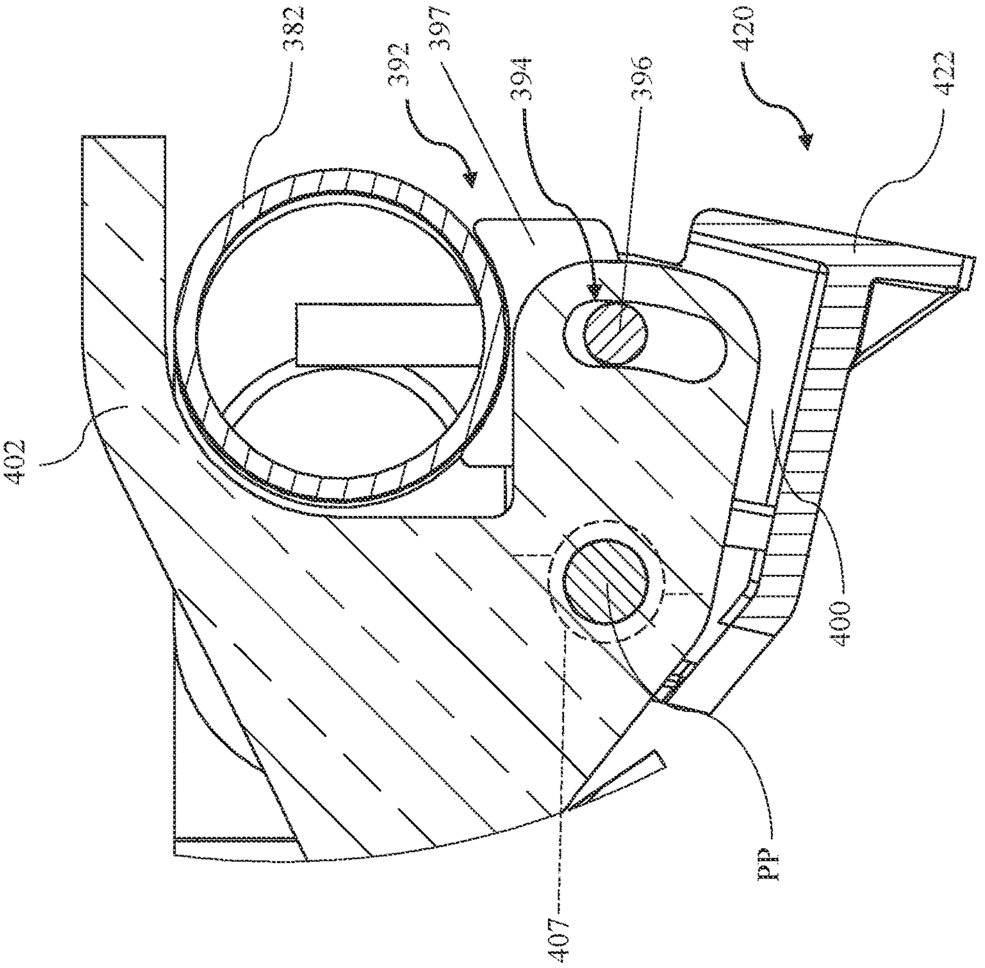
FIGS. 62A and 62B are partial cross-sectional views of the manual actuator moving from the locked state (FIG. 62A) to the unlocked state (FIG. 62B).
Figure 62B:
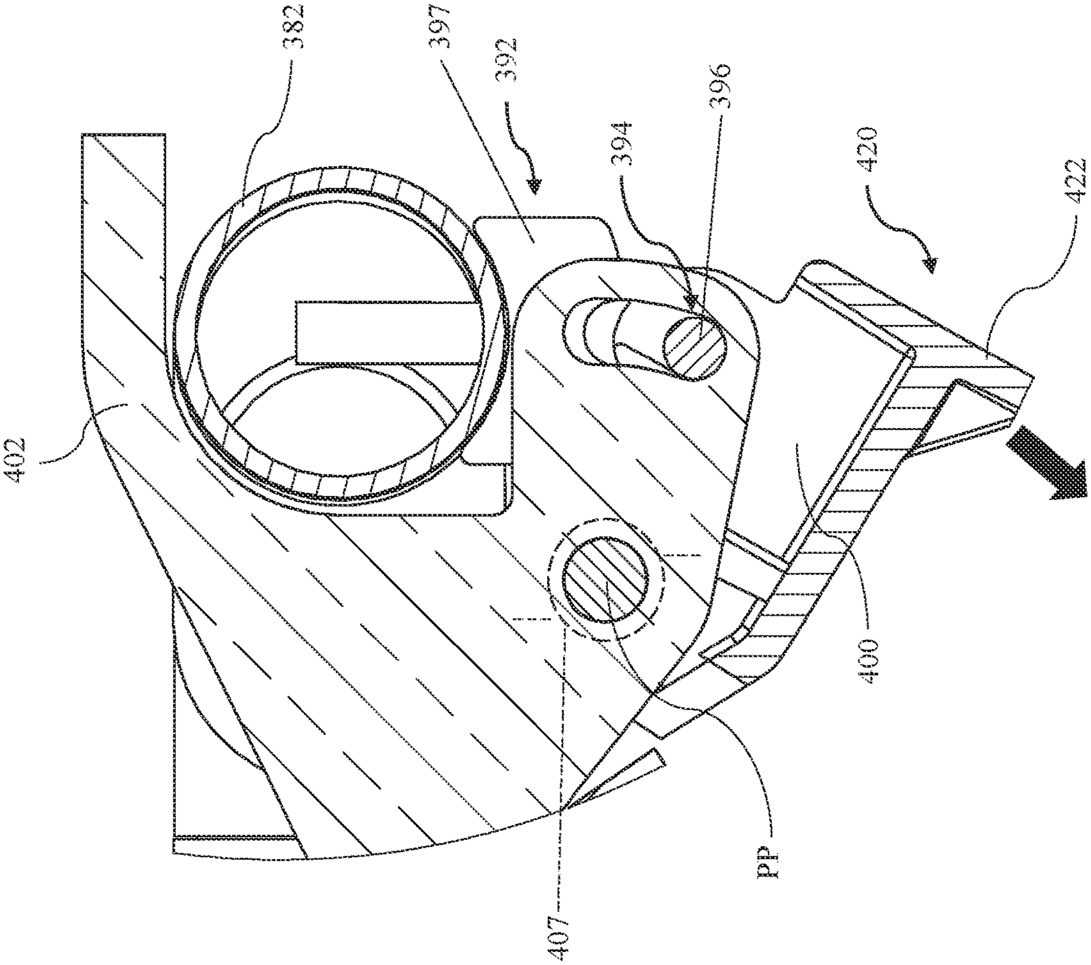
Figure 63:
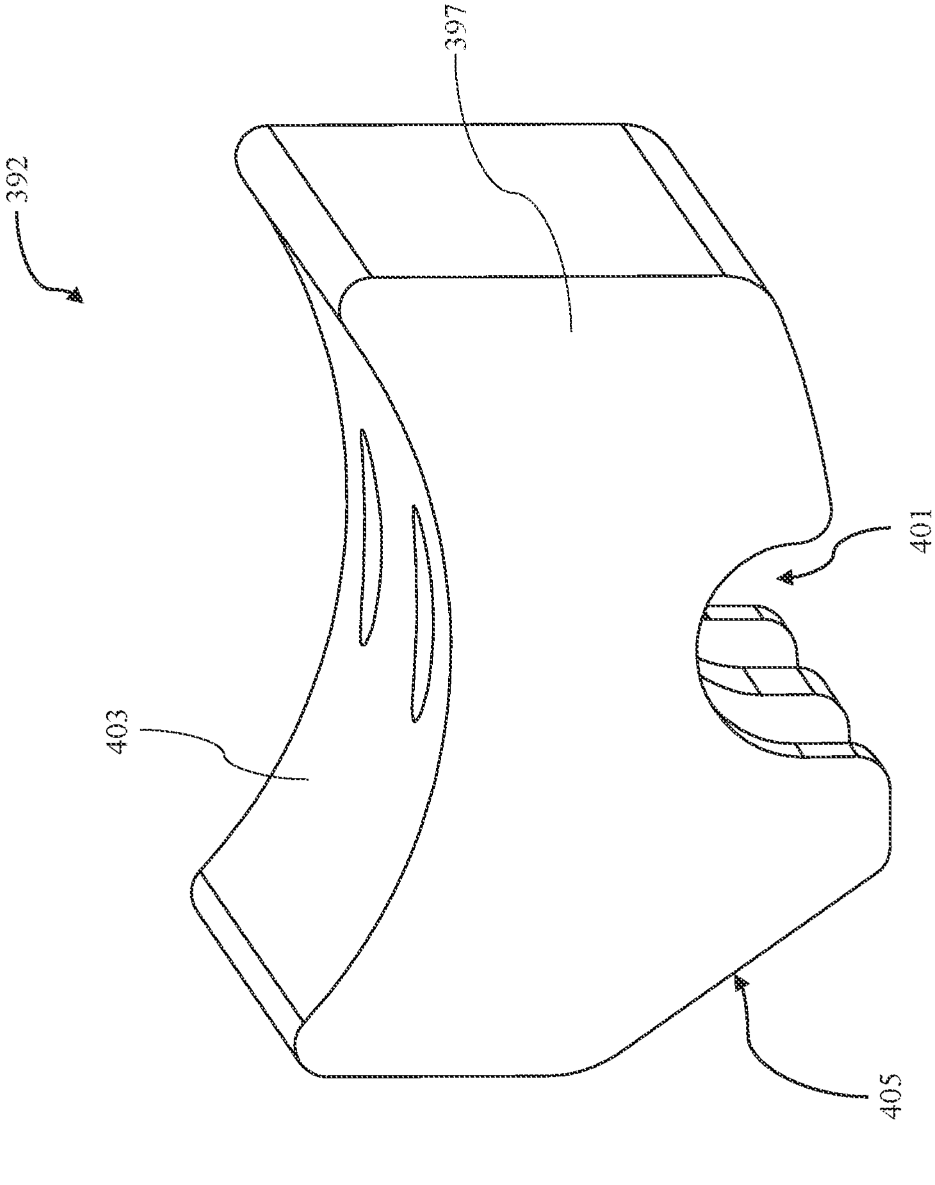
FIG. 63 is a perspective view of a catch.

Referring to FIGS. 58 through 60, an alternative handle assembly 380, substantially the same as the handle assembly 280 is shown except that the handle assembly 380 is locked to the support frame 36 in the stowed position with an alternative locking device 390. This locking device 390 operates in a similar manner as the locking device 290 to lock the handle assembly 380 relative to the support frame 36 in the stowed position. As best shown in FIGS. 61A through 63, the locking device 390 comprises a first locking element 392 connected to the handle assembly 380 (e.g., via fasteners) and a second locking element 394 pivotally connected to the support frame 36.

The first locking element 392 comprise a catch and the second locking element 394 comprises a latch. The catch is adapted to receive the latch and hold the handle assembly 380 in a locked state. In the embodiment shown, the latch comprises a pin 396 that is pivotally connected to a lock housing 402 and the catch comprises a body 397 shaped to receive the pin 396. More specifically, the pin 396 is supported on a pivot arm 400 that is pivotally connected to the lock housing 402, such as by a separate pivot pin PP.

The catch is fixed relative to handles 382. The catch is shown separately in FIG. 63 and comprises a seat 403 for receiving the handles 382 and openings for receiving fasteners to fix the body 397 to the handles 382. The body 397 defines one or more recesses 401 to receive the pin 396 in the locked state. When the handle assembly 380 is moved from the extended position toward the stowed position, a cam surface 405 of the body 397 engages the pin 396 (which is connected to the lock housing 402), which pivots the pin 396 downwardly relative to the lock housing 402, against the bias of a spring, such as torsion spring 407, until the pin 396 rides along the cam surface 405 to the one or more recesses 401. Once the pin 396 is in the one or more recesses 401, the handle assembly 380 is in the locked state in the stowed position. Owing to the shape of the recesses 401, the pin 396 is retained in the body 397 even with attempts to withdraw the pin 396 by pulling on the handles 382.

A release device 420 is configured to cooperate with the locking device 390 to release the second locking element 394 from the first locking element 392 to allow movement of the handle assembly 380 from the stowed position to the extended position. The release device 420 comprises a manual actuator 422 coupled to the second locking element 394. The manual actuator 422 is configured to be operated by the user to release the second locking element 394 from the first locking element 392. The manual actuator 422 shown in FIGS. 61A, 61B comprises a lever fixed to the pivot arm 400 to pivot the pivot arm 400 out of the locked state such that the pin 396 is free from the recesses 401 (also referred to as hooks). Actuation of the manual actuator 422 would result in movement similar to that shown in FIGS. 61B, 62B.

Figure 64:
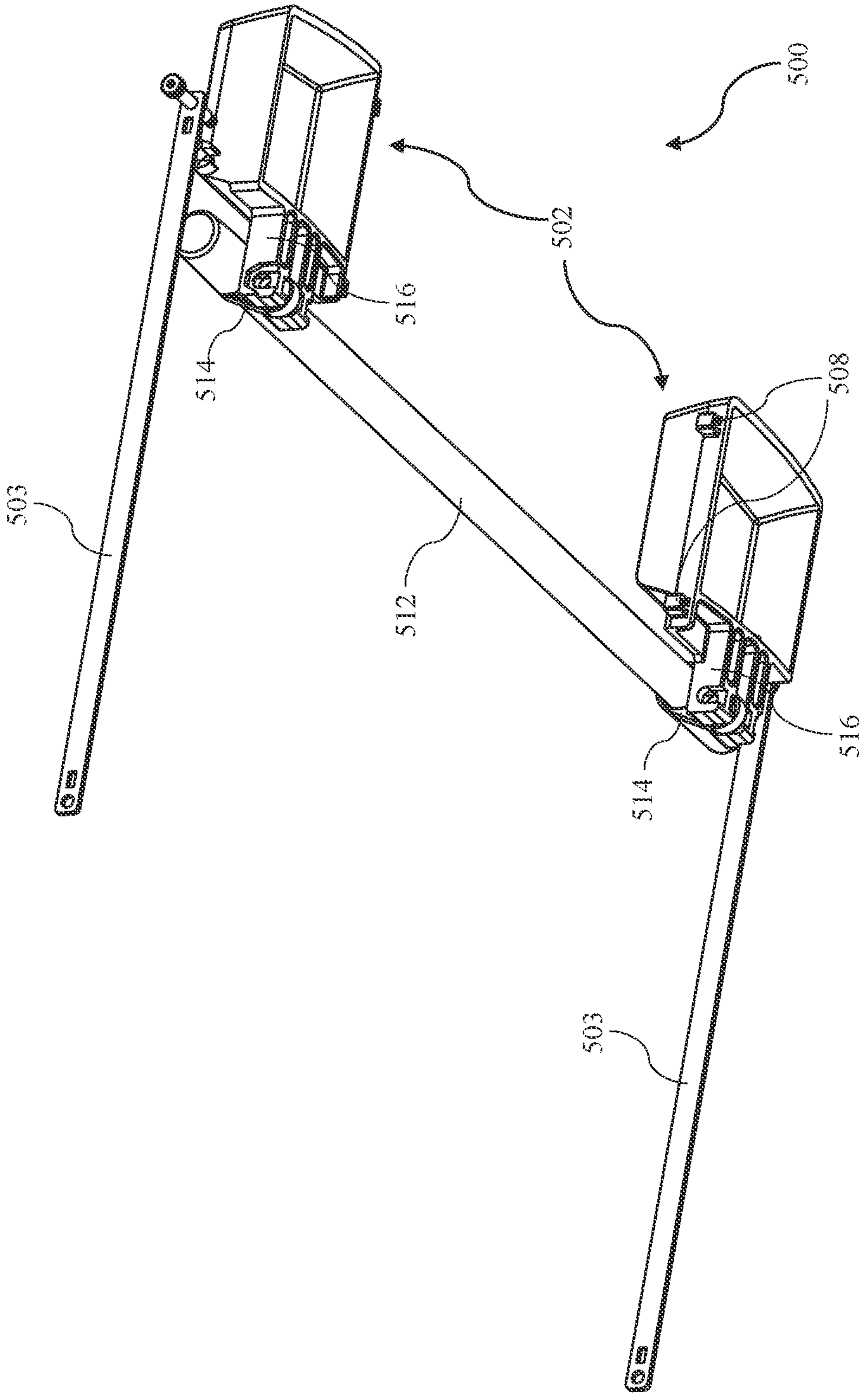
FIG. 64 is a perspective view of a pair of rail release devices, release links, and a connecting link.
Figure 65:
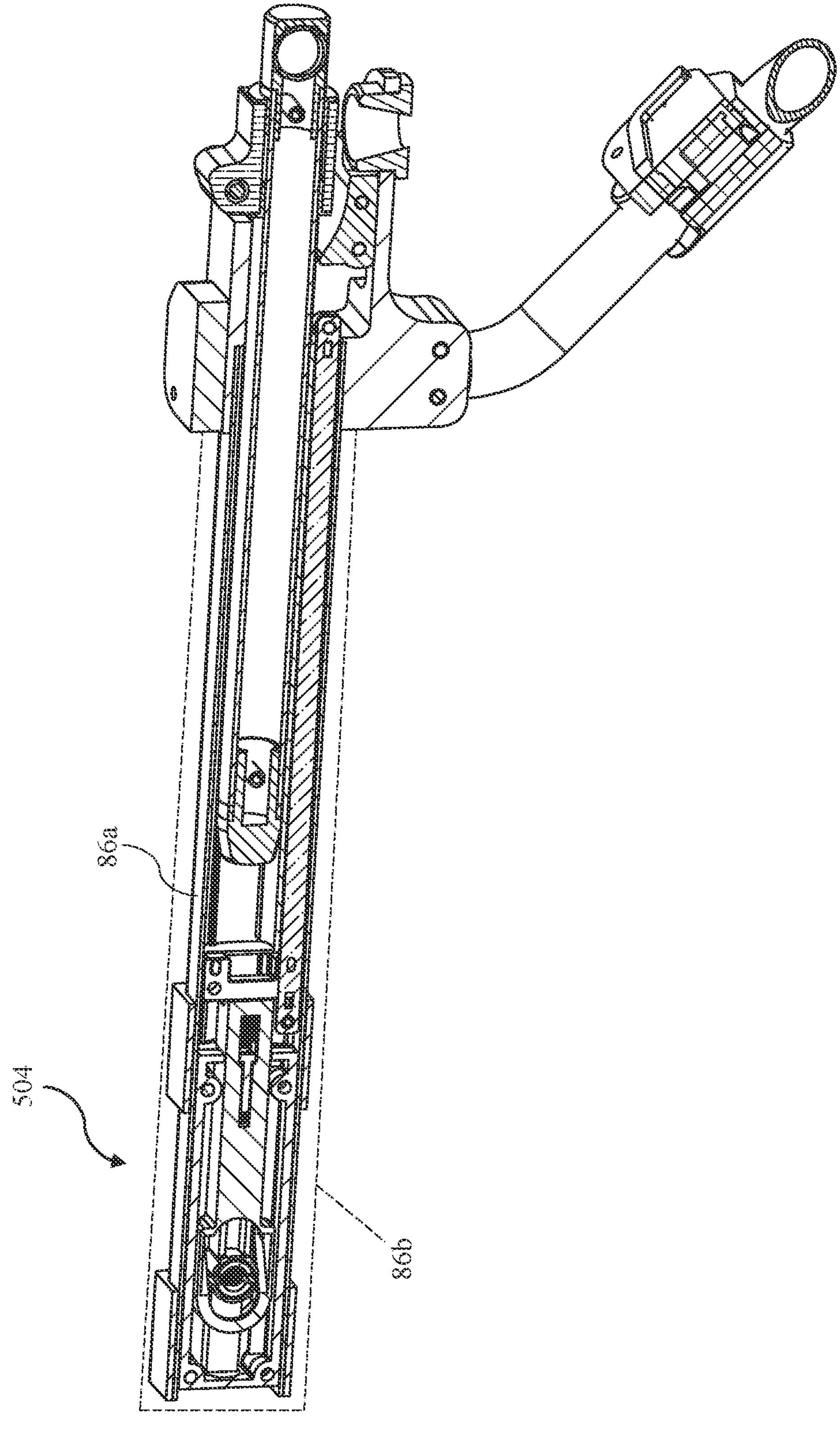
FIG. 65 is a cross-sectional view of a handle extension of the handle assembly of FIG. 58 illustrating a rail locking device.

Referring to FIGS. 58, 60, 64, and 65, in this embodiment, the rails 86 are extendible and comprise extension rails **86*a* that telescope inside and relative to outer rails 86*b* (shown by hidden lines in FIGS. 58 and 65). The extensions rails 86*a* may be configured to lock in a plurality of various extension positions relative to the outer rails 86*b*. The rails 86*a*, 86*b* form part of the support frame 36. In the embodiment shown, the support brackets 432 are fixed to the extension rails 86*a* to extend/retract with the extension rails 86*a* relative to the outer rails 86*b***.

Referring specifically to FIGS. 64 and 65, a release assembly 500 comprises a pair of rail release devices 502 provided to actuate a corresponding pair of rail locking devices 504 to unlock the rail locking devices 504 and allow extension/retraction of the extension rails **86*a* relative to the outer rails 86*b*. The release devices 502 comprise release handles or slides, but could comprise other forms of release devices, such as levers, buttons, and the like. In the embodiment shown, the locking devices 504 comprise locking elements 505 (e.g., locking pins shown in FIGS. 58 and 59) that are spring-biased to protrude outwardly from the extension rails 86*a* to engage openings 506 in the outer rails 86*b* (see hidden lines showing opening 506 in FIG. 58). The locking devices 504** may be like that shown in FIGS. 16-23 of U.S. Patent Application Publication No. 2017/0071806 to Graves et al., entitled "Telescoping Assembly For Use On A Patient Support Apparatus," hereby incorporated herein by reference.

As shown in FIG. 64, each of the release devices 502 has a pair of projections 508 that slide within slots (see FIG. 59) defined in covers 510. The covers 510 are fixed to the support brackets 432 to extend over and above the release devices 502 and to provide a bearing surface against which the user can rest a palm or thumb when pulling on the release device 502 to move the release device 502 relative to the cover 510.

A release link 503 is pivotally connected to each of the release devices 503 and upon engagement and movement by a user of one or both of the release devices 502, the release link 503 is pulled to retract the locking elements 505 out of the openings 506 and thereby allowing the extension rails 86*a* to slide within the outer rails 86*b*. The release links 503 are pivotally connected to their corresponding release device 502 by a pivot pin or other fastener such that, as one of the release devices 502 is pulled, its corresponding release link 503 is also pulled to withdraw the corresponding locking element 505 from the opening 506. The release link 503 may be like that shown in FIGS. 16-23 of U.S. Patent Application Publication No. 2017/0071806 to Graves et al., entitled "Telescoping Assembly For Use On A Patient Support Apparatus," hereby incorporated herein by reference.

A connecting link 512 interconnects the release devices 502 such that actuation of one of the release devices 502 also actuates the other release device 502. As shown in FIG. 60, the link 512 is shown as a support rod that is rotatably supported between the two support brackets 432 for rotation relative to the support brackets 432 during actuation of one or both of the release devices 502 (support brackets 432 and other components not shown in FIG. 64 for convenience). A pair of cam arms 514 are fixed to the link 512 and depend from the link 512. Each of the release devices 502 has a bracket 516 that is pivotally connected to one of the cam arms 514 by a pivot pin.

The user may engage and move one or both of the release devices 502, with the corresponding results being the same. The following description is attributed to actuating only a single release device 502. In operation, the user places their fingers into an underside of the release device 502 and pulls the release device 502 such that it slides relative to the cover 510 along its projections 508. Owing to the pivotal connection of the cam arms 514 to the release devices 502, this movement also rotates the link 512 to which the cam arms 514 are fixed. This rotation causes the other release device 502 to similarly slide relative to its cover 510 along its projections 508. Accordingly, the release devices 502 move in concert with each other even if the user only engages and moves one of them directly—the other moves indirectly. Simultaneous sliding of the release devices 502 thereby causes simultaneous sliding of the release links 503 and simultaneous withdrawal of the locking elements 505 from the openings 506. Upon release of the one or more release devices 502, the spring-biased locking devices 504 cause the release devices 502 to return to their initial, unactuated positions.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus for transporting a patient, the patient transport apparatus comprising:
- a support structure comprising a base, a frame, and a patient support surface to support the patient;
- wheels coupled to the base to facilitate movement of the support structure; and
- a handle assembly coupled to the frame and including a handle to be manipulated by a user and a handle extension supporting the handle, the handle extension configured to be in an upright orientation relative to the frame with the handle being movable along the handle extension from a first lifting position to a second lifting position, wherein the handle is located at a first height relative to the frame in the first lifting position and the handle is located at a second height relative to the frame, different than the first height, in the second lifting position.

2. The patient transport apparatus of claim 1, further comprising a locking device configured to lock the handle relative to the handle extension in each of the first and second lifting positions.

3. The patient transport apparatus of claim 1, wherein the handle is configured for sliding movement along the handle extension.

4. The patient transport apparatus of claim 3, wherein the handle is further configured for rotational movement about the handle extension.

5. The patient transport apparatus of claim 2, wherein the handle is configured for rotational movement about the handle extension.

6. The patient transport apparatus of claim 1, wherein the handle extension is configured to move relative to the frame.

7. The patient transport apparatus of claim 6, wherein the handle assembly includes a second handle extension configured for sliding movement relative to the frame from a stowed position to an extended position.

8. The patient transport apparatus of claim 7, wherein the frame includes longitudinal rails supporting the second handle extension for sliding movement in a longitudinal direction; and
- wherein the handle is configured for sliding movement in a vertical direction along the handle extension.

9. The patient transport apparatus of claim 1, further comprising a locking element configured to lock the handle extension relative to the frame in the upright orientation.

10. The patient transport apparatus of claim 9, further comprising and an actuator operable to move the locking element to an unlocked position.

11. The patient transport apparatus of claim 10, wherein the actuator is operatively attached to the handle so that the user is able to actuate the actuator while grasping the handle.

12. The patient transport apparatus of claim 1, further comprising a grip fixed to the handle extension and configured to be spaced from the frame when the handle extension is in the upright orientation.

13. The patient transport apparatus of claim 12, wherein the handle is arranged vertically between the grip and the frame.

14. The patient transport apparatus of claim 1, further comprising a collar supporting the handle for sliding movement along the handle extension between the first and second lifting positions.

15. The patient transport apparatus of claim 14, wherein the collar is supported for rotation about the handle extension.

16. The patient transport apparatus of claim 14, further comprising a locking device coupled to the collar to lock the collar relative to the handle extension between the first and second lifting positions.

17. The patient transport apparatus of claim 1, further comprising a hook operatively attached to the handle for supporting an intravenous (IV) bag.

18. A patient transport apparatus for transporting a patient, the patient transport apparatus comprising:

a support structure comprising a base, a frame, and a patient support surface to support the patient;

wheels coupled to the base to facilitate movement of the support structure; and a pair of handle assemblies each coupled to a respective lateral side of the frame and each respectively including a handle to be manipulated by a user and a handle extension supporting the handle, the handle extensions each configured to be in an upright orientation relative to the frame with the handles being movable along the respective handle extensions from respective first lifting positions to respective second lifting positions, wherein the handles are located at respective first heights relative to the frame in the first lifting positions and the handles are located at respective second heights relative to the frame, different than the first heights, in the second lifting positions.

19. The patient transport apparatus of claim 18, wherein the pair of handle assemblies each further include a collar supporting the respective handles for sliding movement along the respective handle extensions between the respective first and second lifting positions; and wherein the collars are each supported for rotation about the respective handle extensions.

20. The patient transport apparatus of claim 19, wherein the pair of handle assemblies each further include a locking device coupled to the respective collars to lock the collars relative to the respective handle extensions between the respective first and second lifting positions.

* * * * *